US011858176B2

(12) United States Patent
Schnellbach et al.

(10) Patent No.: US 11,858,176 B2
(45) Date of Patent: Jan. 2, 2024

(54) DIE ASSEMBLY WITH PRESSURE REGULATING DEVICE, AND A PELLETIZING APPARATUS

(71) Applicant: NORDSON CORPORATION, Westlake, OH (US)

(72) Inventors: Nikolai Schnellbach, Münster (DE); Anatoly Baklashov, Münster (DE)

(73) Assignee: Nordson Corporation, Westlake, OH (US)

( * ) Notice: Subject to any disclaimer, the term of this patent is extended or adjusted under 35 U.S.C. 154(b) by 621 days.

(21) Appl. No.: 16/822,277

(22) Filed: Mar. 18, 2020

(65) Prior Publication Data

US 2020/0298450 A1    Sep. 24, 2020

(51) Int. Cl.
*B29C 31/04* (2006.01)
*B29B 9/10* (2006.01)
*B29C 37/00* (2006.01)

(52) U.S. Cl.
CPC ............... *B29C 31/04* (2013.01); *B29B 9/10* (2013.01); *B29C 2037/90* (2013.01)

(58) Field of Classification Search
CPC ... B29C 31/04; B29C 2037/90; B29C 48/255; B29B 9/10
USPC ........................................................ 222/310
See application file for complete search history.

(56) References Cited

U.S. PATENT DOCUMENTS

| | | | |
|---|---|---|---|
| 3,570,062 A | 3/1971 | Dukert et al. | |
| 3,574,890 A | 4/1971 | Gresch | |
| 4,007,545 A | 2/1977 | Briggs | |
| 4,219,516 A | 8/1980 | John, Jr. | |
| 4,805,657 A * | 2/1989 | Carman | F16K 31/02 137/68.13 |
| 4,984,977 A | 1/1991 | Grimminger et al. | |
| 5,046,938 A * | 9/1991 | Hirschberger | B29C 48/09 425/141 |
| 6,478,564 B1 * | 11/2002 | Tieu | B29C 48/705 425/464 |
| 6,561,439 B1 * | 5/2003 | Bonzer | B05B 1/3073 239/458 |
| 2003/0127541 A1 * | 7/2003 | Marino | A62C 31/03 239/452 |

(Continued)

FOREIGN PATENT DOCUMENTS

| | | |
|---|---|---|
| CN | 201249515 Y | 6/2009 |
| CN | 201253946 Y | 6/2009 |

(Continued)

*Primary Examiner* — Matthew J Daniels
*Assistant Examiner* — Gregory C. Grosso
(74) *Attorney, Agent, or Firm* — BakerHostetler

(57) ABSTRACT

The invention relates to a die assembly for a pelletizing apparatus, the die assembly having a pressure regulating device that has a base member, a flow channel, and an annular channel. The base member has a fluid inlet side and a fluid outlet side. The flow channel is formed in the base member to provide a fluid-conducting connection between the fluid inlet side and the fluid outlet side. The annular channel section is connected to the flow channel in a fluid-conducting manner and formed in the region of the fluid outlet side. The invention is characterized by a flow cross-section regulating element for influencing a flow cross-section of the annular channel section. The regulating element is movable relative to the annular channel section and/or the flow channel.

20 Claims, 39 Drawing Sheets

(56) References Cited

U.S. PATENT DOCUMENTS

| | | | |
|---|---|---|---|
| 2005/0110184 A1* | 5/2005 | Eloo | B29B 13/021 |
| | | | 264/234 |
| 2005/0255187 A1 | 11/2005 | Kazmer | |
| 2010/0320628 A1* | 12/2010 | Holmes | B29B 9/065 |
| | | | 264/5 |
| 2011/0291318 A1* | 12/2011 | Martin | B29B 9/065 |
| | | | 264/150 |
| 2016/0007073 A1 | 1/2016 | Bae et al. | |

FOREIGN PATENT DOCUMENTS

| | | | |
|---|---|---|---|
| CN | 101992535 A | 3/2011 | |
| CN | 102653129 A | 9/2012 | |
| CN | 205835925 U | 12/2016 | |
| CN | 108790101 A | 11/2018 | |
| DE | 3137739 A1 | 4/1983 | |
| DE | 3815897 C1 | 7/1989 | |
| DE | 202006018456 U1 | 3/2007 | |
| EP | 0894594 A2 | 2/1999 | |
| EP | 1186397 A2 | 3/2002 | |
| ES | 0410594 A1 | 5/1977 | |
| GB | 2089719 A | 6/1982 | |
| JP | 04-073123 A | 3/1992 | |
| JP | 2000-289084 A | 10/2000 | |
| TW | 201637806 A | 11/2016 | |
| WO | 2006/060345 A2 | 6/2006 | |
| WO | 2008/086544 A1 | 7/2008 | |
| WO | 2016/043694 A1 | 3/2016 | |

\* cited by examiner

DIE ASSEMBLY WITH PRESSURE REGULATING DEVICE, AND A PELLETIZING APPARATUS

CROSS-REFERENCE TO RELATED APPLICATIONS

This Application claims priority to German patent application no. 10 2019 107 140.2, filed Mar. 20, 2019, the disclosure of which is hereby incorporated by reference as if set forth in its entirety herein.

BACKGROUND

The invention relates to a die assembly for a pelletizing apparatus, with a pressure regulating device coupled to the die member, the pressure regulating device comprising a base member having a fluid inlet side and a fluid outlet side, a flow channel formed in the base member to provide a fluid-conducting connection between the fluid inlet side and the fluid outlet side, and an annular channel section connected to the flow channel in a fluid-conducting manner and formed in the region of the fluid outlet side.

Such die assemblies are known from the prior art and are used in pelletizing apparatus, for example. They are used to extrude molten pelletizing material, such as thermoplastics, by means of a die plate into the form of a plurality of melt strands, in most cases. In the "underwater pelletizing" process, the individual melt strands are then divided by a cutting device into strand sections which are cooled to form pellet grains when they come into contact with a coolant, such as water. The underwater pelletizing process allows a high throughput of pelletizing material while requiring a small installation space for such a device and producing low emissions in the form of dust or noise.

In the die assemblies known from the prior art, melt is fed on an inlet side into a die member. The melt is guided through the die member by many flow channels and reaches a die plate. The die plate typically has a large number of die orifices to provide a high a level of productivity and, depending on the melt to be processed, a desired pelletizing result, i.e., high throughputs and/or small pellet grains. The disadvantage of classic die assemblies known from the prior art is that the die members and die plates, in particular, are designed for specific throughputs and viscosities of plastic melts. This means that each material or melt must typically be processed with advantageous process parameters, for example a specified pressure, to ensure that the melt strands exit the die plate in a desired manner. In die assemblies known from the prior art, changes of material typically involve replacing the entire die assembly and providing different die assemblies for each material to be processed, or for different categories of material at least. If different materials are to be processed, this ties up a large amount of capital, as it is necessary to provide a large number of die assemblies. Furthermore, replacing a die assembly is typically time-consuming, with the result that changing the material to be processed is associated with high set-up costs.

Using pressure regulating devices to allow different materials with different viscosities to be processed with a single die assembly is known from the prior art. DE 20 2006 018 456 U1, for example, relates to a die head of a plastic strand pelletizing plant. The die head in question has a melt inlet opening for receiving melt from an extruder, and a melt distributor for distributing melt from the melt inlet opening to a plurality of melt channels with orifices opening toward one end for discharging molten plastic strands, the die head having a plurality of constrictions for the flow of melt, which are arranged between the melt inlet opening and the orifices and which are variable and individually adjustable in cross-section.

However, the disadvantage of such a solution is that the manufacturing and maintenance costs of such an arrangement increase significantly due to its high complexity compared to the classic die assemblies known from the prior art. Although such a device avoids having to provide a large number of die assemblies in order to process different materials having different viscosities, the potential cost benefit that results cannot be exploited in the best possible way due to the high complexity of the proposed device.

SUMMARY

Given this background, the object of the invention is to develop a die assembly of the kind initially specified in such a way that the disadvantages found in the prior art are eliminated as far as possible. More specifically, a die assembly was to be specified which can be used for a large number of different materials, material throughputs and viscosities, while at the same time being inexpensive, functionally reliable and easy to maintain.

In a die assembly of kind initially specified, the object is achieved, according to the invention, by a flow cross-section regulating element for influencing a flow cross-section of the annular channel section, said element being movable relative to the annular channel section and/or the flow channel.

The invention makes use of the discovery that the motion of a single component or of an assembly with narrow limits to its number of components can be used to modify the free cross-section of flow of a respective annular channel section of a die assembly in such a targeted manner that different materials with different throughputs and viscosities can be processed with such a die assembly.

Such a flow cross-section regulating element can be used, in particular, to influence the free cross-section of flow in an annular channel section that, for example, supplies a large number of flow channels with melt. Alternatively, or additionally, the flow cross-section regulating element may be movable relative to a flow channel. Thus, a single flow cross-section regulating element can be used to indirectly influence the melt pressure in an entire die assembly. Furthermore, the free flow cross-section and the melt pressure are influenced in the immediate proximity of the die plate from which the melt strands exit. The melt pressure can thus be adjusted very precisely on the whole, while at the same time the device according to the invention is of low component complexity and easy to maintain. Compared to the pressure regulating devices known from the prior art, the cost efficiency can be significantly increased by using the pressure regulating device according to the invention.

The invention is developed by arranging the regulating element in the annular channel section. Melt preferably flows around the regulating element. The regulating element can now be used to influence the gap between the regulating element and the annular channel section, and thus the free cross-section of flow, by moving the regulating element relative to the annular channel section. This provides the advantage that the free cross-section of flow, and thus indirectly the pressure conditions in the melt, can be influenced in a very finely metered manner. Such an arrangement also ensures that any adverse impacts on the flow of melt are minimized as far as possible, in particular that strong turbulence is reliably prevented.

According to a preferred embodiment, the regulating element has a regulating ring and a retaining ring connected to the regulating ring. Such a two-part structure allows the regulating ring to be easily replaced and adapted to different materials, throughputs or viscosities, for example, as required. The individual components can also be easily replaced in the event of wear. The regulating ring and the retaining ring can be connected in many different ways, for example by means of a screw connection, a heat-resistant adhesive bond, or a form-fit connection.

The invention is developed by making the regulating ring wedge-shaped. A wedge shape of the regulating ring has proved to be particularly favorable for influencing the free cross-section of flow, without the melt flow being adversely affected by turbulence, for example. According to an alternative embodiment, the regulating ring may have concave and/or convex sections for influencing the flow in a targeted manner, or it may be formed in some other streamlined form.

According to a preferred development of the invention, the regulating ring has pins which extend at least in sections into the annular channel section, depending on the position of the regulating ring. The additional use of such pins, also referred to as pressure regulating pins, allows the free cross-section of flow to be additionally constricted in certain regions so that the pressure of the melt can be additionally influenced by means of such pins. Alternatively or additionally, the pins may be dimensioned in such a way that they extend into the flow channels formed in the die member. This allows the pressure control region to be moved closer to the die plate. By this means, the quality of the melt strands can be positively influenced, depending on the melt throughput being used or depending on the material throughput that is desired.

It is further preferred that the die assembly has at least one actuator, operatively connected to the regulating element, for moving the regulating element relative to the annular channel section, in particular translationally in the direction of a longitudinal axis of the base member. In this regard, the die assembly preferably has three or more such actuators to ensure that the regulating element in the region of the annular channel is at as constant a distance as possible from the lateral boundaries of the annular channel along the course of the annular channel. It is necessary, at all events, to ensure that the regulating element is prevented from tilting, which would indirectly result in melt exiting unevenly from the die plate.

According to an alternative embodiment, the actuator is formed as a fluid-operated actuator, in particular as a pneumatic actuator or hydraulic actuator. Embodying the actuator as a fluid-operated actuator has been found to be advantageous for applications in which the number of mechanical components is to be reduced and a low-wear actuator is to be used at the same time.

The fluid-operated actuator preferably has a cylinder with at least one pressurized fluid inlet/outlet, wherein the cylinder and the at least one pressurized fluid inlet/outlet are formed in the base member. Forming the cylinder in the base member allows a further reduction in the number of components required. It is preferable that a piston be arranged in the cylinder, the piston being sealed against the cylinder by means of a bellows. This ensures a durable tight seal.

The actuator is preferably designed such that it has a stub which is connected to the retaining ring and which is operatively connected to a translationally movable plunger. The assembly described allows the position of the retaining ring or regulating element to be finely adjusted while at the same time being of simple design.

It is further preferred that the base member has at least one mounting bore for mounting the plunger and for guiding the plunger to an outer side of the base member. This mounting bore preferably has a seal to prevent any melt from leaking from the housing. It is further preferred that the plunger has an actuating element, in particular a nut or a gear wheel arranged outside the base member, which nut or gear wheel preferably matches an external thread of the plunger. Such an actuating element arranged outside the housing allows the regulating element to be actuated easily and ensures that melt cannot leak from the housing. The type of actuating element used can be freely selected on the whole and will depend in particular on how it is to be controlled. For example, the actuating element may have devices for manual actuation, or machine elements such as nuts or gears.

The invention is further developed by a coupling means for coupling the actuating elements of at least two actuators. The coupling means is preferably configured as an internal gear in engagement with the actuating elements, in particular the gear wheels, of the plurality of actuating elements, such that actuation of the internal gear causes actuation of the plurality of actuating elements. This is based on the principle that actuation of a single coupling means synchronously actuates several actuators of a die assembly. In alternative embodiments, the actuators themselves, or a group of actuators which may be coupled in any way, can be actuated individually or in groups by means of a motor drive, a pneumatic drive, an electric drive or a linear drive.

According to a preferred embodiment, the actuating elements or the coupling means have a drive means and/or a hand lever. An electric motor, a pneumatic drive or a linear drive can be used as the drive means. A hand lever is a particularly inexpensive way of actuating, but requires direct interaction by an operator. Actuating the coupling means by a drive means allows the die assembly to be automated with regard to actuation of the regulating element.

According to an alternative embodiment, the regulating element is formed as a sleeve which surrounds the base member at least in sections and is translationally movable in the direction of the longitudinal axis of the base member, wherein a regulating section adapted to influence the free cross-section of flow in the annular channel section is formed on the regulating element. Designing the regulating element as a sleeve or sleeve-shaped member has also been found suitable for influencing the free cross-section of flow in the annular channel section in a targeted manner. This alternative embodiment involves a further reduction in the number of components and, due to the regulating element being structurally formed as a sleeve, it is possible for large forces to be applied to the regulating section of the regulating element.

In a preferred embodiment, the sleeve is moved translationally by means of a bolt inserted into the base member. The sleeve has a matching receptacle for the bolt, the receptacle having a recess for inserting an actuating nut which can be screwed onto the bolt. The actuating nut is limited in both actuating directions of the sleeve, such that any rotation of the nut causes the sleeve to move translationally in the direction of the longitudinal axis of the base member or in the respective opposite direction. Preferably, at least three such actuating bolts are arranged in the base member.

The regulating section is preferably wedge-shaped. In alternative embodiments, however, the regulating section may also have concave or convex sections, or a combination of these and straight sections. In particular, the shape of the regulating section can be adapted to the material to be processed, its viscosity and the desired throughput.

According to a preferred embodiment, the regulating section also has pins which extend at least in sections into the annular channel section, depending on the position of the regulating section. In yet another alternative embodiment, the regulating element has pins which extend at least in sections into the annular channel section, depending on the position of the regulating element. As already mentioned, the pins enable the free cross-section of flow to be further narrowed and thus indirectly enable the pressure on the melt to be increased in a specific region.

In different embodiments, the pins may have different lengths and shapes. According to a first embodiment, the pins extend substantially into the annular channel section and, particularly in the state in which the pins are moved in the direction of the die plate, an additional further amount into at least a portion of the flow channels of the die unit. In a further embodiment, slightly longer pins are used, which likewise extend into the annular channel section and into a larger portion of the flow channels of the die unit. This allows the pressure conditions in the immediate vicinity of the die plate to be adjusted in a targeted manner according to the melt to be processed (viscosity, throughput).

In a preferred embodiment, the pins taper toward the die plate. In an alternative embodiment, the pins have two sections, namely a first section of constant diameter and a second pin section which tapers toward the die plate. The pin ends facing the die plate are designed as tips or roundings.

According to one embodiment, the pins also have an external thread on the side facing away from the die plate, which matches an internal thread provided in the regulating section or the regulating element. The pins can thus be screwed preferably into the regulating section or the regulating element. In an alternative embodiment, the regulating section and the regulating element have bores into which the pins can be inserted.

In an alternative embodiment, the number of pins arranged at the regulating section or the regulating element is variable. By precisely selecting the number of pins to be inserted, the pressure conditions in the annular channel section or in the flow channel of the die unit can be influenced in a targeted manner.

According to an alternative embodiment, the flow cross-section regulating element is formed as a cone which is translationally movable relative to a longitudinal axis of the base member.

Using a cone which can be moved translationally has proved to be particularly suitable for fine regulation of the flow rate and also reduces turbulence in the fluid.

An actuator for translational movement of the cone is preferably assigned to the cone.

According to a preferred embodiment, the actuator is configured as a fluid-operated actuator, particularly preferably as a pneumatic actuator or hydraulic actuator.

According to an alternative embodiment, the actuator is configured as a mechanical actuator. Designing it in this way is preferable whenever no pressurizing medium is available in a production environment.

The invention is developed by the mechanical actuator having a set screw which is engagable with an internal thread arranged in the cone for translational movement of the cone. In this way, the position of the cone can be finely adjusted by rotary movement of the set screw and using standard components. According to an alternative embodiment, the mechanical actuator has an adjusting pin which is operatively connected to a rotating member via a gear, and wherein the rotating member is operatively connected to the cone by means of a thread. Such an arrangement allows the transfer of strong restoring forces, so such a die assembly can be used for a variety of operating pressures.

The translationally movable cone is preferably guided relative to and sealed against the base member and/or the die plate by means of a cone guide. This ensures that the cone is guided evenly and centered in relation to the base member and/or the die plate.

According to another preferred embodiment, the cone has a trapezoidal section on its side facing the annular channel section, for influencing the cross-section of flow in the annular channel section. The cone is thus adapted to exert direct influence, via the trapezoidal section, on the flow conditions in the region of the annular channel section.

According to another alternative embodiment, the translationally movable cone is sealed against the base member and/or the die plate by means of a bellows, the bellows being adapted to influence the cross-section of flow in the annular channel section. In a first operating position of the cone, the bellows preferably rests tightly against the outer circumference of the cone, whereas in a second position of the cone, the bellows has a curvature which is suitable for influencing the flow conditions in the annular channel section.

The invention is further developed by coupling the pressure regulating device to a die member. The pressure regulating device and the die member thus form a die unit.

According to an alternative embodiment, the pressure regulating device is formed in a die member. The advantage here is that a more compact arrangement of the pressure regulating device and die member can be achieved.

According to an alternative preferred embodiment, the die member has a guide assembly for guiding the flow cross-section regulating element relative to the die member. By means of the guide assembly, the flow cross-section regulating element is aligned and guided concentrically relative to the die member. The guide assembly preferably comprises a plurality of guide plates, in particular three such guide plates, arranged concentrically on the die member, which guide the flow cross-section regulating element, in particular at its inner radius or outer radius.

According to another alternative preferred embodiment, the flow cross-section regulating element has at least one guide element for guiding the flow cross-section regulating element relative to the die member, and the die member has at least one guide groove in which the at least one guide element is movably accommodated. This again provides alignment and guidance of the flow cross-section regulating element relative to the die member.

According to another alternative preferred embodiment, the flow cross-section regulating element has throttle pins, the throttle pins being guided and received in radially outwardly extending guides in the die member and extending at least in sections into the annular channel section. The throttle pins can preferably be inserted so far into the annular channel section that the latter is almost completely blocked. It is also preferred that the throttle pins can be moved into a further position in which they do not protrude into the annular channel section and thus exert little or no influence over the free cross-section of flow in the annular channel section.

It is preferred, alternatively, that the flow cross-section regulating element has at least one slider element with at least one slider bore, wherein the slider element can be brought into a position in which the slider bore is aligned with die member flow channels and into another position in which the slider bore is not or only partially aligned with the die member flow channels.

In this alternative embodiment, sliders with bores are used to influence the flow in the region of the die member flow channels. If the hole in the slider elements is aligned with the die member flow channels, the flow through the die member flow channels is unaffected. If the slider elements—and thus also the slider bores contained therein—are brought out of alignment, this will affect the flow conditions in the die member flow channels.

It is preferred in this regard that the slider elements are operatively connected to a slider rod which is guided and received in radially outwardly extending guides in the die member. This means the slider rods are easily accessible and operable from outside the die member.

According to an alternative embodiment, the slider elements are coupled to a rotationally movable slider adjustment means. This allows delicate positional variation of the slider elements.

According to an alternative embodiment, the flow cross-section regulating element is formed as a throttle element which can be pivoted selectively into the flow channel. The invention is further developed by mounting the throttle element so that it is pivotable about a pivot axis and is held in a pivoted position by an adjusting screw. Using such pivoting elements, which are typically pressed outwards by the fluid pressure and thus preferably against an adjusting screw, has proved to be particularly suitable for the fine adjustment of flow conditions. It is preferred that the throttle elements have wedge-shaped sections, concave or convex sections, or combinations thereof. The invention has been described above with reference to a die assembly. In another aspect of the invention, the invention relates to a pelletizing apparatus for producing pellets from a flow of melt by means of a die assembly. The invention achieves the initially specified object in respect of the pelletizing apparatus by the die assembly being formed according to one of the aspects described above.

In another aspect, the invention relates to a method for regulating the pressure of a flow of melt. The invention achieves the initially specified object by reference to a method comprising the following steps: Providing a flow of melt at a pressure regulating device, conducting the flow of melt to an annular channel section of the pressure regulating device, and regulating the free flow cross-section of the annular channel section. In an alternative embodiment, the free flow cross-section of a flow channel of a die unit is regulated in addition.

With regard to the advantages of such a pelletizing apparatus or such a method, reference is made to the statements above, which are incorporated here by reference.

BRIEF DESCRIPTION OF THE DRAWINGS

Further features and advantages of the invention ensue from the attached claims and the following description, in which embodiments are described in more detail with reference to schematic drawings. In the Figures.

DETAILED DESCRIPTION

Figure 1:
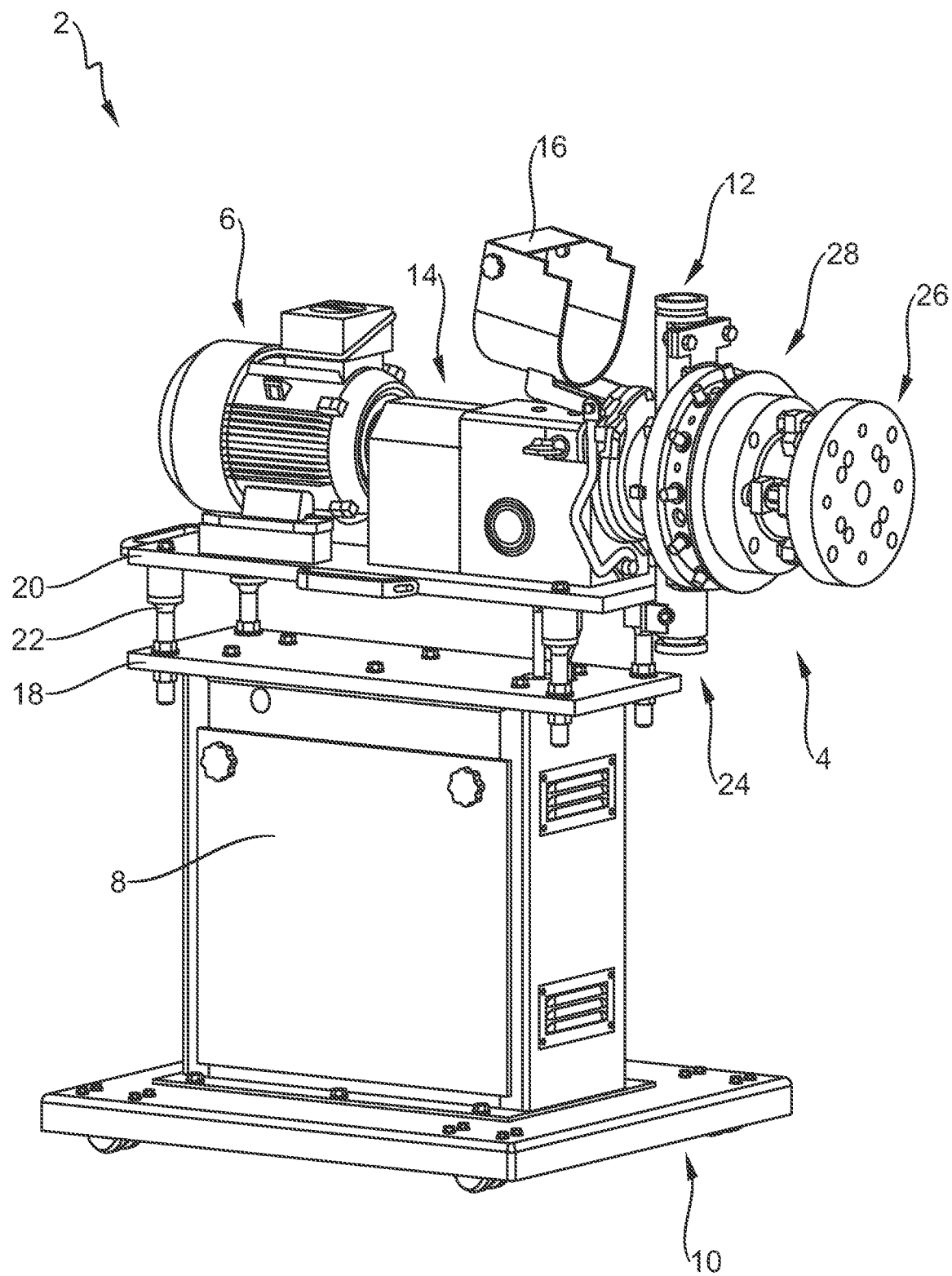
FIG. 1 shows a perspective view of a first embodiment of a pelletizing apparatus according to the invention, comprising a die assembly according to the invention.

FIG. 1 shows a pelletizing apparatus 2, which is configured here and preferably as an underwater pelletizing apparatus; the embodiments according to the invention can also be used in other pelletizing apparatus or methods, however. Pelletizing apparatus 2 has a driver 6 that provides driving power to an underwater pelletizer 14. Pelletizing apparatus 2 also has a protective cover 16.

Liquid plastic melt is typically fed to die assembly 4 by means of an extruder (not shown in the Figures). Die assembly 4 has a pressure regulating device 26 and a die unit 28. The melt is fed to pressure regulating device 26 and regulated in respect of melt pressure, in particular, depending on the melt material, its viscosity and intended throughput, and fed to die unit 28. Die unit 4 is heated electrically or by means of a heating fluid. Process water can also be introduced into die assembly 4 by means of a process water inlet 24 and can leave it via process water outlet 12. During operation, the melt exits in the form of melt strands (not shown in FIG. 1) from die assembly 4 or die unit 28 in the direction of the underwater pelletizer 14 and is first divided into strand sections by means of a cutting device (not shown); the cutting device is preferably designed with rotating cutting blades. These melt strand sections come into contact with a coolant, in particular water, in the underwater pelletizer 14 and are cooled abruptly. The melt strands are cut and form granules that are separated from the water as pellets later in the process.

Driver 6 is used to drive the cutting device which is provided for separating the melt strands into strand sections. The assembly comprising driver 6, underwater pelletizer 14 and die assembly 4 with die unit 28 and pressure regulating device 26 is mounted on a machine baseplate 20. The latter, for its part, is coupled by means of spacer elements 22 to a baseplate 18, which for its part is connected to a housing 8. Housing 8, for its part, is mounted on a skid mount 10, which has rollers, for example, for making it easier to position pelletizing apparatus 2.

Figure 2:
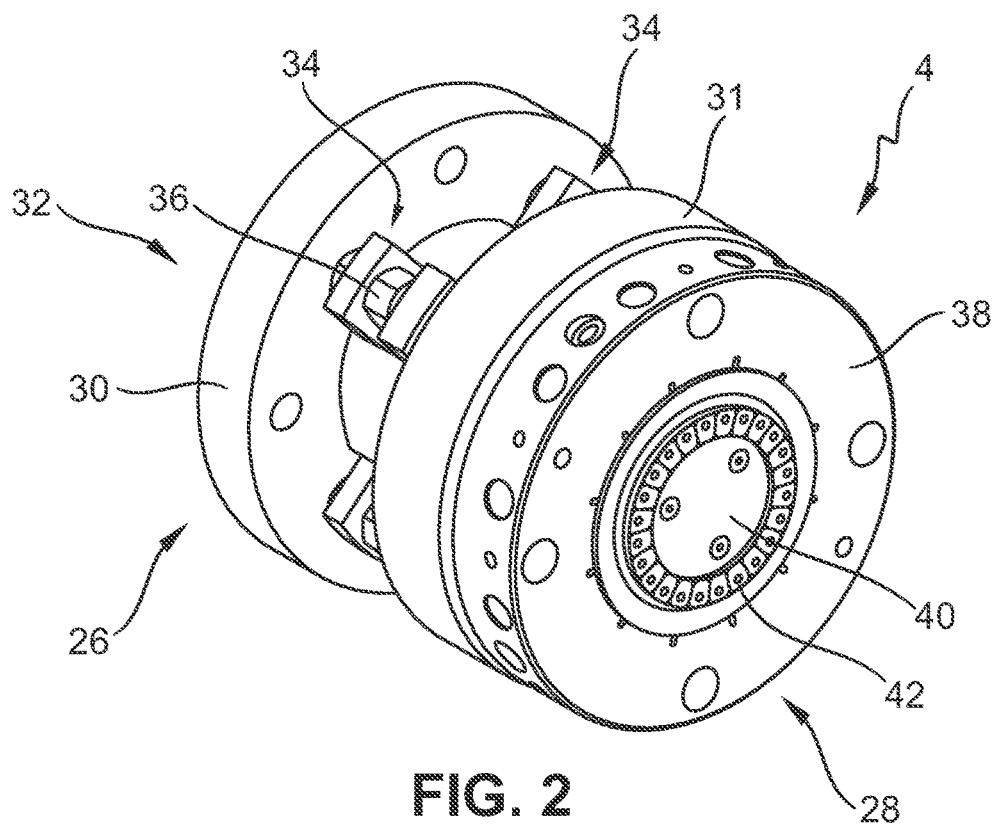
FIG. 2 shows a perspective view of the embodiment of the inventive die assembly shown in FIG. 1, comprising a die unit and a pressure regulating device.

FIG. 2 shows die assembly 4 as shown in FIG. 1, but separated from pelletizing apparatus 2. Die assembly 4 includes pressure regulating device 26 and die unit 28. Die unit 28 contains a die member 38 and a die plate 40. Die plate 40 has die orifices 42 from which melt strands exit die unit 28. Pressure regulating device 26 is coupled to die unit 28. Pressure regulating device 26 has a base member 30 and a housing section 31. Melt enters base member 30 at fluid inlet side 32. FIG. 2 also shows actuators 34 which allow the free cross-section of flow in a section of pressure regulating device 26 to be influenced by means of actuating nuts 36, and which thus allow the melt pressure to be influenced indirectly.

Figure 3:
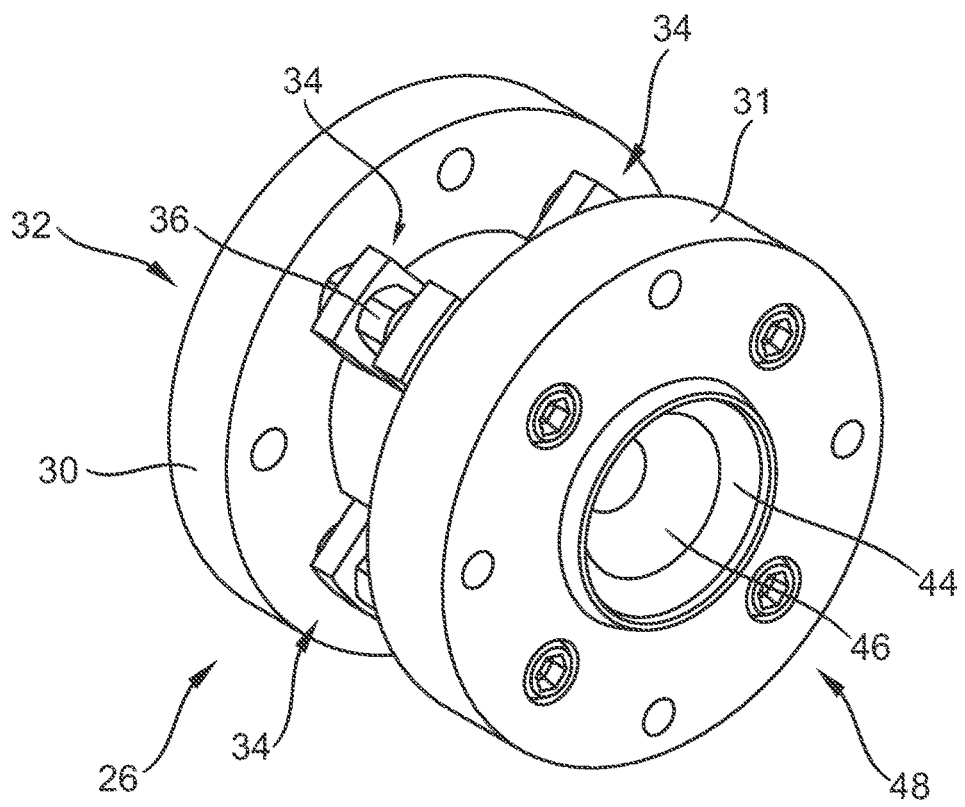
FIG. 3 shows a perspective view of the embodiment of the inventive pressure regulating device shown in FIG. 1.

In FIG. 3, pressure regulating device 26 is now shown without die unit 28, and the fluid outlet side 48 of pressure regulating device 26 can now be seen. A flow channel 46 is formed inside base member 30 of pressure regulating device 26. In the present embodiment, the flow channel is defined in the region of fluid outlet side 48 by a sleeve 44 which can be moved translationally. By moving the sleeve 44, it is possible, in combination with die unit 28 not shown here, to influence the free cross-section of flow in the region of fluid outlet side 48, as shown in detail in the following Figures.

Figure 4:
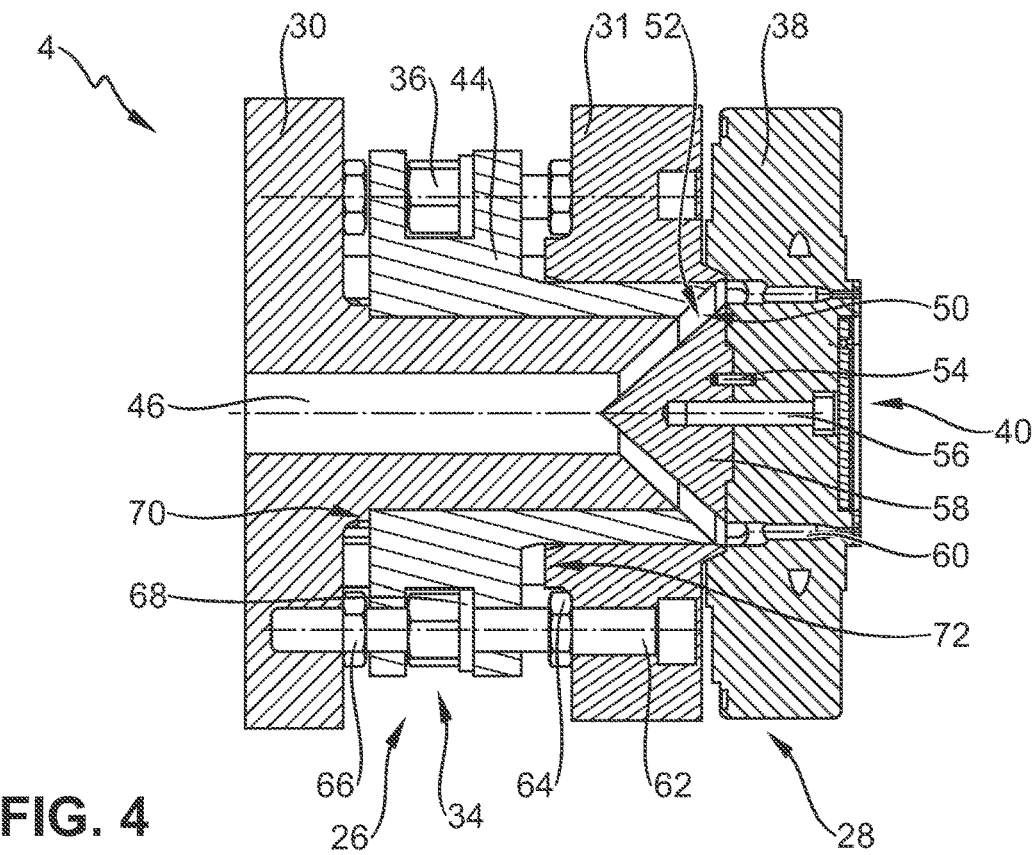
FIGS. 4, 5 show cross-sectional views of the embodiment of the inventive die assembly shown in FIG. 1, in different operating states.
Figure 5:
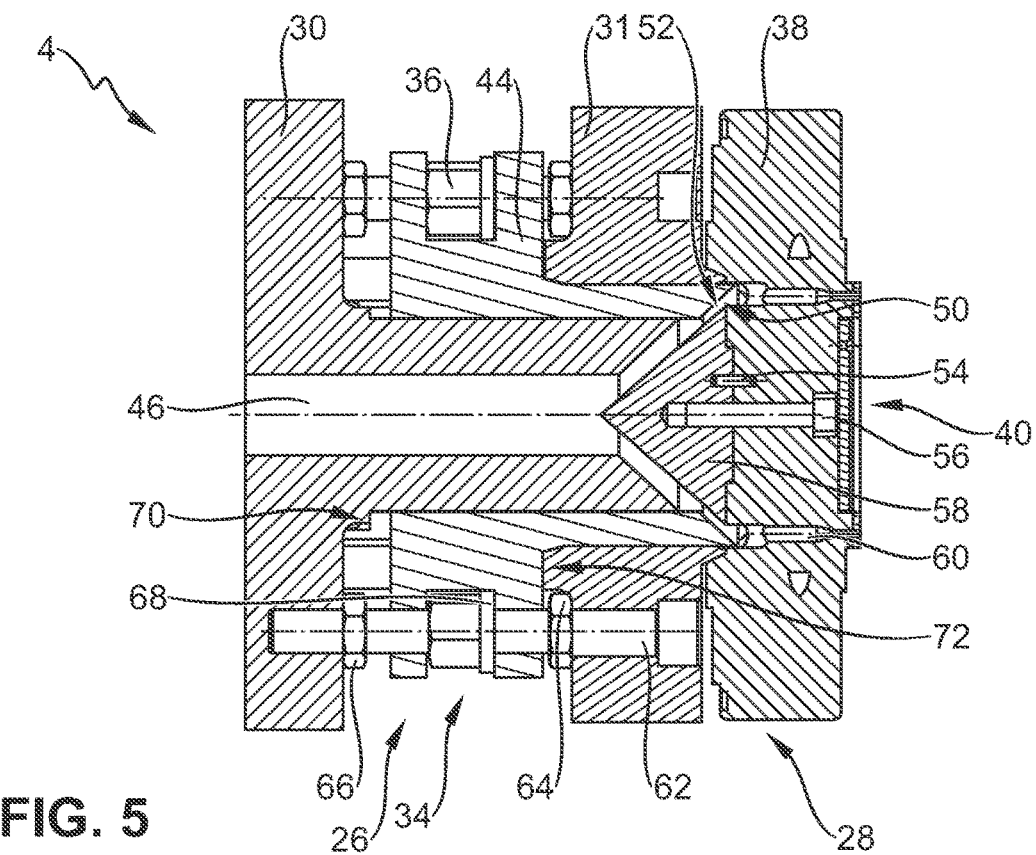

FIGS. 4 to 5 show sectional views of the die assembly shown in FIG. 2. As already mentioned, die assembly 4 comprises pressure regulating device 26 and die unit 28. Here, die unit 28 consists here of a die member 38 into which die member flow channels are introduced. Die unit 28 consists of a die member 38 in which die member flow channels are introduced. A guide cone 58 is attached to die member 38. The guide cone is centered by centering pin 54, in particular, and coupled to die member 38 by means of a cone fastening screw 56. A die plate 40, which has die orifices 42 (see FIG. 2) from which melt strands exit from the apparatus, is mounted on the outlet side of die member 38.

Pressure regulating device 26 is coupled to die unit 28. The pressure regulating device has a base member 30 in which a flow channel 46 is formed. Here, flow channel 46 is centered relative to the longitudinal axis in the middle of base member 30. An annular channel 50 is formed in the outlet region of pressure regulating device 26 by the interaction of flow channel 46 with the guide cone 58 of die unit 28. In order to influence the free cross-section of flow in this annular channel section 50, a sleeve 44 with a regulating section 52 is arranged in the region thereof. Sleeve 44 is mounted translationally movably along the longitudinal axis of base member 30. If sleeve 44 with regulating section 52 is moved in the direction of die member 38, the free cross-section of flow in annular channel section 50 is narrowed. If, however, sleeve 44 is moved in the opposite direction away from die member 38, the free cross-section of flow is increased, although the free cross-section of flow cannot become greater overall than the region of annular channel section 50 defined by the interaction of guide cone 58 and base member 30. A housing section 31 is arranged on the fluid outlet side 48 of pressure regulating device 26 and extends substantially annularly around base member 30 and sleeve 44. Housing section 31 is additionally connected to base member 30 by means of bolt 62. Bolt 62 is screwed in sections into base member 30 at the end facing away from the bolt head and is fastened to base member 30 by means of fastening nut 66. The preferred plurality of bolts 62 thus provide an additional connection between base member 30 and housing section 31.

Bolts 62 are received in housing section 31 and are fastened to the housing section by means of fastening nuts 64. Sleeve 44 has bores with a diameter that matches the diameter of bolt 62. Sleeve 44 also has a recess for insertion of an actuating nut 36. Sleeve 44 is slid onto bolts 62, and nut 36 is screwed onto bolt 62. Due to the shape of the section for receiving actuating nuts 36, actuation of the actuating nuts 36 causes sleeve 44, which is in contact with actuating nut 36, to move translationally when actuating nut 36 is rotated, if housing section 31 is fixed in position relative to base member 30. The position of sleeve 44 can thus be adjusted translationally by rotating the actuating nut 36 associated with an actuator 34. The free cross-section of flow in annular channel section 50 can thus be influenced by interaction with regulating section 52 of sleeve 44. The melt pressure is regulated indirectly by this adjustment of the free cross-section of flow in annular channel section 50. The range of movement of sleeve 44 is limited by a first abutment shoulder 70 and a second abutment shoulder 72.

FIG. 5 shows an operating state of die assembly 4, in which sleeve 44 has been moved translationally in the direction of die member 38. The free cross-section of flow 50 is now restricted at the direct transition to die member 38 of die unit 28.

Such a restriction of the free cross-section of flow in annular channel section 50 can be used, for example, to increase the pressure of the melt compared to the state shown in FIG. 4.

Figure 6:
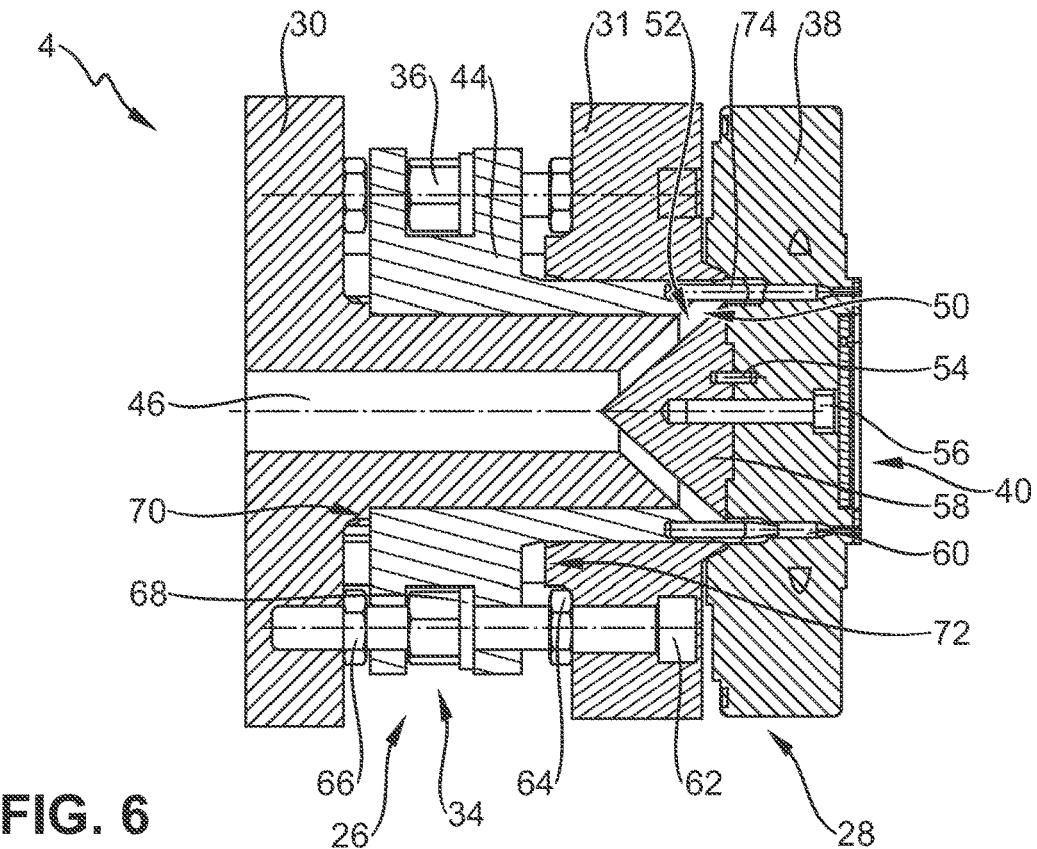
FIGS. 6, 7 show cross-sectional views of the embodiment of the inventive die assembly shown in FIG. 1, with pins for influencing the free cross-section of flow in different operating states.
Figure 7:
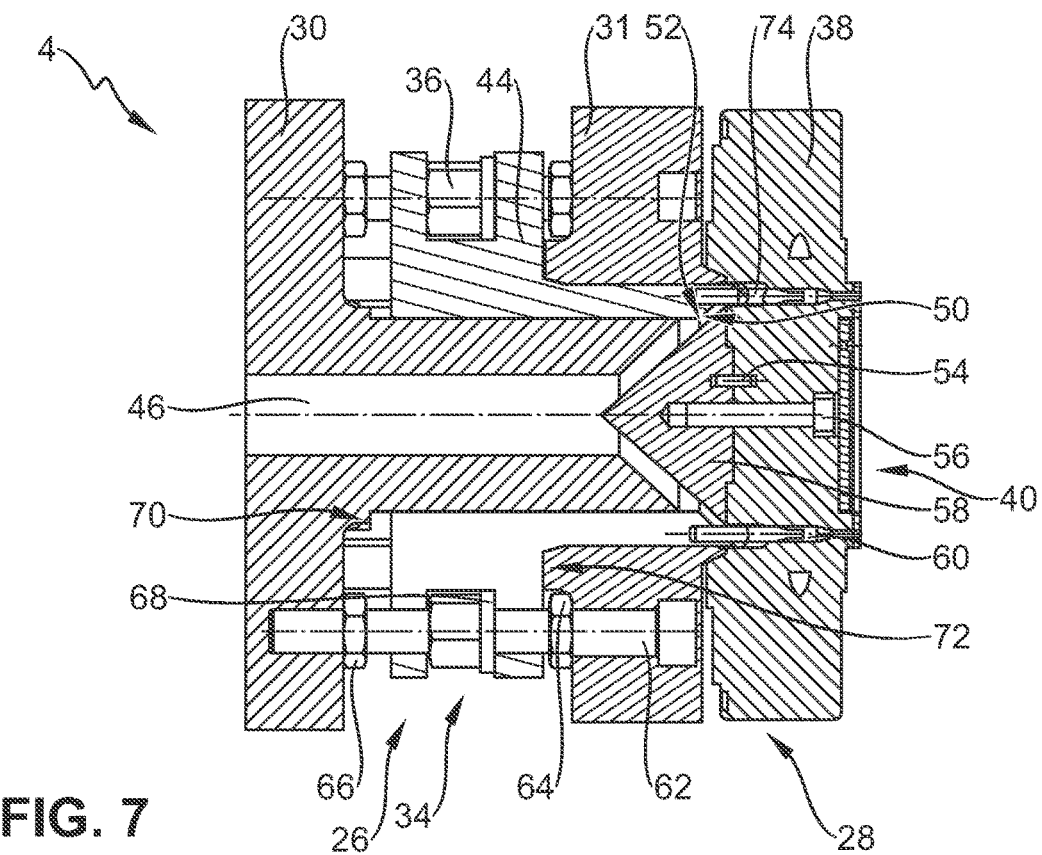

The structure of die assembly 4 as shown in FIGS. 6 to 7 is essentially based on the structure known from FIGS. 4 and 5. However, sleeve 44 or regulating section 52 of sleeve 44 has a number of pins 74. In addition to positioning regulating section 52, positioning pins 74 also offers a way of influencing the free cross-section of flow and thus indirectly the pressure conditions in annular channel section 50, specifically, and also in die member flow channels 60. Pins 74 may be screwed or glued to sleeve 44, for example, or inserted into the sleeve by a press fit. Alternatively, pins 74 and sleeve 44 may be integrally formed. The total number of pins 74 is variable and may also be adapted to a material to be processed, to a respective viscosity or to a desired material throughput.

FIG. 6 shows the state in which sleeve 44, including pins 74, is in a position moved away from die member 38. In this operating position, regulating section 52 does not restrict the free cross-section of flow in annular channel section 50, but pins 74 are already inserted at least partially into annular channel section 50 and into die member flow channels 60. In the state shown in FIG. 7, sleeve 44 has now been moved translationally in the direction of die member 38. This results in regulating section 52 restricting the free cross-section of flow in the annular channel section 50, while at the same time pins 74 restrict the free cross-section of flow in the region of annular channel section 50 and additionally in the region of die member flow channels 60.

Figure 8:
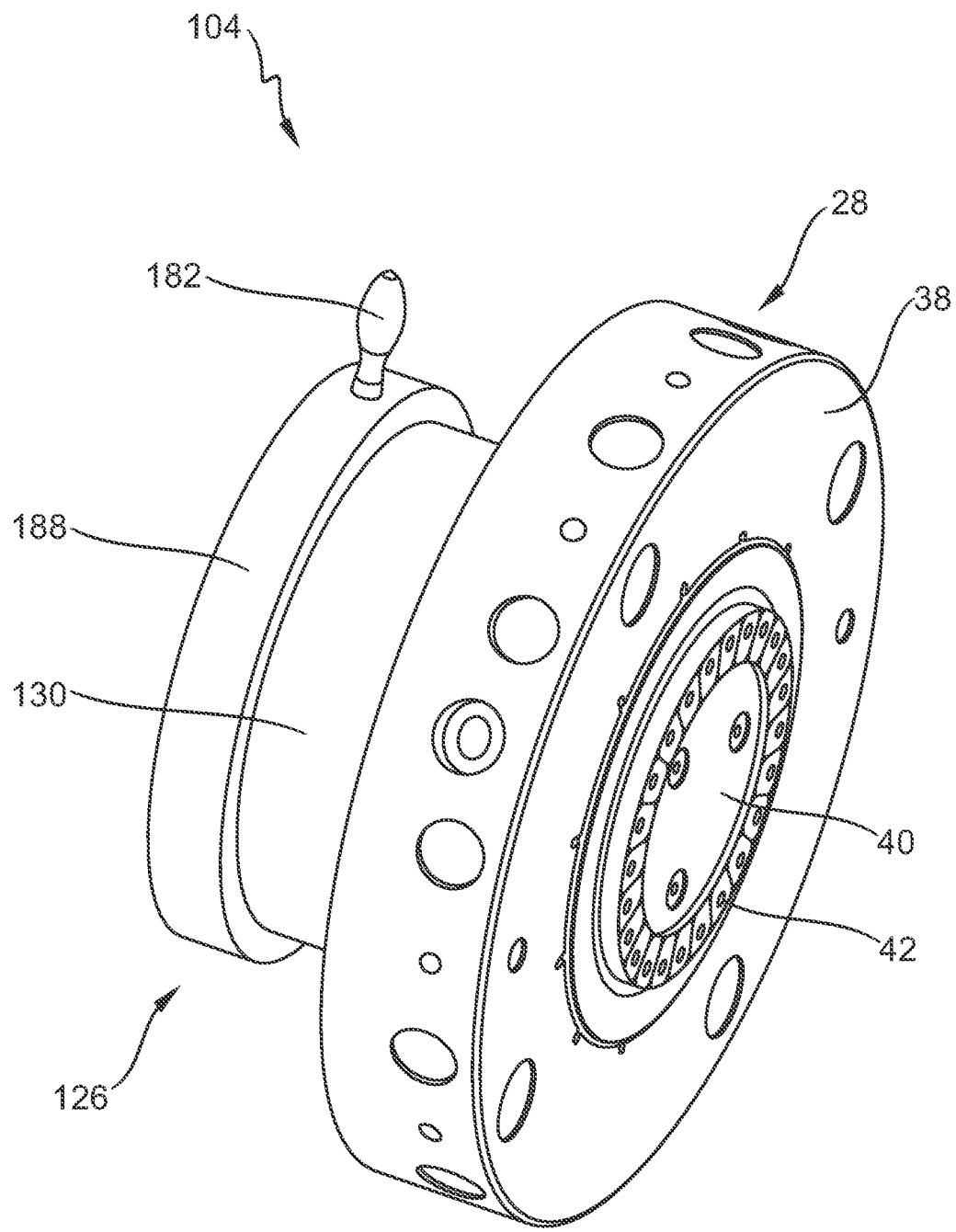
FIG. 8 shows a perspective view of an alternative embodiment of a die assembly according to the invention.

An alternative embodiment of a die assembly 104 is shown in FIG. 8. Die assembly 104 includes an alternative embodiment example of a pressure regulating device 126 as well as die unit 28 that is already known. Die unit 28 has a die member 38 and a die plate 40 with die orifices 42. Pressure regulating device 126 is connected to die unit 28 and has a base member 130 to which a coupler 188 with a hand lever 182 is attached. Moving hand lever 182 along the circumference of base member 130 results in a change in the free cross-section of flow in annular channel section 150 or in die member flow channels 60, as can be seen in detail from the following Figures.

Figure 9:
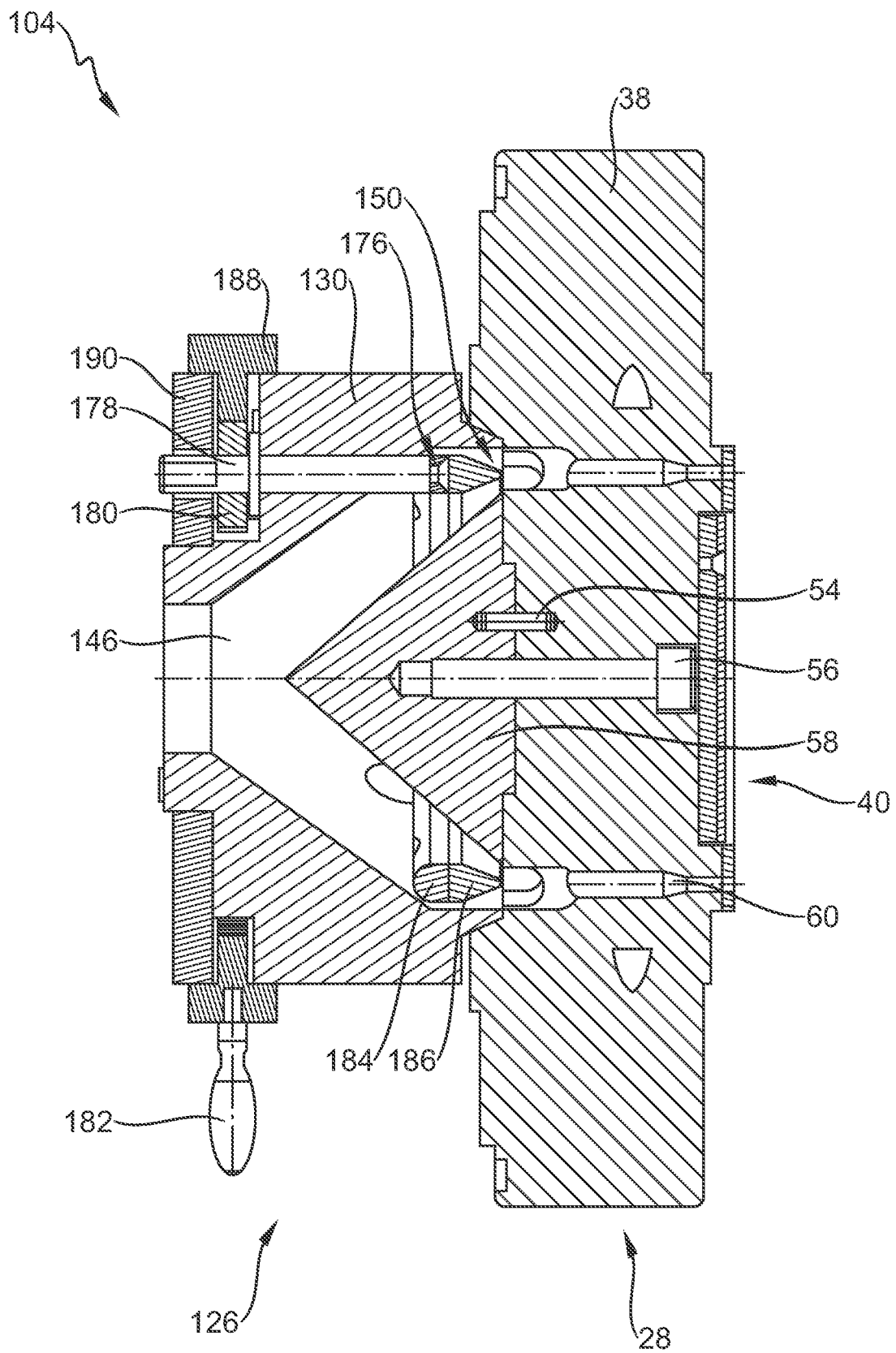
FIG. 9 shows a cross-sectional view of the embodiment of the inventive die assembly shown in FIG. 8.

FIG. 9, for example, shows pressure regulating device 126, which is mounted on die unit 28. Pressure regulating device 126 has a base member 130 in which a flow channel 146 is arranged. In combination with guide cone 58 of die unit 28, flow channel 146 forms a annular channel section 150. A regulating ring 186 is arranged in said annular channel section 150. The free flow cross section in annular channel section 150 can be influenced, specifically, by a translational movement of said regulating ring 186 in the direction of die unit 28 (or in the opposite direction).

A movement of regulating ring 186 in the direction of die unit 28 results in a reduction of the free cross-section of flow in annular channel section 150. This allows indirect influence to be exerted on the pressure conditions of a melt in this region. Regulating ring 186 is arranged on a retaining ring 184. The respective components may be glued together, for example, or screwed together or connected in some other way, and if necessary may also be integrally formed. An actuating element 176 is attached form-fittingly or force-fittingly to retaining ring 184. A plurality of actuating elements 176 are typically attached to retaining ring 184, although only one is shown here due to the sectional view. Actuating element 176 is connected, in turn, to a plunger 178, which has a threaded portion at its end opposite retaining ring 184, onto which threaded portion an actuating element 180 is placed. The range of movement of actuating element 180 is limited on one side by base member 130 and on the other side by a cap ring 190. Translational movement of actuating element 180 is thus inhibited, with the consequence that rotation of actuating element 180 causes plunger 178 to move translationally in the direction of die member 38 or away from it. As regulating ring 186 is connected indirectly to plunger 178, any rotation of actuating element 180 will cause a translational movement of regulating ring 186, with which the free cross-section of flow in annular channel section 150 can then be regulated.

As already mentioned, pressure regulating device 126 preferably has a plurality of plungers 178, in particular three. In order to facilitate a uniform translational movement of the plurality of plungers 178, actuating elements 180 are preferably provided in the form of gear wheels that match a coupler 188 configured as an internal gear, in particular.

Rotation of coupler 188 along the circumference of base member 130 results in uniform movement of the plurality of actuating elements 180, thus ensuring that regulating ring 186 is moved uniformly and as purely translationally as possible in the direction of die member 38 or away from it. A hand lever 182 is provided on coupler 188 to facilitate manual operation of coupler 188.

Figure 10:
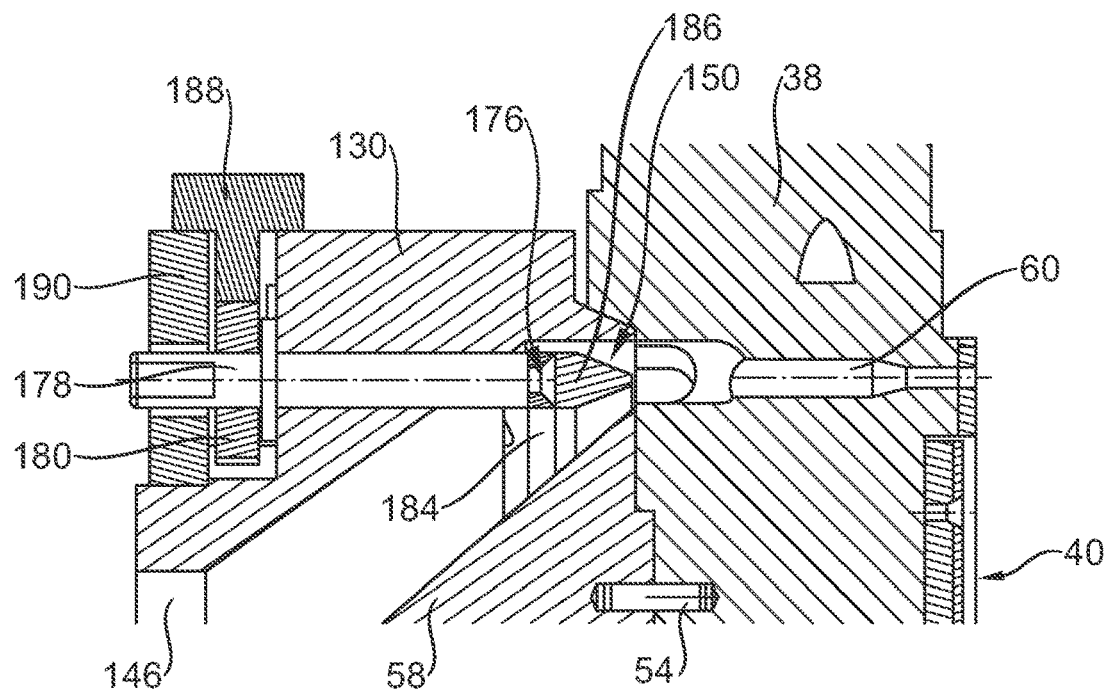
FIGS. 10, 11 show cross-sectional views of the embodiment of the inventive die assembly shown in FIG. 8, in different operating states.
Figure 11:
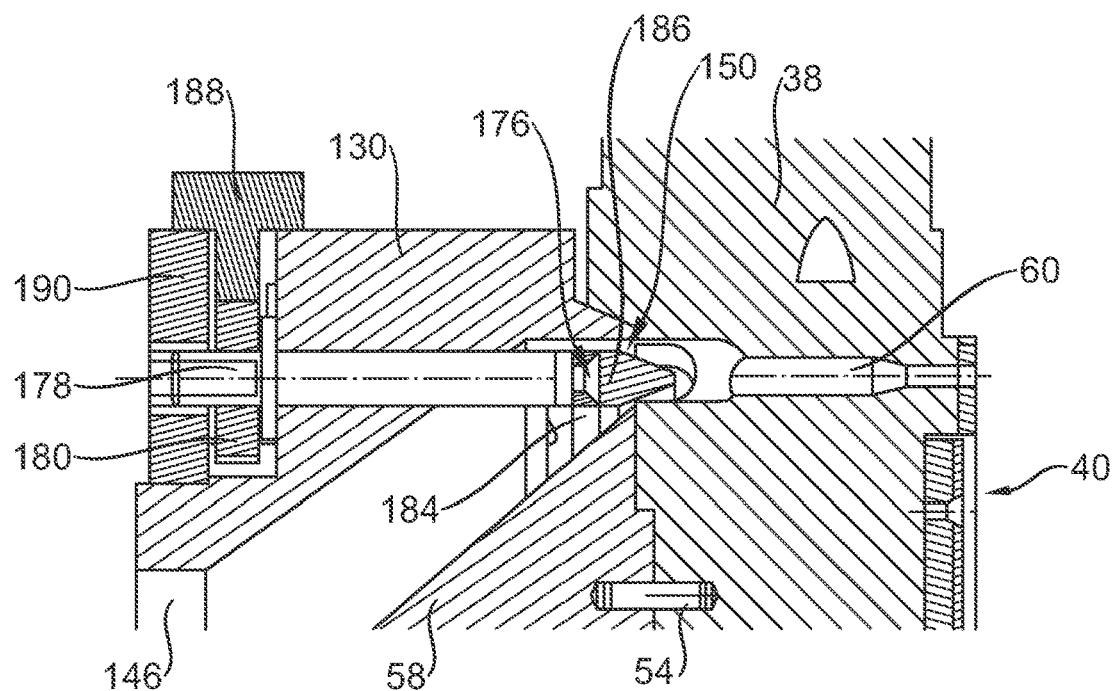

FIGS. 10 and 11 show different operating states of the die assembly 104 shown in FIG. 9. FIG. 10 shows an operating state in which regulating ring 186 has been moved as far as possible in a direction away from die member 38. The free cross section of flow in annular channel section 150 is thus maximized. In contrast, FIG. 11 shows a state in which regulating ring 186 has been moved as far as possible toward die member 38. In this operating state, the free flow cross section in annular channel section 150 is minimized. However, a certain free cross-section of flow always remains between regulating ring 186 and annular channel section 150.

Figure 12:
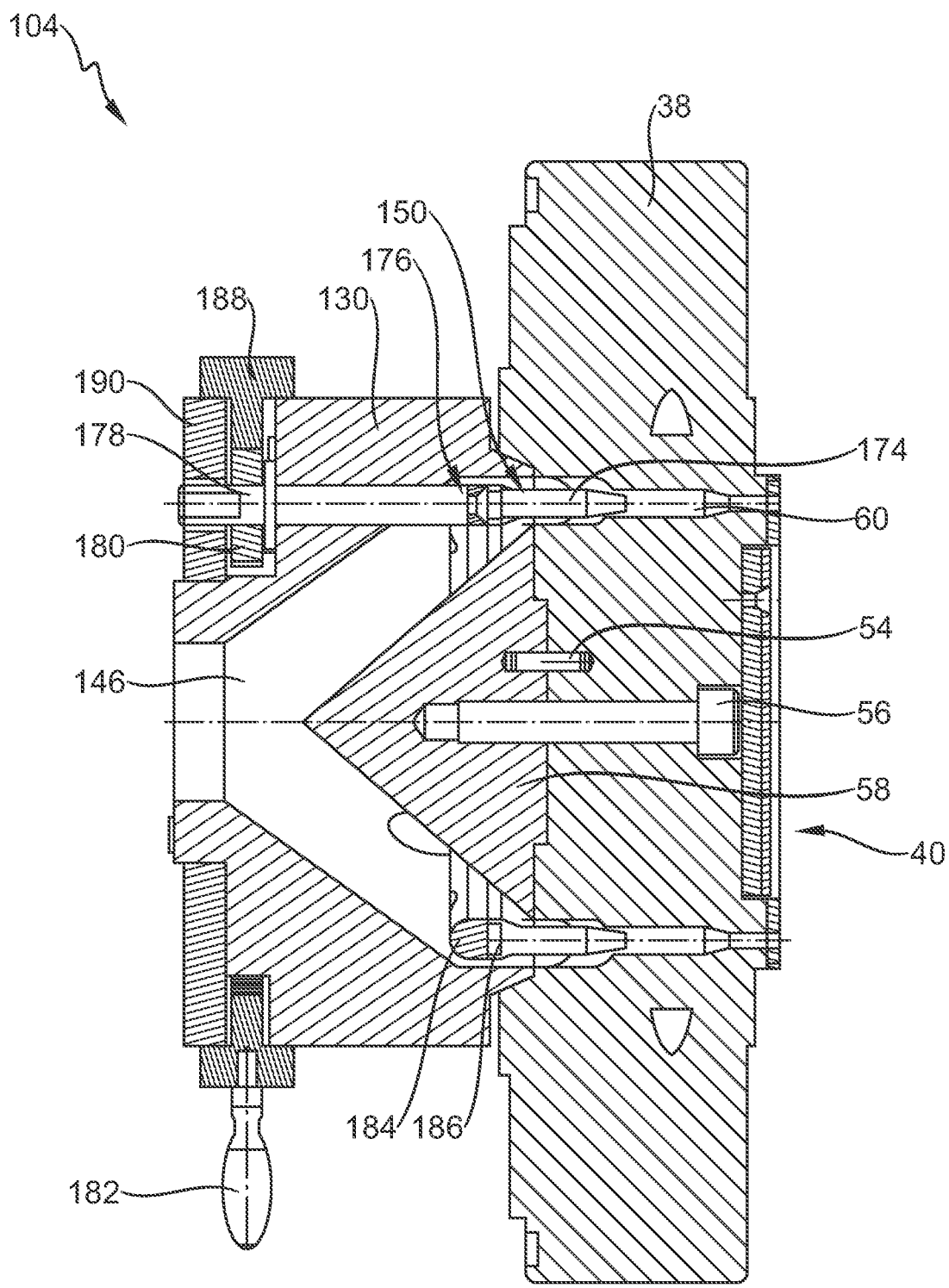
FIG. 12 shows a cross-sectional view of the embodiment of the inventive die assembly shown in FIG. 8, with pins for influencing the free cross-section of flow.

FIG. 12 shows the die assembly of FIGS. 8 to 11, but with pins 174 arranged on regulating ring 186 to influence the free cross-section in annular channel section 150 or in die member flow channels 60. Pins 174 may be connected to retaining ring 184 or regulating ring 186 in different ways. The components can be screwed, glued, otherwise connected, or integrally formed, for example. The number of pins 174 is also variable, as are their geometry and length. Referring now to FIG. 12, any actuation of coupler 188 will now cause actuating element 180 to likewise rotate. As actuating element 180 is held in position by base member 130 and cap ring 190, rotation of actuating element 180 will result in plunger 178 being moved translationally, either in the direction of die member 38 or away from it, depending on the direction of rotation.

Figure 13:
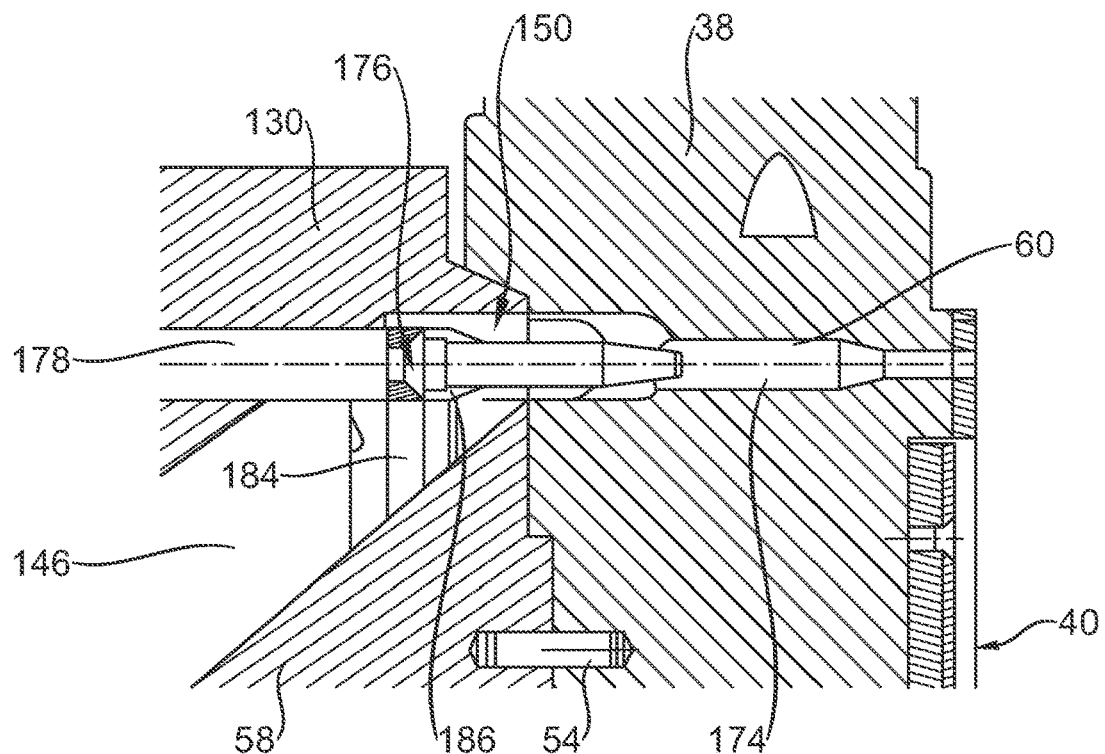
FIGS. 13, 14 show cross-sectional views of the embodiment of the inventive die assembly shown in FIG. 8, with pins for influencing the cross-section in different operating states.
Figure 14:
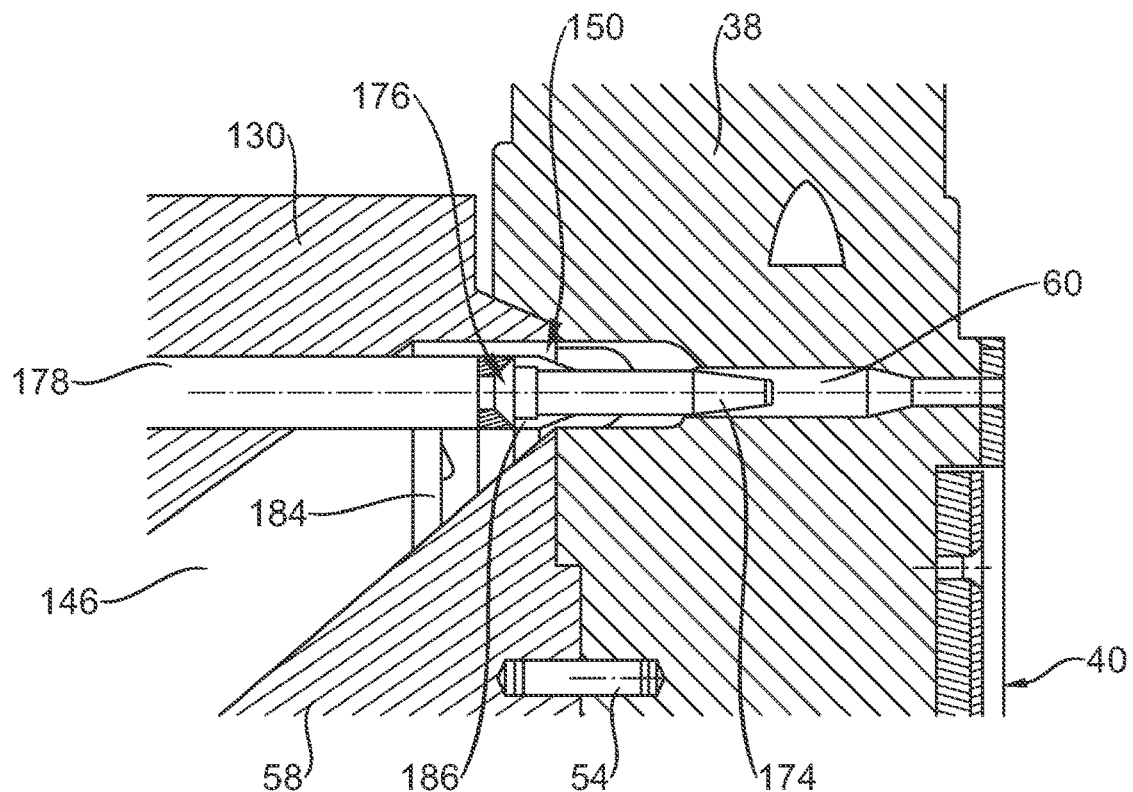

As a plurality of pins 174 are arranged on retaining ring 184 or regulating ring 186, these are moved in the direction of annular channel section 150 and in the direction of die member flow channels 60, or away from them. Pins 174 specifically allow a further reduction of the free cross-section of flow in annular channel section 150 and in particular in die member flow channels 60, so that the melt pressure in a region in the immediate vicinity of die plate 40 can be influenced in a targeted manner. The aforementioned operating states are illustrated in FIGS. 13 and 14. In FIG. 13, regulating ring 186 together with pin 174 has been moved away from die member 38, whereas in FIG. 14 the aforementioned components have been moved by the maximum amount in the direction of die member 38. As can be seen from FIG. 14, in particular, pins 174 cause die member flow channels 60 to be filled almost completely by pins 174, thus minimizing the remaining free cross-section of flow in die member flow channels 60.

Figure 15:
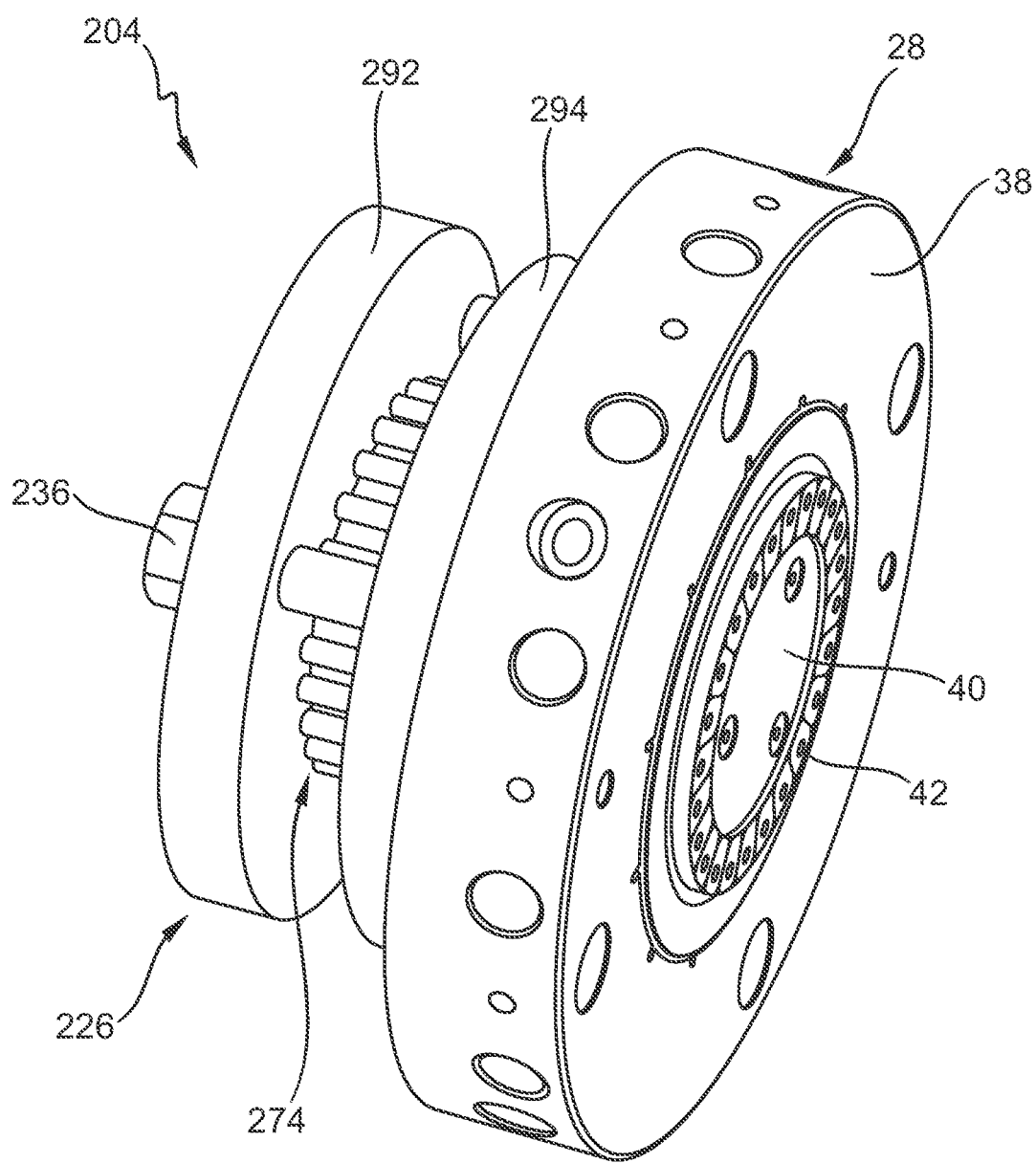
FIG. 15 shows a perspective view of a third embodiment of a die assembly according to the invention.
Figure 16:
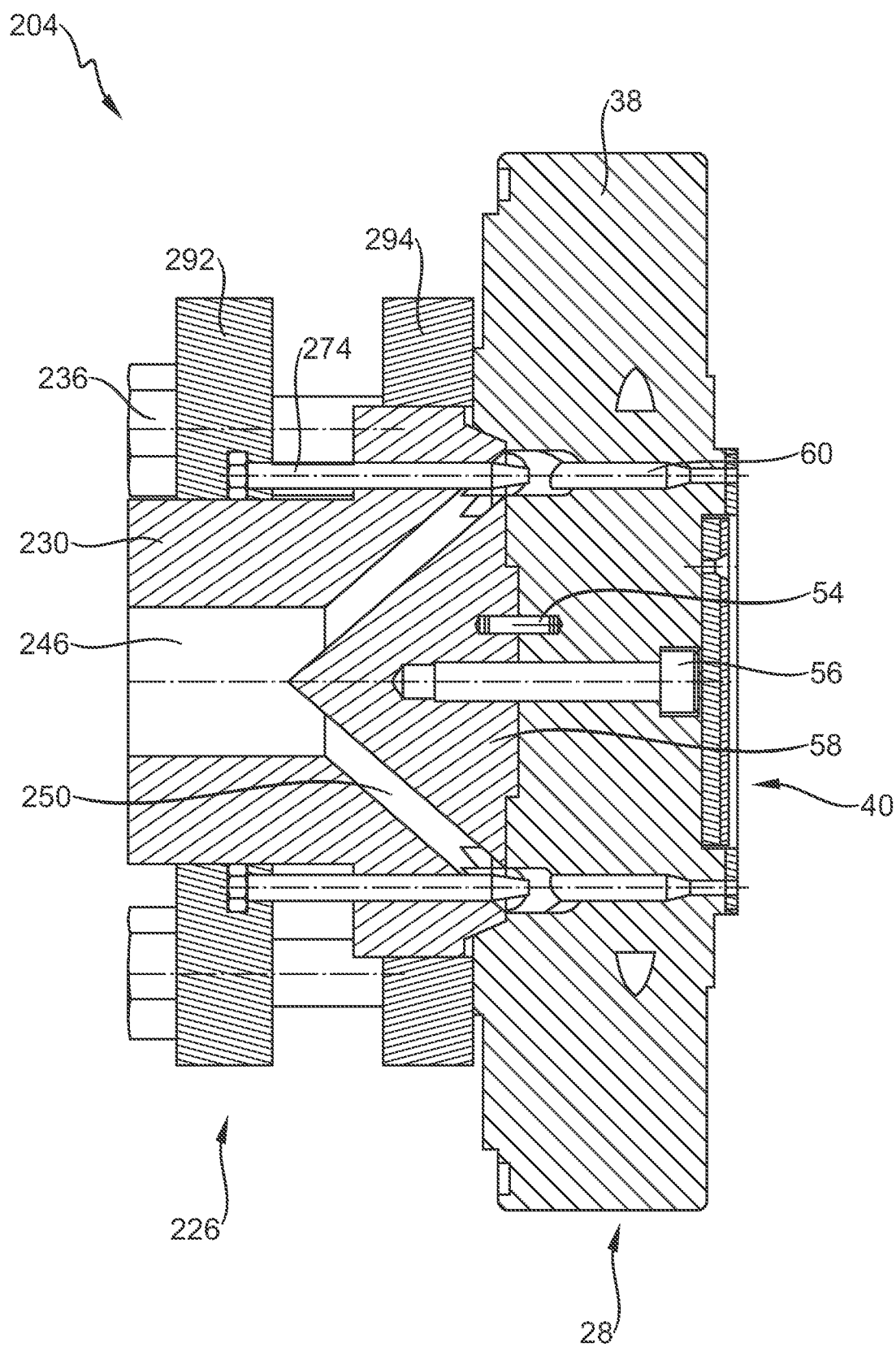
FIG. 16 shows a cross-sectional view of the embodiment of the inventive die assembly shown in FIG. 15.
Figure 17:
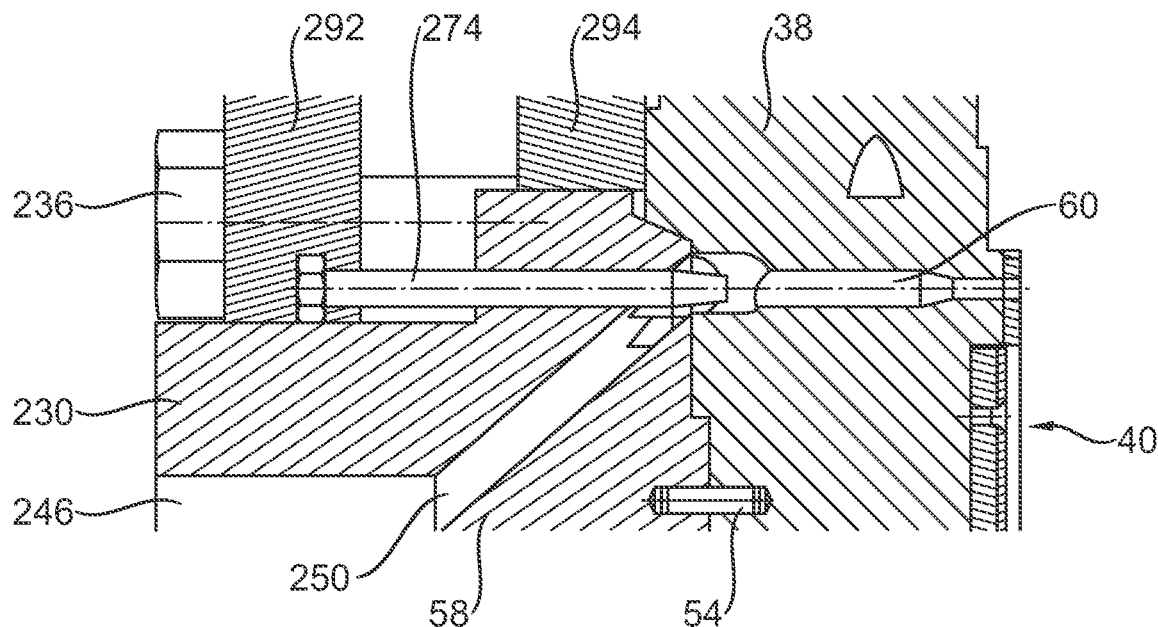
FIGS. 17, 18 show the embodiment of the inventive die assembly shown in FIG. 15, in different operating states.
Figure 18:
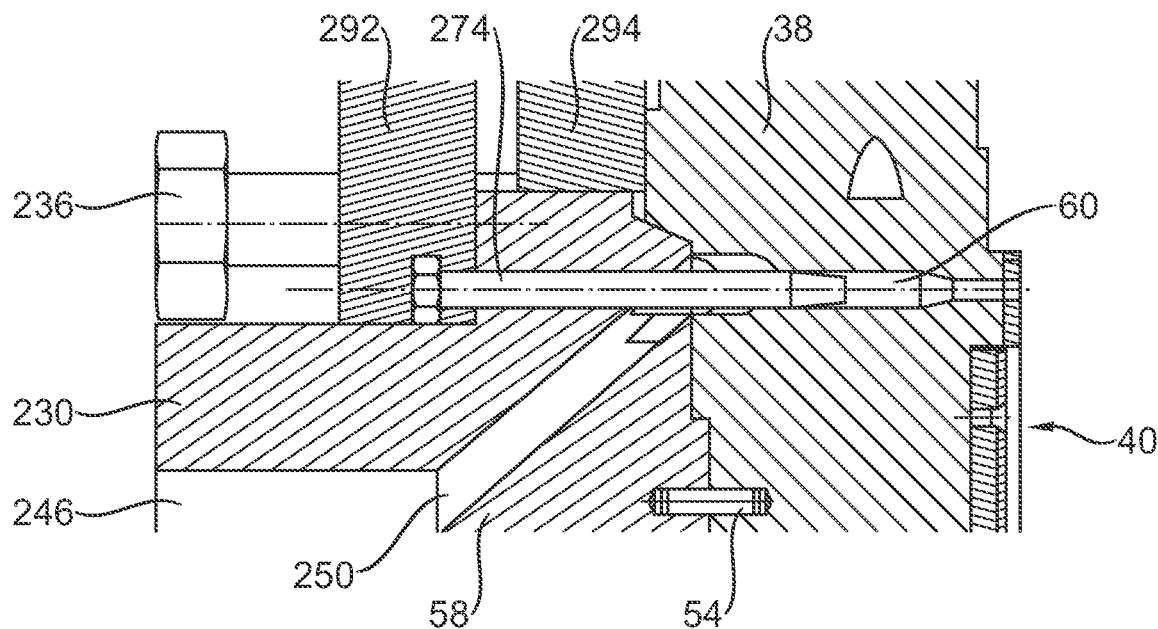

Another embodiment of a die assembly 204 is shown in FIG. 15. Die assembly 204 has a pressure regulating device 226 and a die unit 28. Die unit 28 has a die member 38 and a die plate 40 with die orifices 42. Pressure regulating device 226, which has a retaining ring 292, a connecting ring 294 and pins 274, is mounted on said die unit 28. The pressure regulating device also has an actuating nut 236. A plurality of actuating nuts 236, in particular three actuating nuts 236, are preferably provided on pressure regulating device 226.

The structure of pressure regulating device 226 can be seen from FIGS. 16 to 20. Pressure regulating device 226 has a base member 230 in which a flow channel 246 is formed. In a region between pressure regulating device 226 and die unit 28, an annular channel section 250 is formed in conjunction with guide cone 58 of die unit 28. A plurality of pins 274, which can be moved translationally in the direction of die unit 28 or away from it, project into annular channel section 250. Pins 274 are guided section-wise in base member 230 and are mounted with their head in a mounting ring 292. A translational movement of mounting ring 292 thus results in a translational movement of pins 274 as well. Mounting ring 292 is connected to base member 230 and to the connecting ring 294 by one, preferably several, actuating nuts 236.

Here, rotation of actuating nut 236 causes mounting ring 292 to move translationally in the direction of die unit 28 or away from it, depending on the direction of rotation. As pins 274 are accommodated in mounting ring 292, they are moved analogously in a translational manner. By actuating or rotating actuating nuts 236, it is thus possible to move pins 274 translationally into annular channel section 250 or into die member flow channels 60 and to move them back out of them. The different operating states of die assembly 204 can be seen from FIGS. 17 to 18. In the state shown in FIG. 17, pins 274 have been moved the maximum distance away from die member 38. This means that pins 274 extend only into the region of annular channel section 250 and slightly into die member flow channels 60. A larger free flow cross section remains in the region of annular channel section 250 and die member flow channels 60. In the state shown in FIG. 18, pins 274 have been moved translationally in the direction of die member 38 by the maximum amount. As can be seen from FIG. 18, the remaining free cross-section of flow, especially in die member flow channels 60, is now minimized.

Figure 19:
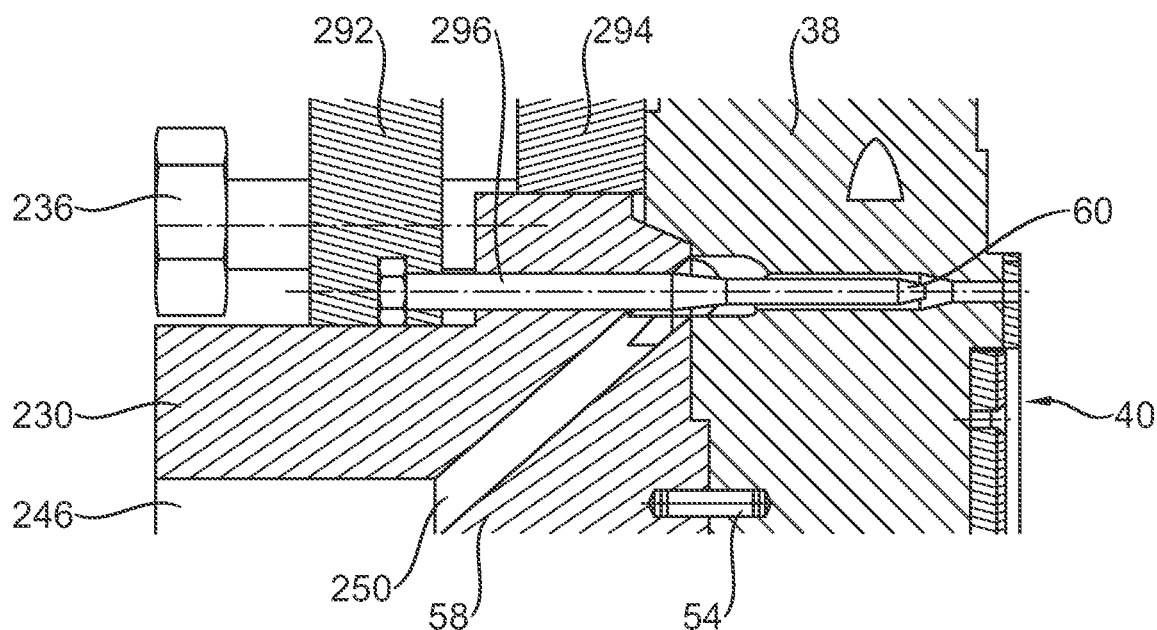
FIGS. 19, 20 show cross-sectional views of the embodiment of the inventive die assembly shown in FIG. 15, with an alternative embodiment of the pins for influencing free cross-section of flow in different operating states.
Figure 20:
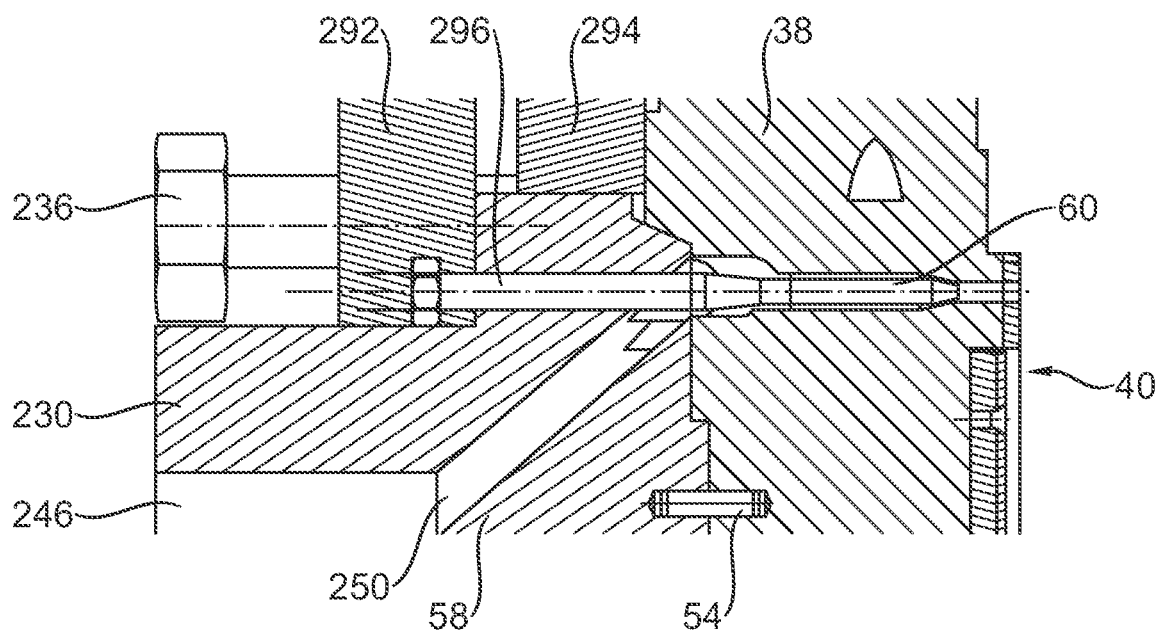

FIGS. 19 and 20 show alternative embodiments with regard to the configuration of pins 296, which are now longer compared to those in the previous embodiments. Depending on the operating state, pins 296 accordingly extend further into die member flow channels 60, in particular, as a result of which the free cross-section of flow and thus indirectly the melt pressure in the immediate vicinity of die plate 40 can be influenced.

Figure 21:
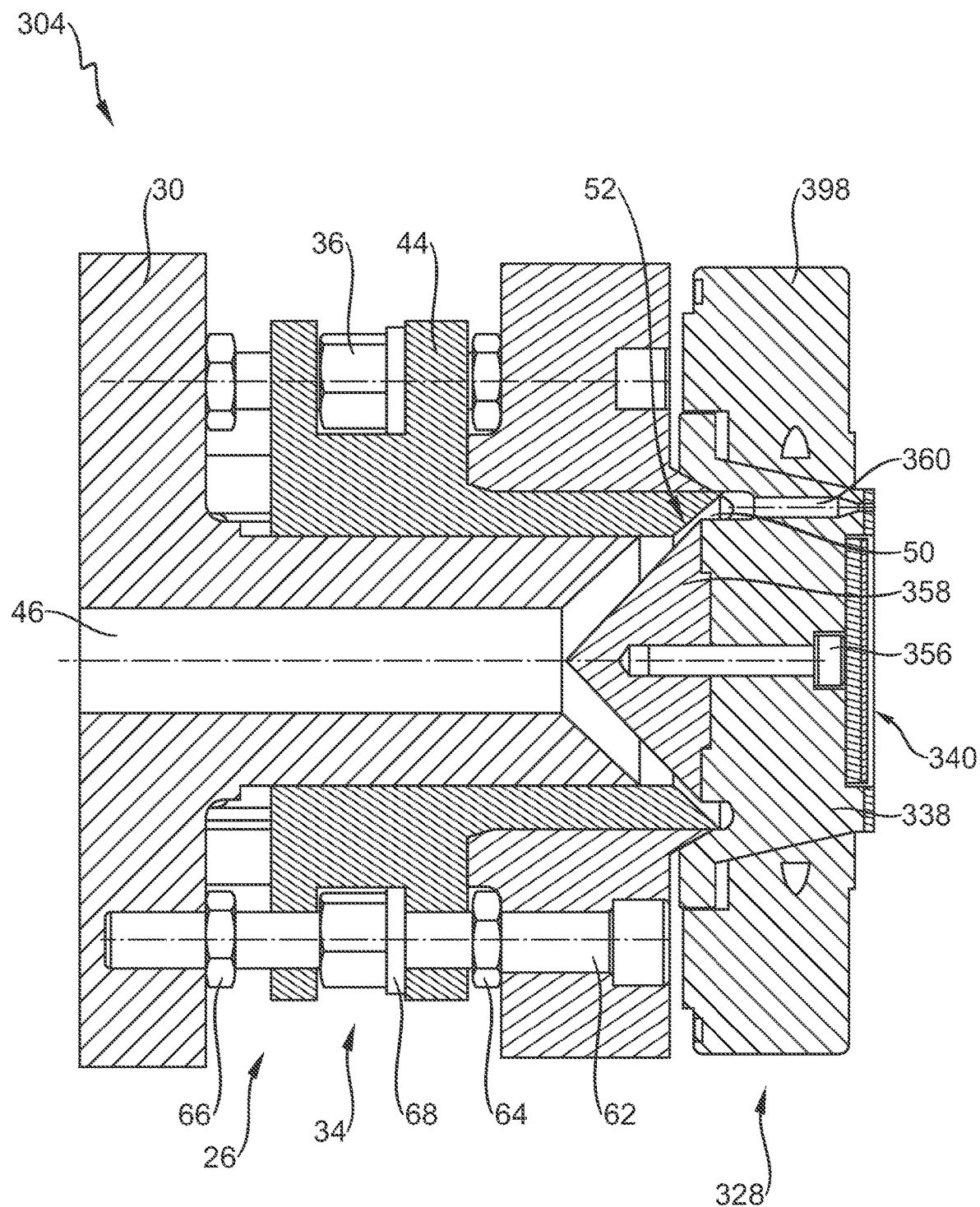
FIG. 21 shows a cross-sectional view of the first embodiment of the inventive pressure regulating device shown in FIG. 1, with an alternative embodiment of a die unit.

FIG. 21 shows a final embodiment of a die assembly 304. Die assembly 304 comprises the pressure regulator 26 shown in FIGS. 2 to 5, with an alternative embodiment of a die unit 328. A detailed description of pressure regulator 26 is dispensed with here, and reference is made to the embodiment above. The alternative embodiment of die unit 328 is characterized by a die member 338 in which die member flow channels 360 are formed in a known manner. There is also a guide cone 358 arranged on die member 338, said guide cone being mounted by means of a cone fastening screw 356 to die member 338. A heating ring 398 used to heat die unit 328 is arranged around die member 338. It can be clearly seen here that pressure regulating device 26 can be combined with many different die units 328. The die unit may be formed as a two-part die unit as described in FIG. 21, or as an integral die unit as described in FIGS. 1 to 20. The die unit can also be heated in many different ways, for example by means of an electric current, a heating fluid or by steam or the like.

Figure 22:
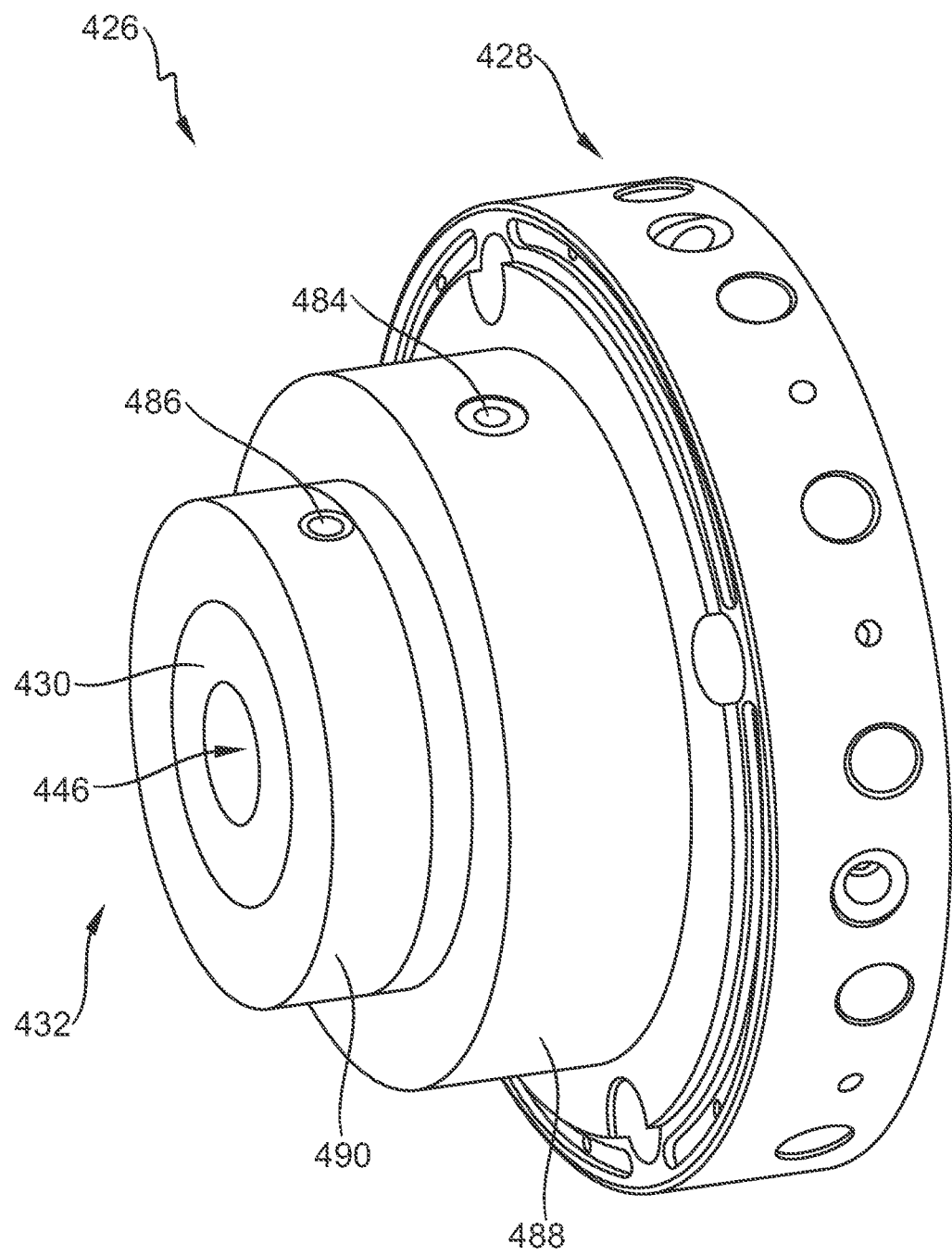
FIG. 22 shows a perspective view of another embodiment of a pressure regulating device according to the invention, with a die unit.

FIG. 22 shows a die unit 428 and a pressure regulating device 426 mounted on the die unit. Pressure regulating device 426 has a fluid inlet side 432 where fluid can enter pressure regulating device 426 via flow channel 446. Pressure regulating device 426 also has a base member 430 on which a first housing ring 488 and a second housing ring 490 are arranged. An inlet/outlet for pressurized fluid 484 is arranged in the first housing ring 488. A second inlet/outlet for pressurized fluid 486 is arranged on the second housing ring 490.

The functional principle is illustrated with reference to FIGS. 23 and 24. As can be seen from FIG. 23, the inlets and outlets for pressurized fluid 484, 486 are connected to a cylinder chamber 496 located in the second housing ring 490. A piston 494 connected to pins 474 is also arranged in cylinder chamber 496. A bellows 492 is used to seal piston 494. If pressurized fluid is now introduced into cylinder chamber 496 via the inlet/outlet for pressurized fluid 486, this causes piston 494 to be moved to the right in the plane of the drawing. Due to the direct coupling between piston 494 and pin 474, this causes pin 474 or the plurality of pins 474 to be moved at least partially into die member flow channels 460. Due to the positioning of pins 474 relative to cylinder chamber 496, the flow cross-section in die member flow channels 460 and in annular channel section 450 is regulated.

Figure 23:
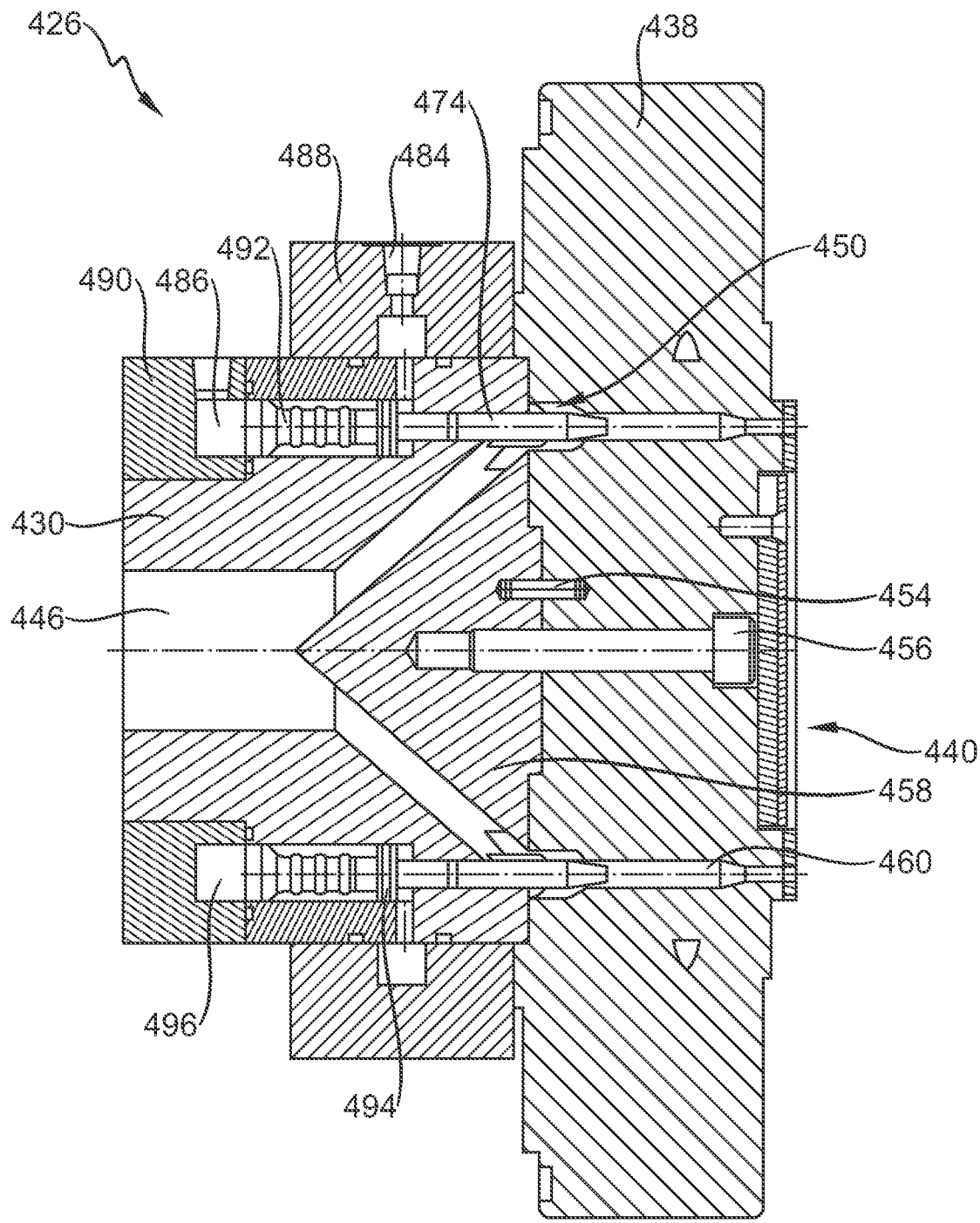
FIG. 23 shows a cross-sectional view of the embodiment of the inventive pressure regulating device shown in FIG. 22.

As shown in FIG. 23, die member 438 has a die plate 440 and is connected to a guide cone 458 by means of a cone fastening screw 456 and a centering pin 454.

Figure 24:
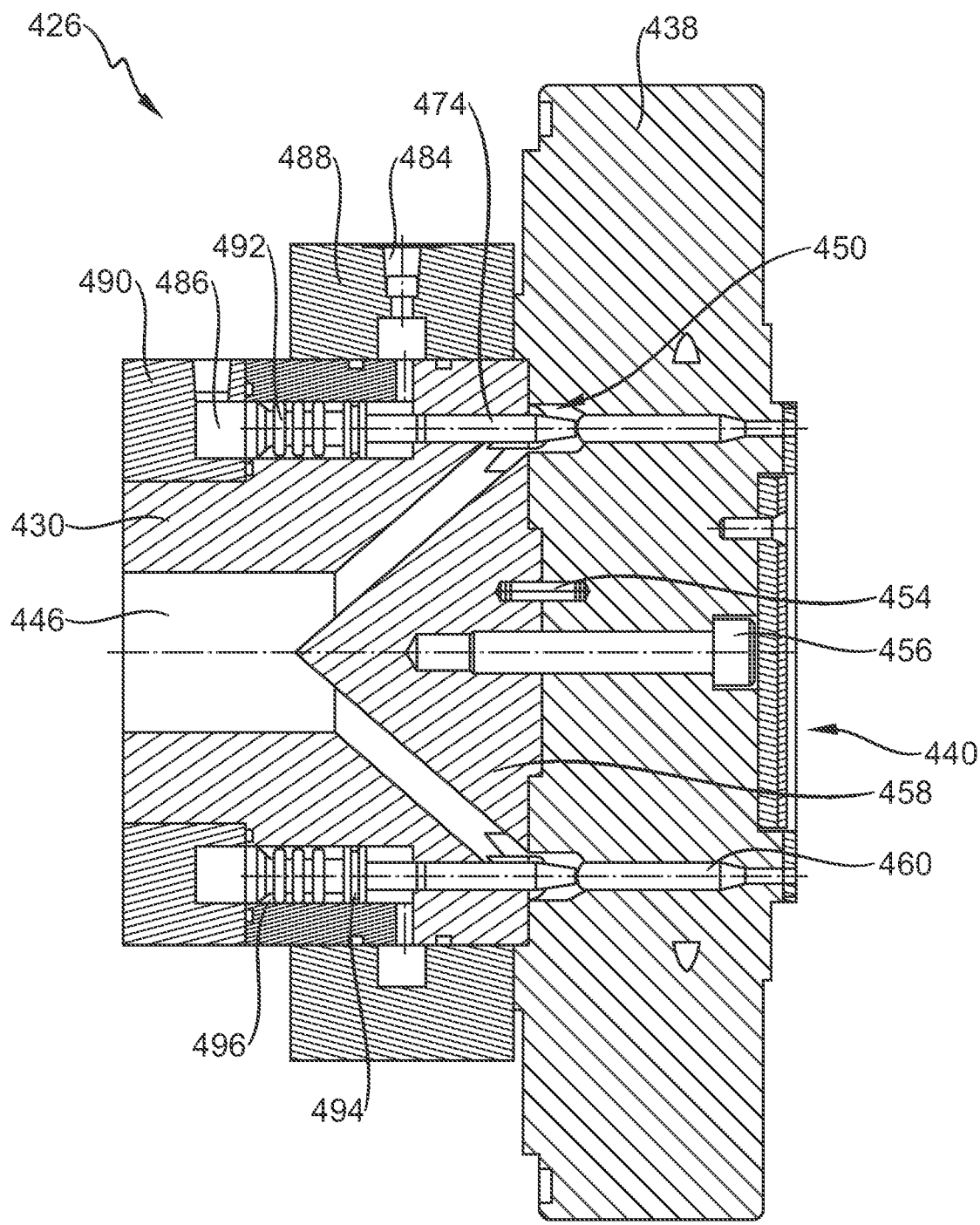
FIG. 24 shows a cross-sectional view of the embodiment of the inventive pressure regulating device shown in FIGS. 22-23, while in an alternative operating position.

FIG. 24 shows an operating state of pressure regulating device 426, in which pins 474 are in a state that narrows annular channel section 450 less than in FIG. 23. Piston 494 can be moved to the left—in the drawing plane—by introducing pressurized fluid via an inlet/outlet for pressurized fluid 484 into the cylinder chamber 496 on the side of piston 494 facing away from bellows 492. Provided that pressurized fluid can flow out of inlet/outlet 486, introducing pressurized fluid via inlet/outlet 484 causes piston 494 to move to the left in the plane of the drawing, and pins 474 coupled to piston 494 to move to the left and thus at least partially out of annular channel section 450 and die member flow channels 460.

Figure 25:
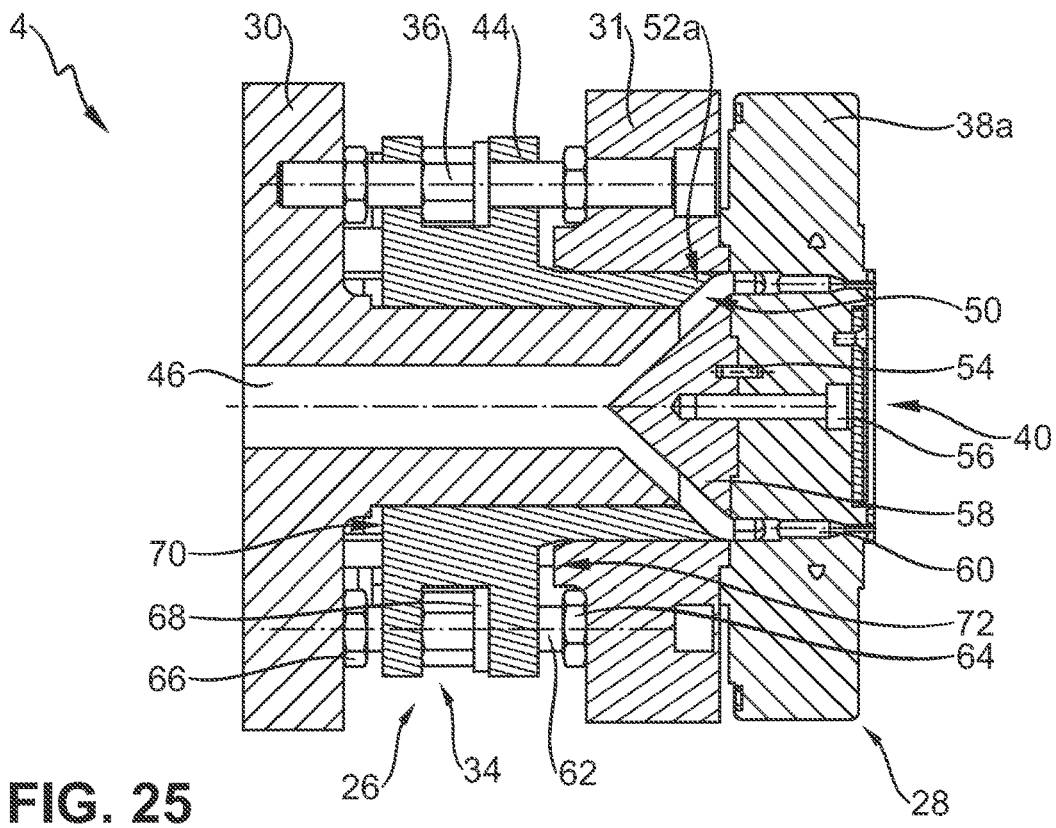
FIG. 25 shows an embodiment of an inventive pressure regulating device based on FIG. 1, with a concave regulating section.
Figure 26:
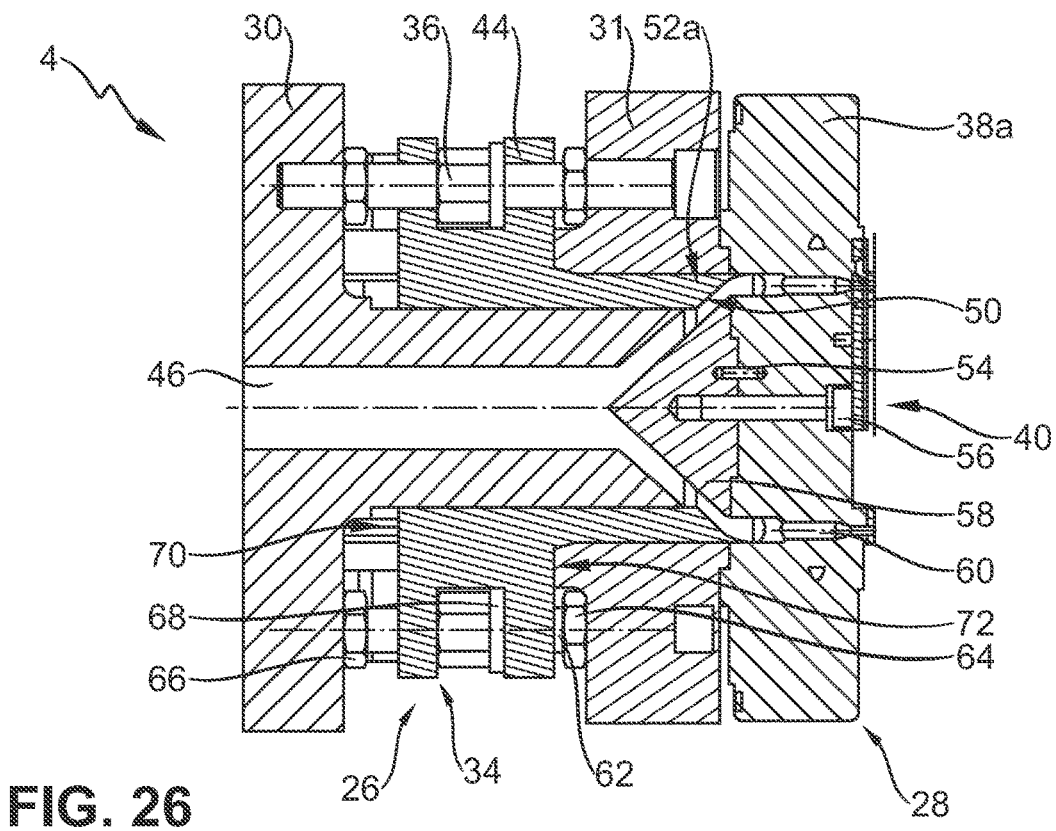
FIG. 26 shows the embodiment of an inventive pressure regulating device with a concave regulating section as shown in FIG. 25, in an alternative operating position.

FIGS. 25 and 26 show alternative embodiments of die assembly 4 already described with reference to FIGS. 4 and 5. The embodiment shown in FIGS. 25 and 26 differs specifically from the one shown in FIGS. 4-5 by the shape of regulating section 52a, which is concave in FIGS. 25 and 26, and by the shape of die member 38a, which has a convex flow channel in the region of annular channel section 50 in FIGS. 25 and 26.

Figure 27:
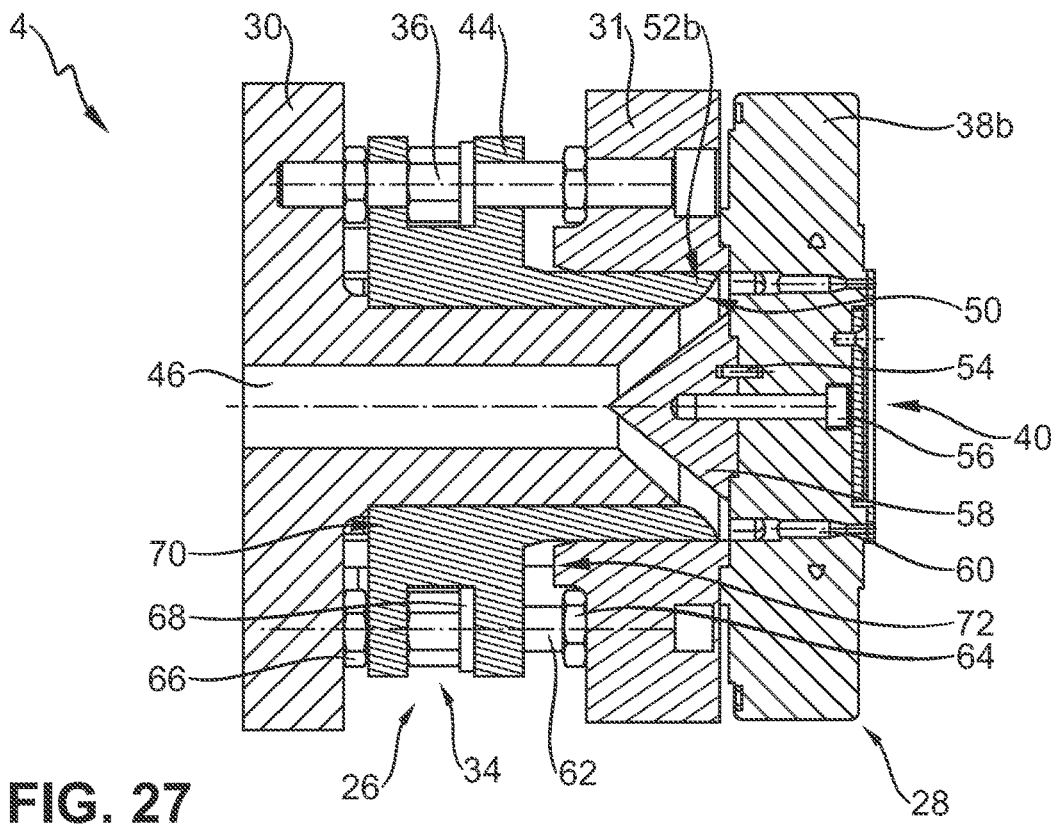
FIG. 27 shows another alternative embodiment of a pressure regulating device based on the embodiment shown in FIG. 1, with a convex regulating section.
Figure 28:
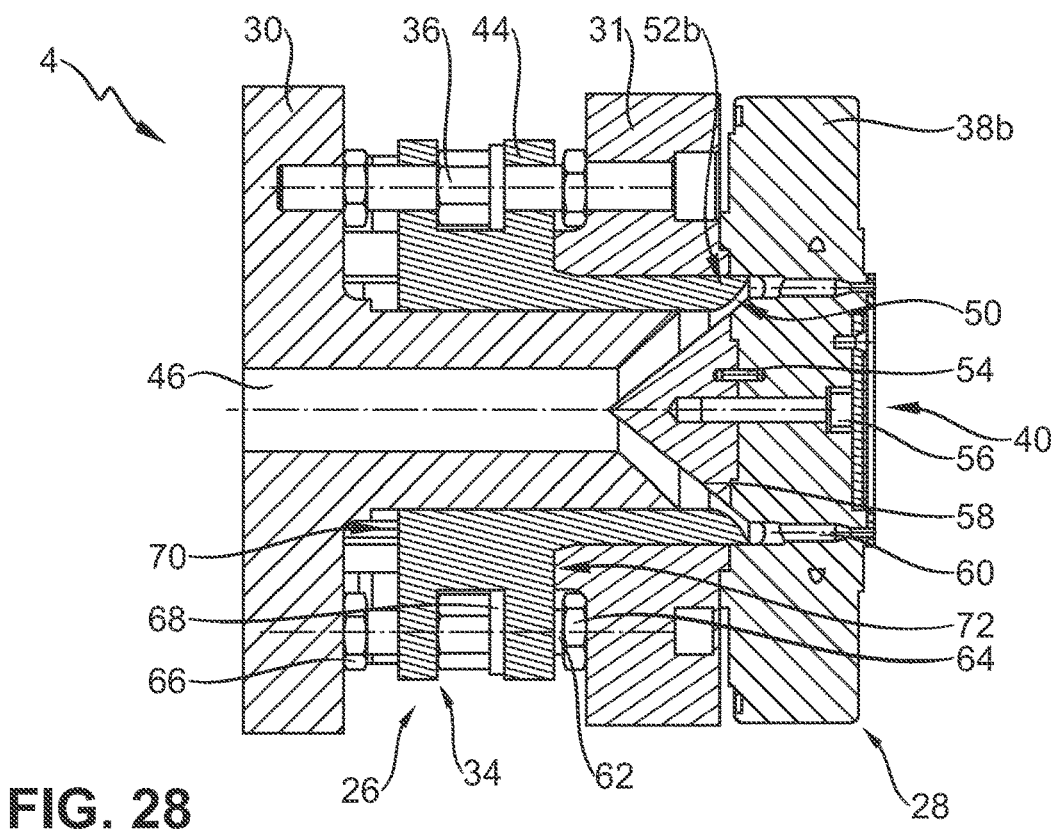
FIG. 28 shows the embodiment of the inventive pressure regulating device shown in FIG. 27, in an alternative operating position.

FIGS. 27 and 28 show another alternative embodiment of a regulating section 52b and die member 28b. In FIGS. 27 and 28, regulating section 52b is now convex in shape. In the region of regulating section 52b, die member 38b is correspondingly concave in shape. For the rest, reference is made to the description of FIGS. 4-5.

Figure 29:
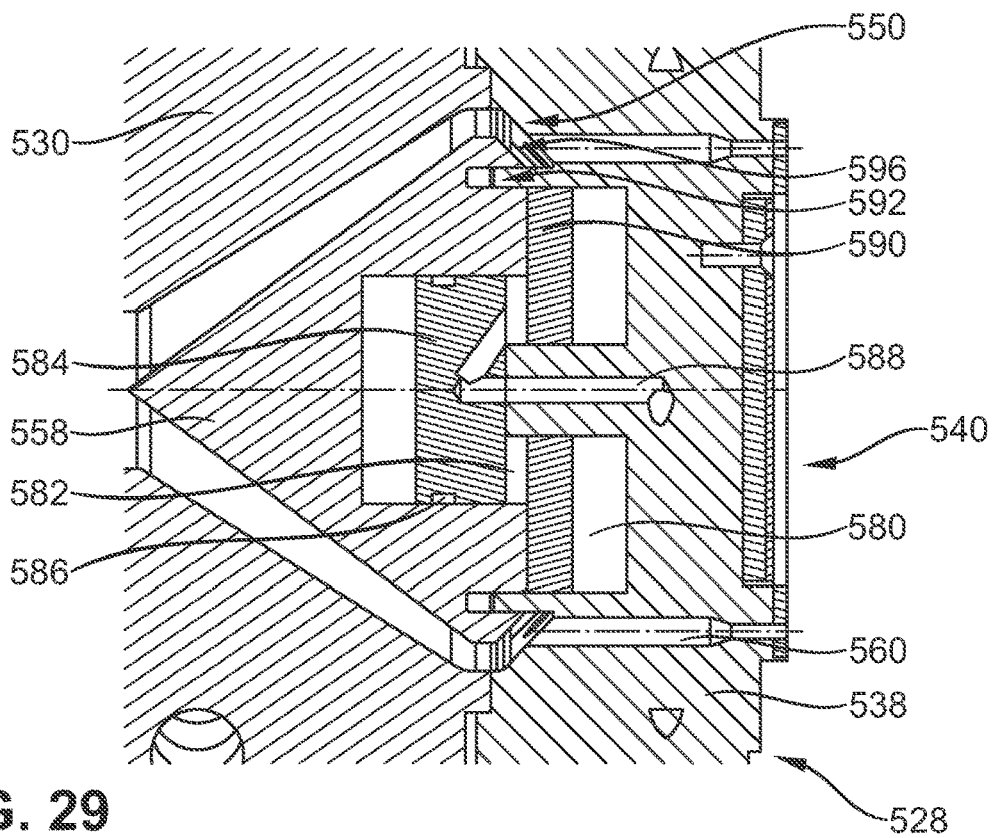
FIG. 29 shows a cross-sectional view of an alternative embodiment of a pressure regulating device according to the invention and a die unit according to the invention.
Figure 30:
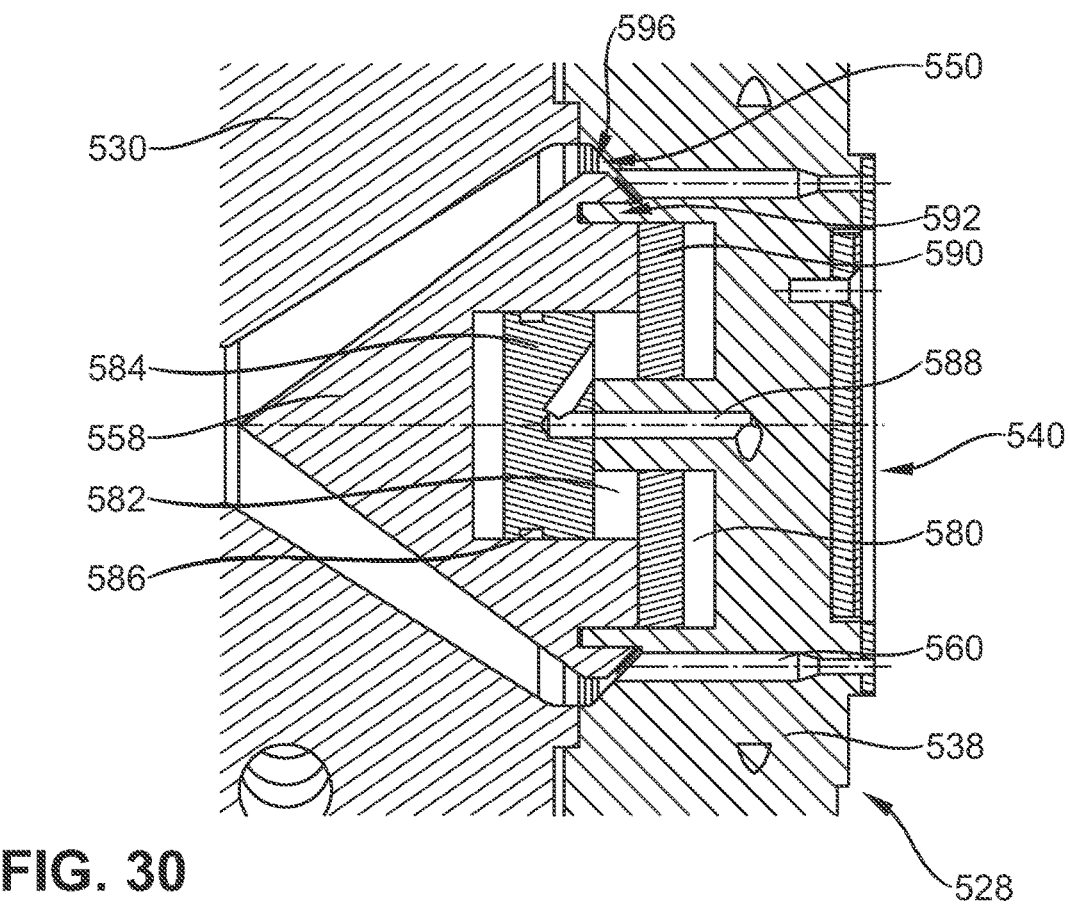
FIG. 30 shows the embodiment of an inventive pressure regulating device and a die unit according to the invention as shown in FIG. 29, in an alternative operating position.

FIGS. 29 and 30 show another alternative embodiment of a die unit 528. Die unit 528 has a die member 538 which is connected to a further member 530. In combination with an axially adjustable guide cone 558, base member 530 forms an annular channel section 550. The free cross-section of flow in annular channel 550 can be influenced by moving the axially adjustable guide cone 558 translationally relative to base member 530. Guide cone 558 is axially adjusted as follows: The axially adjustable guide cone 558 is initially guided in a translationally movable manner relative to die member 538 by means of a conical guide 592. Guide cone 558 is adjusted fluidically here. To that end, die member 538 is configured in such a way that it forms a first pressure chamber 580 in combination with a pressure chamber ring 590. If pressurized fluid is introduced into the first pressure chamber 580, the axially adjustable guide cone 558 is thus moved to the left in the plane of the drawing.

A second pressure chamber 582 which is sealed against a distributor section 854 by means of a sealing ring 586 is also formed in guide cone 558. If pressurized fluid is now introduced into the second pressure chamber 582 by means of inlet/outlet 588, this results in the axially adjustable guide cone 558 moving to the right in the plane of the drawing, and in the free cross-section of flow being reduced in the region of annular channel section 550. In the same way, introducing pressurized fluid into the first pressure chamber 580 causes the axially adjustable guide cone 558 to move to the right in the plane of the drawing. The result is that the free cross-section of flow is increased in the region of annular channel section 550. Cone 558 has a trapezoidal section 596 on its side facing annular channel section 550, for influencing the cross-section of flow in annular channel section 550.

Figure 31:
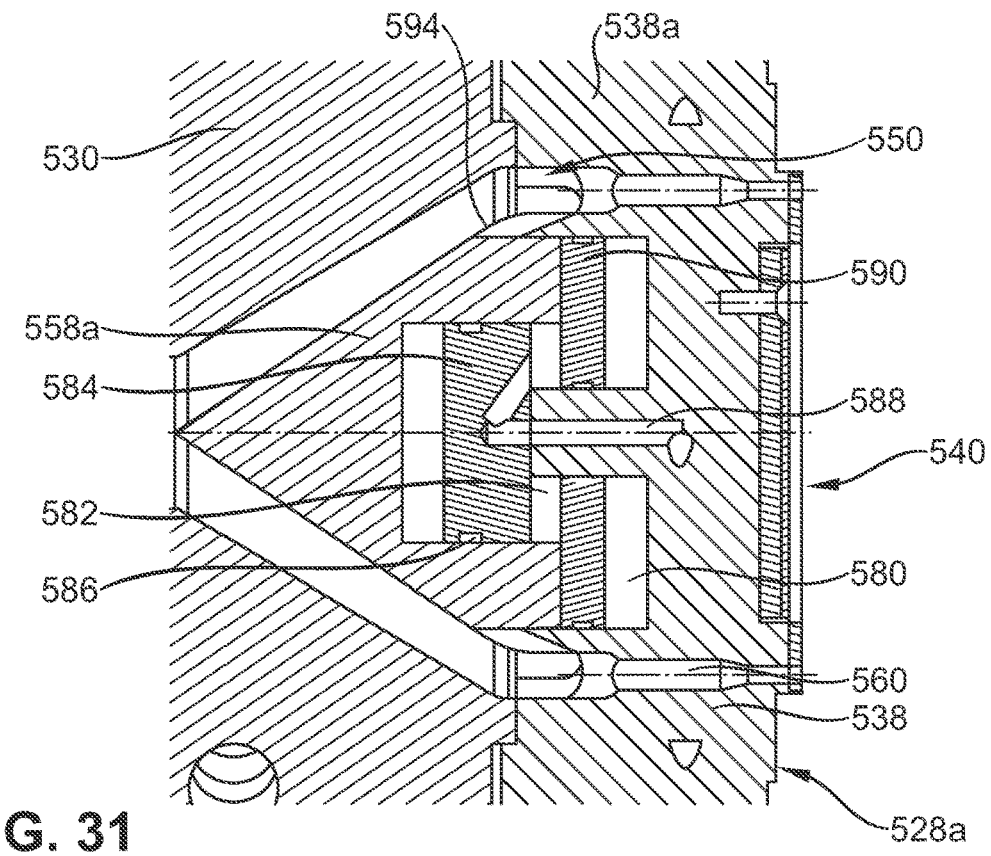
FIG. 31 shows a cross-sectional view of another alternative embodiment of a pressure regulating device according to the invention and a die unit according to the invention.
Figure 32:
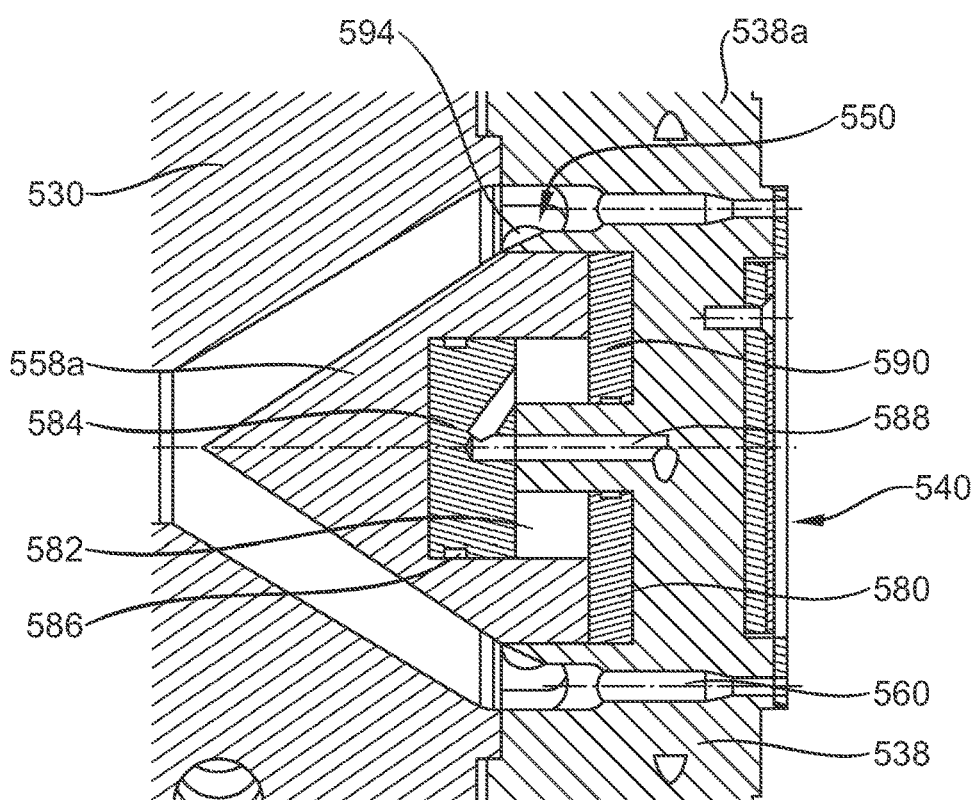
FIG. 32 shows the embodiment shown in FIG. 31, in an alternative operating position.

An alternative embodiment of a die unit 528a, which likewise implements the basic principle of an axially adjustable guide cone 558a, is shown in FIGS. 31 and 32. A bellows 594 is arranged between the axially adjustable guide cone 558a and die unit 538a. If the axially adjustable guide cone is in an extended state, as shown in FIG. 31, in which the axially adjustable guide cone 558a has been moved to the left in the plane of the drawing, bellows 594 rests tightly against a transition area between the axially adjustable guide cone 558a and die unit 538a. This means that the free flow cross-section of annular channel section 550 is not constricted by bellows 594.

In the state shown in FIG. 32, however, the axially adjustable guide cone 558a is in a retracted state, i.e., it is moved to the right in the plane of the drawing, in comparison with FIG. 31. If the axially adjustable guide cone 558a is in the respective state, bellows 594 is compressed, which causes it to arch into the region of the annular channel section. This in turn causes a reduction in the free cross-section of flow in the region of annular channel section 550.

The free cross-section of flow in the region between base member 530 and the axially adjustable guide cone 558a is additionally adjusted by moving guide cone 558a translationally relative to base member 530.

Figure 33:
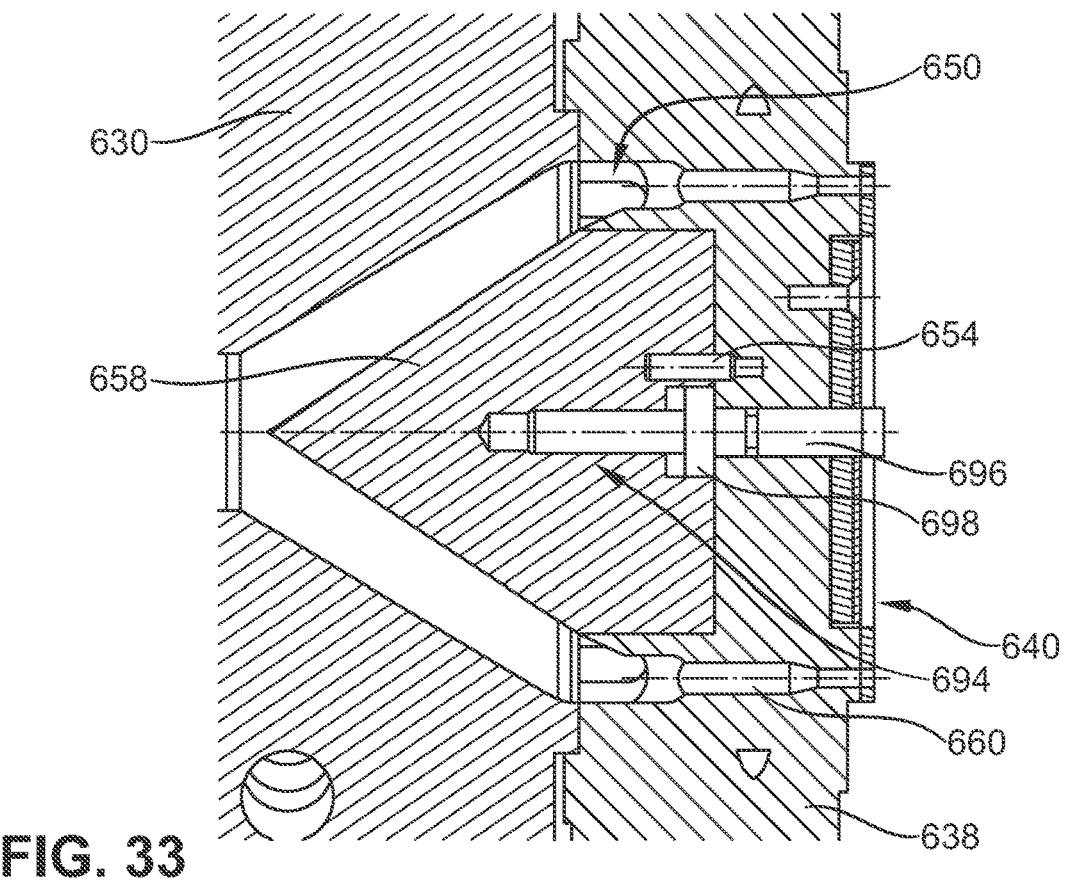
FIG. 33 shows a cross-sectional view of another alternative embodiment of a pressure regulating device according to the invention and a die unit.
Figure 34:
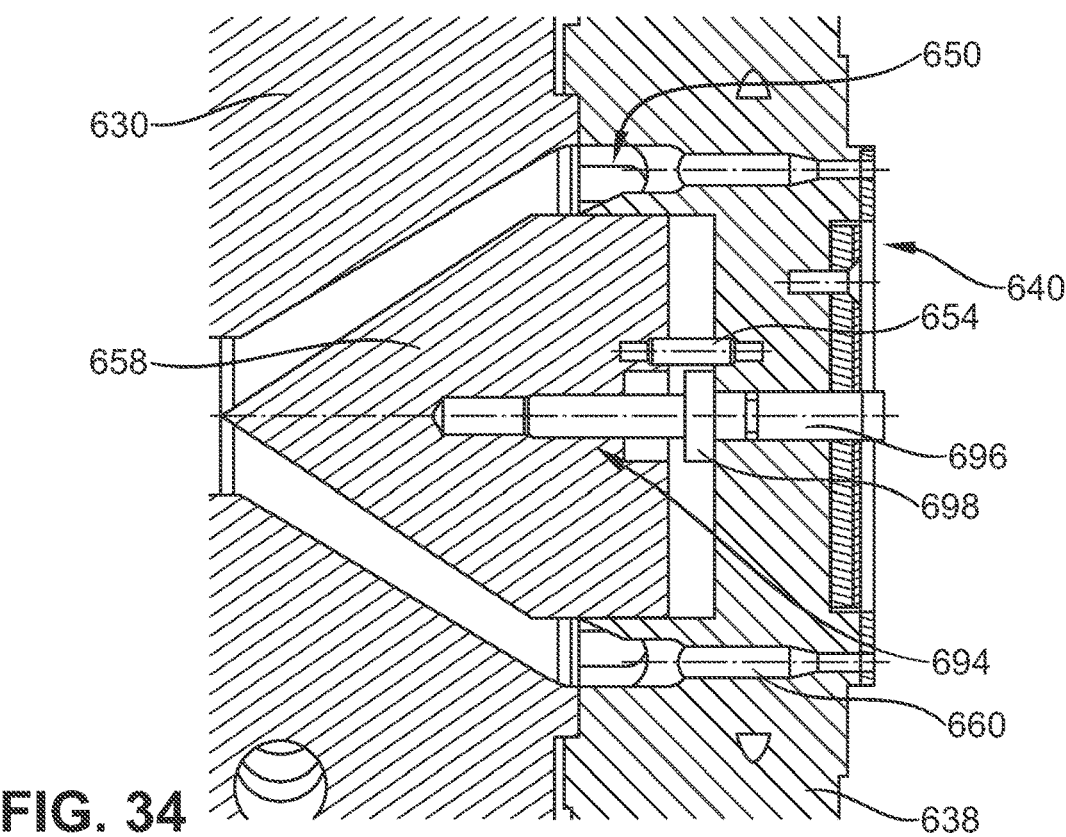
FIG. 34 shows the embodiment shown in FIG. 33, in an alternative operating position.

An alternative mechanical adjusting device for axially adjusting a guide cone 658 is shown in FIGS. 33 and 34. Guide cone 658 is initially guided in an axially adjustable manner inside die member 638. In the region of its longitudinal axis, die member 638 has a bore into which a set screw 696 is inserted. Set screw 696 can be actuated from outside the device, in particular from the die plate 640 side. A nut 698 is fitted on set screw 696. The axially adjustable guide cone 658 also has a bore arranged in the region of its longitudinal axis, which bore has an internal thread in which an external thread applied to set screw 696 can engage. Rotatability of the axially adjustable guide cone 658 is inhibited by a centering pin 654, so any rotation of set screw 696 results in the axially adjustable guide cone undergoing a translational movement in the axial direction, depending on the direction of rotation. The flow cross-section between guide cone 658 and base member 630 is influenced by the axial position of guide cone 658.

Figure 35:
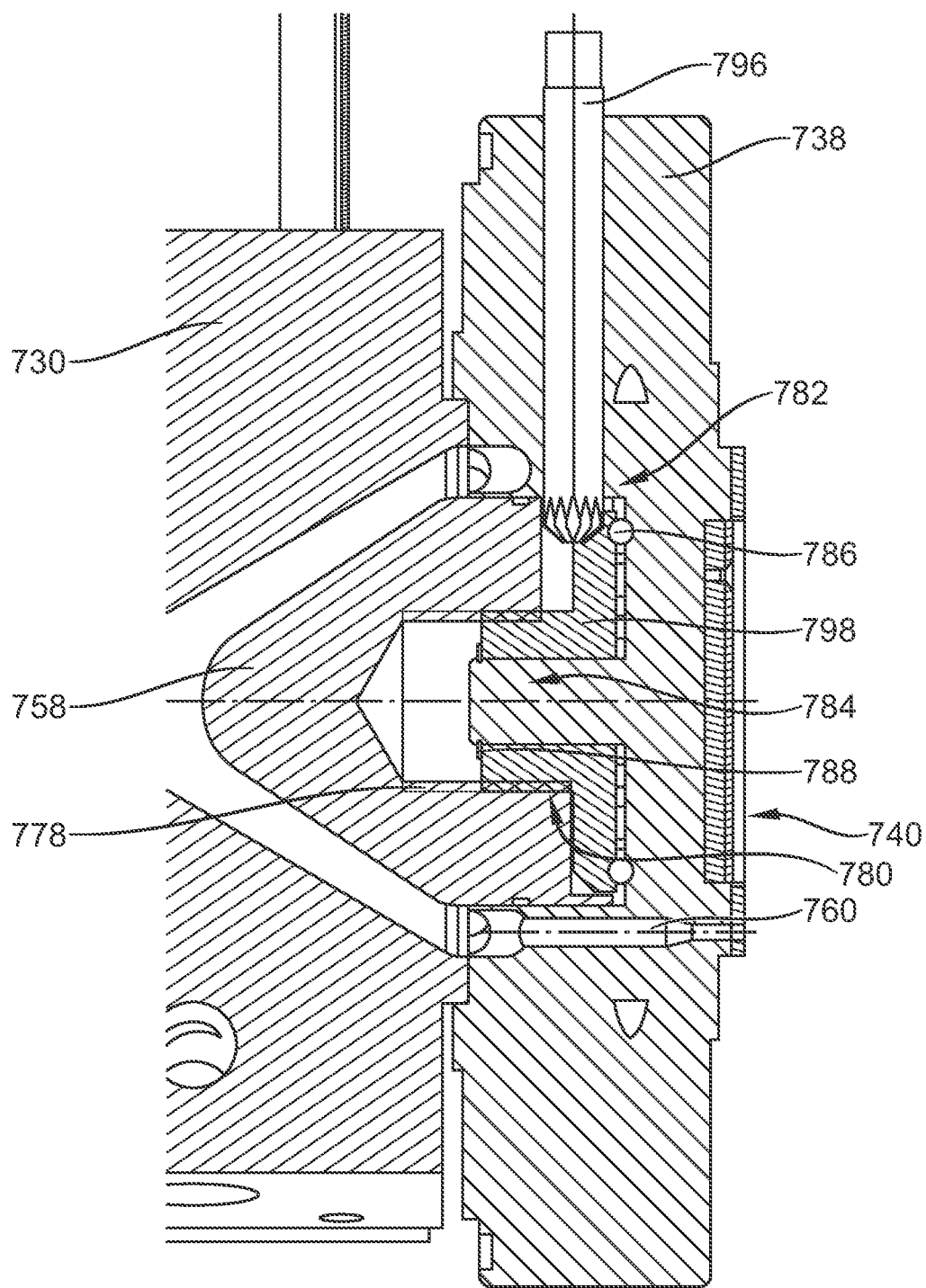
FIG. 35 shows a cross-sectional view of another alternative embodiment of a pressure regulating device according to the invention and a die unit according to the invention.
Figure 36:
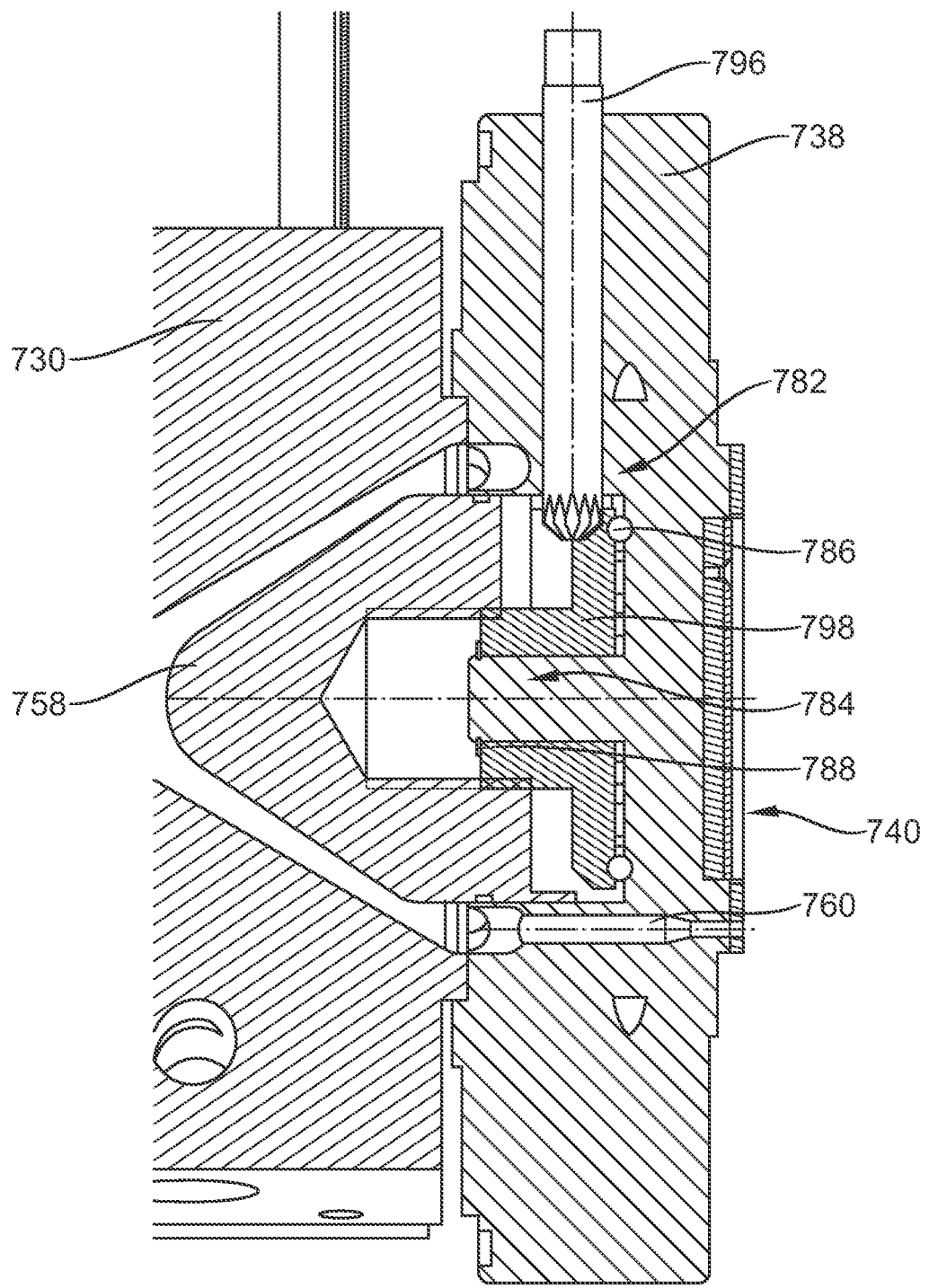
FIG. 36 shows the embodiment shown in FIG. 35, in an alternative operating position.

FIGS. 35 and 36 show a further embodiment in which mechanical axial adjustment of a guide cone 758 is likewise performed. However, the respective adjusting element or adjusting pin 796 is no longer in the region of a die plate 740, but extends radially outwards from a die member 738. To that end, valve pin 796 is arranged in a radial recess in die member 738. On its inwardly facing side, adjusting pin 796 has a gear section 782, in combination with a rotating body 798. By means of gear section 782, a rotational movement of valve pin 796 is transferred to rotating member 798 in such a way that the latter can now be rotated about an pivot axis that corresponds substantially to the longitudinal axis of die member 738. Rotating member 798 is guided by means of a ball bearing 786. The position of rotating member 798 on a receiving portion 784 of die member 738 is fixed, in addition, by a lock ring 788. An external thread 780 which engages with a guide cone internal thread 778 is also provided on some regions of rotating member 798. This has the effect that any rotational movement of rotating member 798 will change the axial position of the axially adjustable guide cone 758. This change in position of the axially adjustable guide cone 758 will in turn cause a change in the flow cross-section between base member 730 and the axially adjustable guide cone 758.

Figure 37:
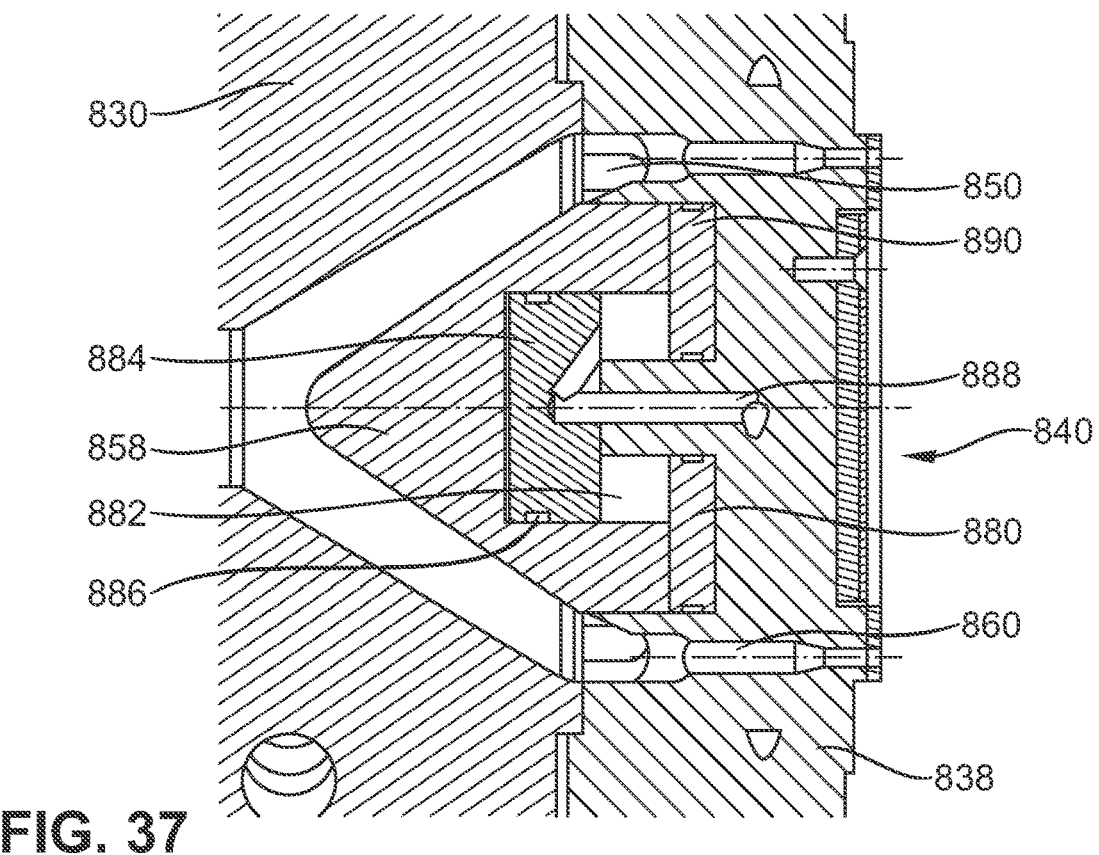
FIG. 37 shows a cross-sectional view of another alternative embodiment of a pressure regulating device according to the invention and an alternative die unit.
Figure 38:
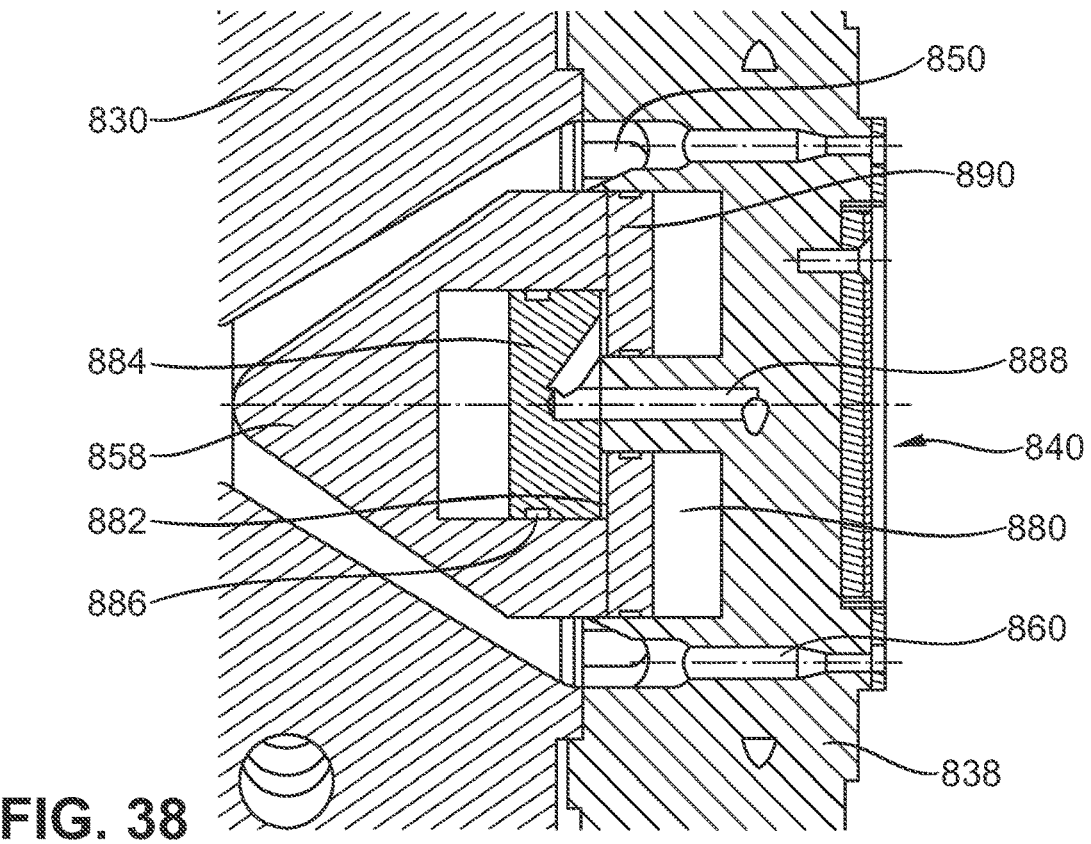
FIG. 38 shows the embodiment shown in FIG. 37, in an alternative operating position.

Another alternative embodiment of a guide cone 858 that is fluidically adjustable in the axial direction is shown in FIGS. 37 and 38. The axially adjustable guide cone 858 is mounted axially movably in a die member 838 and is axially adjustable by means of fluid which can be introduced into a first pressure chamber 880 and a second pressure chamber 882. Axial adjustment of guide cone 858 causes a change in the flow channel between a base member 830 and the axially adjustable guide cone 858. The free cross-section of flow in annular channel section 850 is not changed by axial adjustment of guide cone 858.

Figure 39:
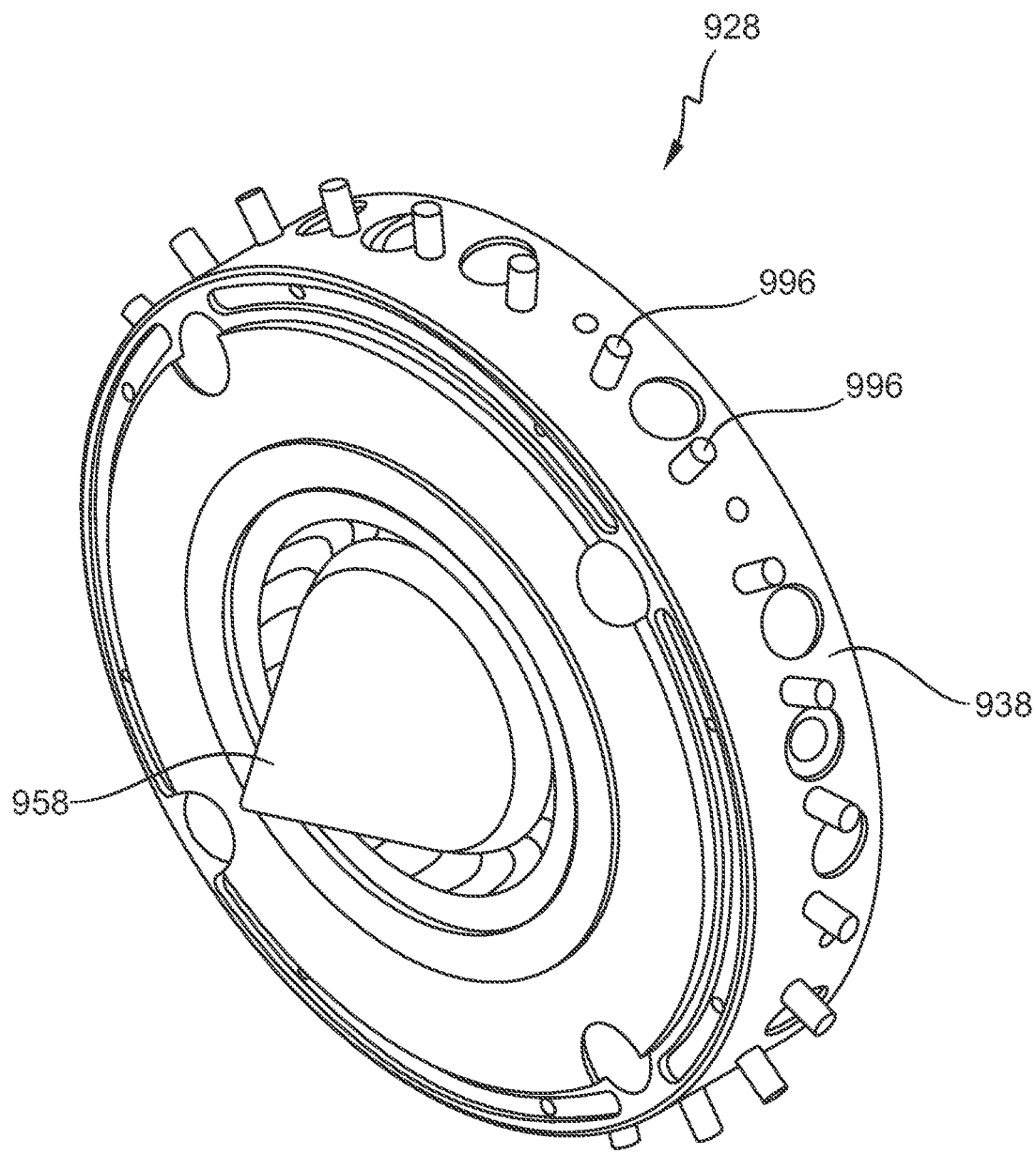
FIG. 39 shows a perspective view of an alternative embodiment of a die unit according to the invention, with a pressure regulating device integrated therein.
Figure 40:
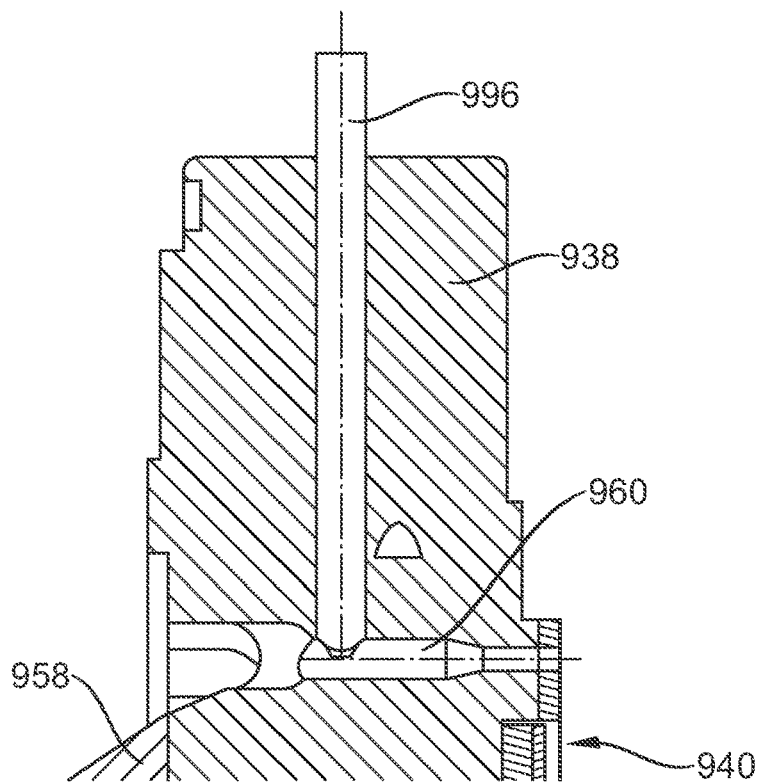
FIGS. 40, 41 show partial cross-sectional views of the inventive die unit with pressure regulating device, in different operating positions.
Figure 41:
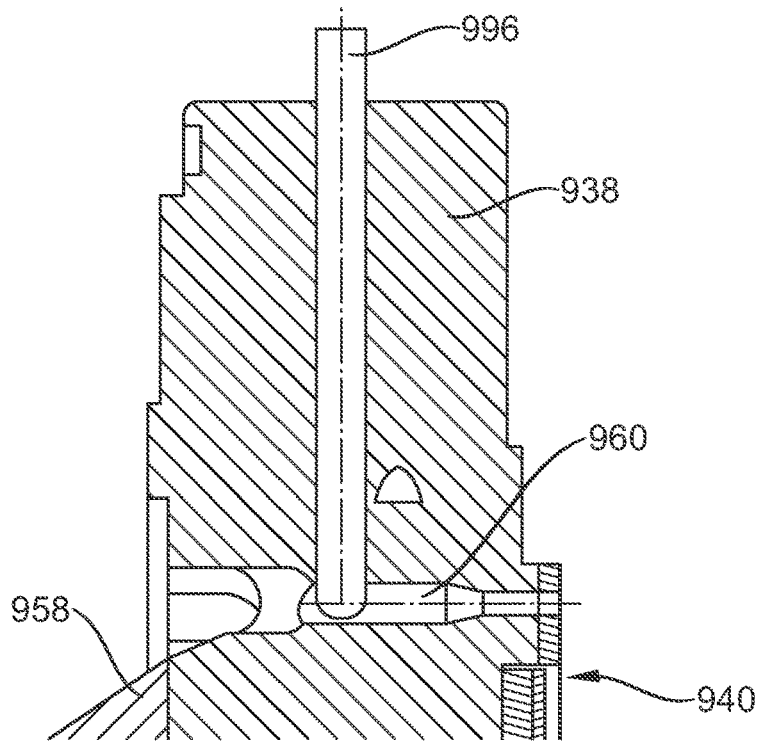

FIG. 39 shows a die unit 928 which has a die member 938 in which throttle pins 996 extend radially inwards. A guide cone 958 is arranged on die member 938. FIGS. 40 and 41 show sectional views of a region in die member 938. Die member flow channels 960 extend here through die member 938. These channels conduct fluid from a flow channel 960 adjacent guide cone 958 to die plate 940. Throttle pins 996 are arranged in die member 938 to regulate the free cross-section of flow in die member flow channels 960. These throttle pins 996 can be actuated from outside die member 938 and restrict the free cross-section of flow of die member flow channels 960 depending on how far throttle pins 996 are inserted into die member flow channels 960. In the state shown in FIG. 40, throttle pin 996 restricts die member flow channel 960 only partially. In the state shown in FIG. 41, throttle pin 996 is inserted almost completely into die member flow channel 960 and restricts it almost completely.

Figure 42:
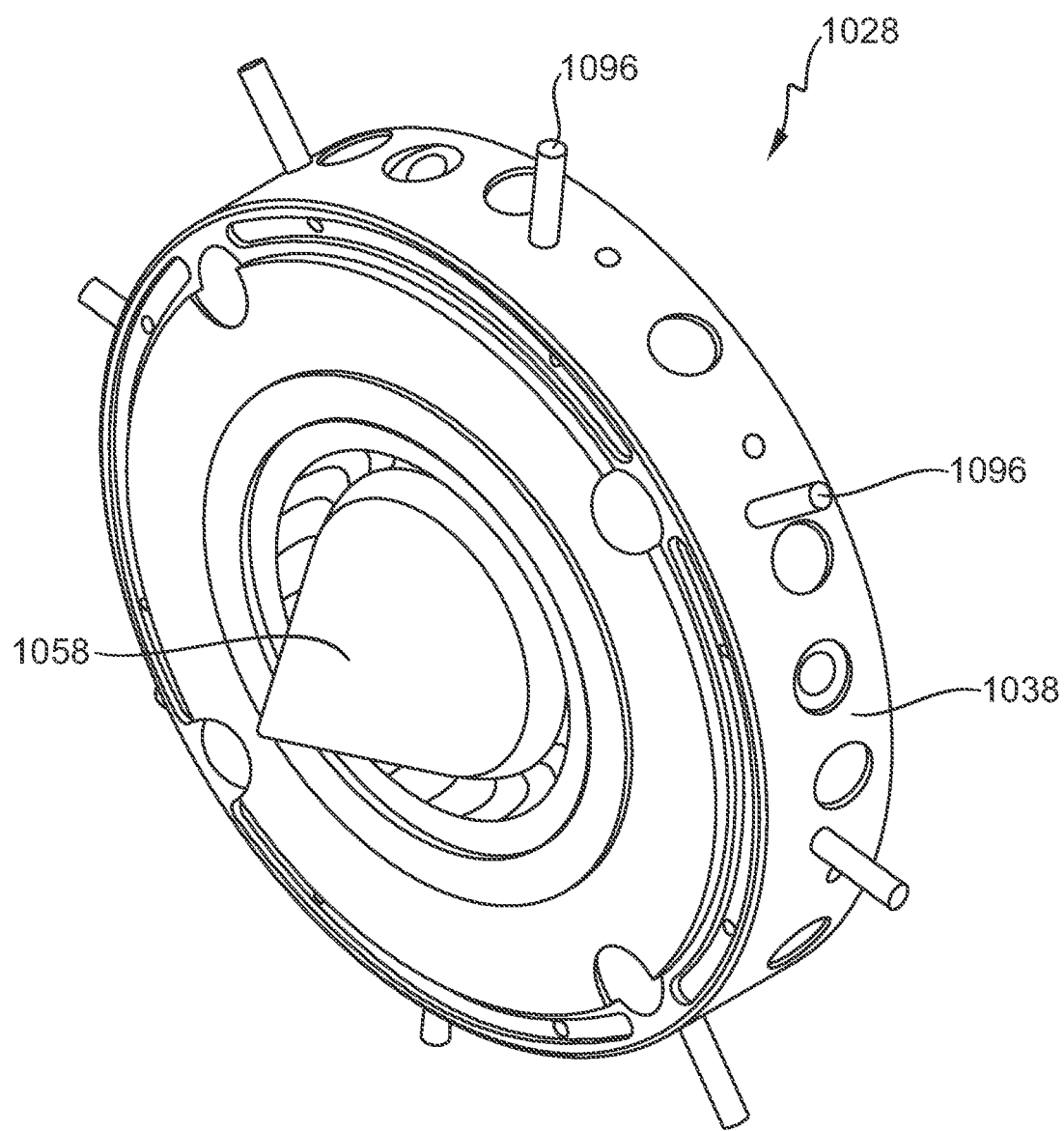
FIG. 42 shows a perspective view of another alternative embodiment of a pressure regulating device according to the invention, integrated in a die unit.

Another alternative embodiment of a die unit 1028 is shown in FIG. 42. Die unit 1028 again has a die member 1038 in which slider rods 1096 are inserted. A guide cone 1058 is also arranged on die member 1038.

Figure 43:
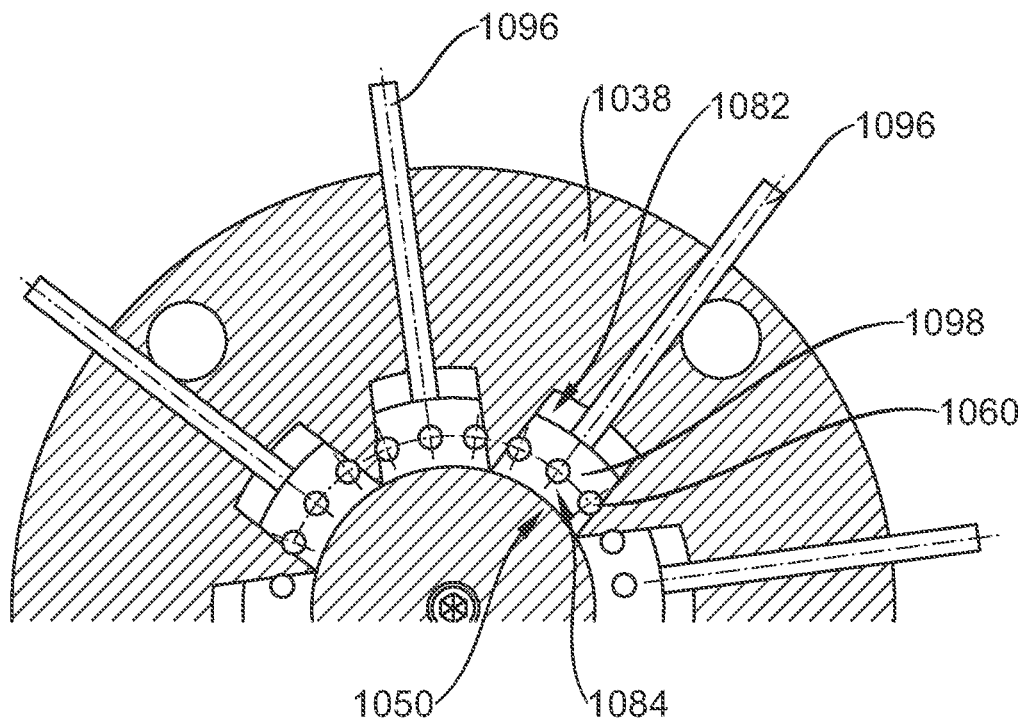
FIGS. 43, 44 show the inventive die unit and pressure regulating device as shown in FIG. 42, in different operating positions.
Figure 44:
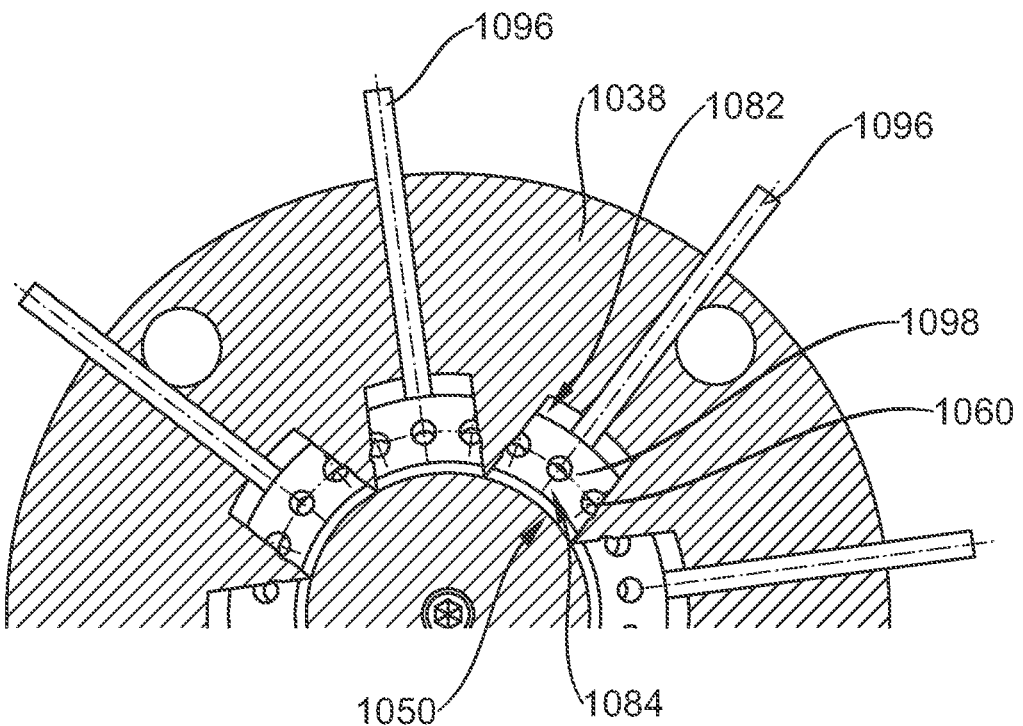
Figure 45:
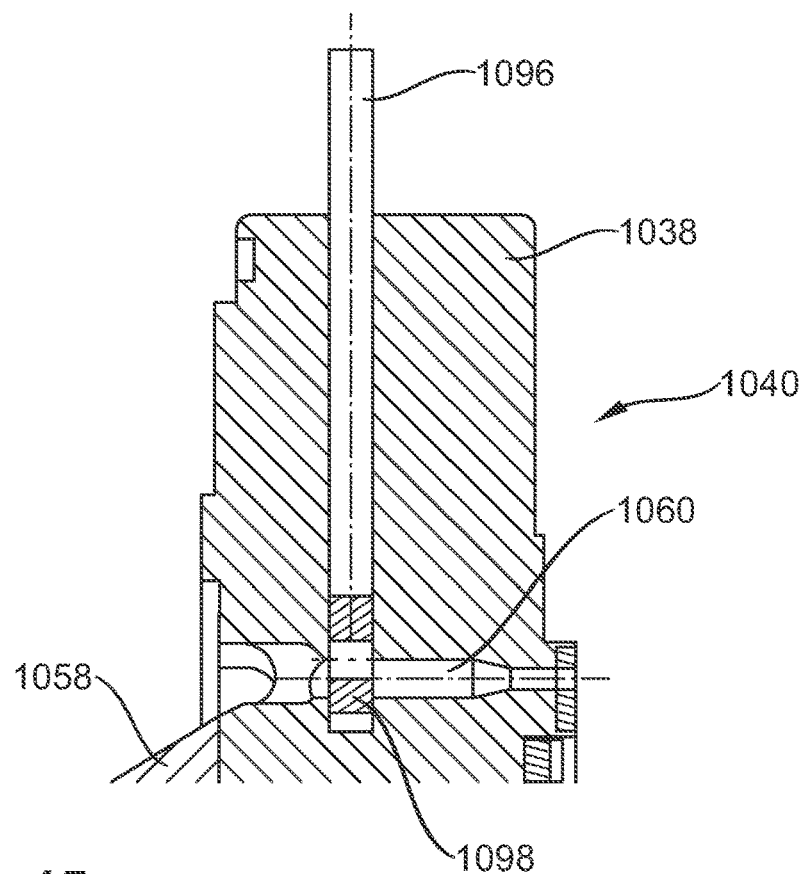
FIG. 45 shows another cross-sectional view of the embodiment of the inventive pressure regulating device integrated in a die unit as shown in FIGS. 42-44.

The manner of operation of die unit 1028 can be seen in FIGS. 43-45. As shown in FIGS. 43 and 44, slider rods 1096 are coupled to slider elements 1098. These slider elements 1098 have slider bores 1084 and are movably arranged inside a slider chamber 1082. In the operating state shown in FIG. 43, slider bores 1084 are arranged so that they overlap die member flow channels 1060. This means that slider elements 1098 do not influence or only slightly influence the free cross-section of flow of die member flow channels 1060.

In the state shown in FIG. 44, slider element 1098 has now been moved with the aid of slider rods 1096 in such a way that slider bores 1084 only partially overlap die member flow channels 1060. The free cross-section of flow is thus influenced by positioning slider elements 1098. FIG. 45 shows the state shown in FIG. 44 in an alternative cross-sectional plane. It can be seen here also that die member flow channels 1060 are locally restricted by the position of slider element 1098, such that the free cross-section of flow is influenced.

Figure 46:
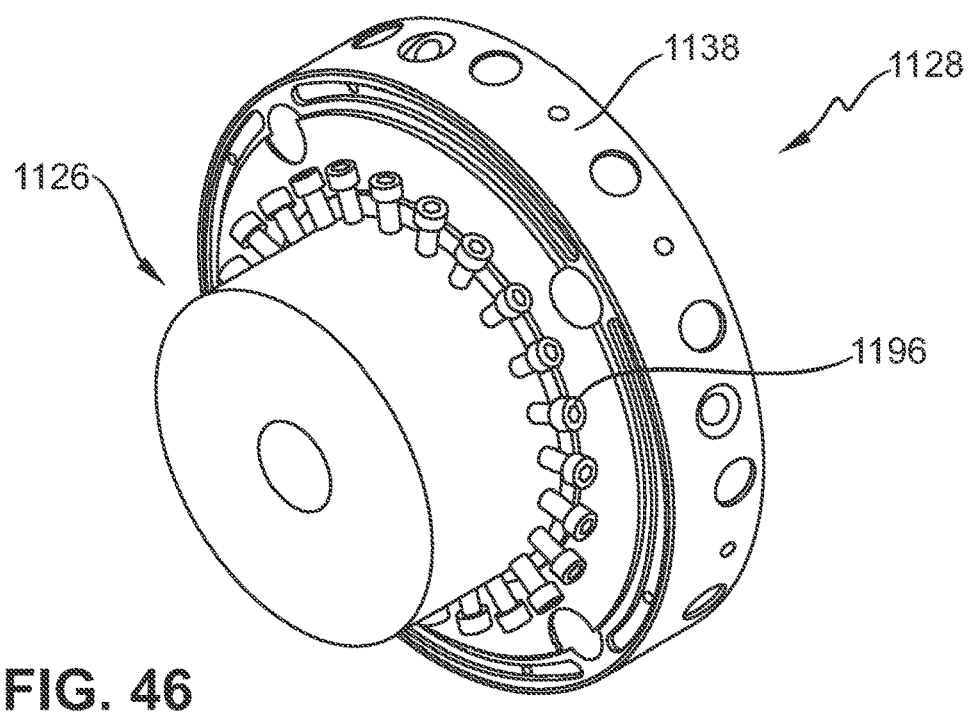
FIG. 46 shows a perspective view of another embodiment of a pressure regulating device according to the invention, with a die unit.

Another alternative embodiment is shown in FIGS. 46-50. Referring now to FIG. 46, a die unit 1128 has a pressure regulating device 1126. Die unit 1128 has a base member 1130. Adjusting screws 1196 are inserted into pressure regulating device 1126.

Figure 47:
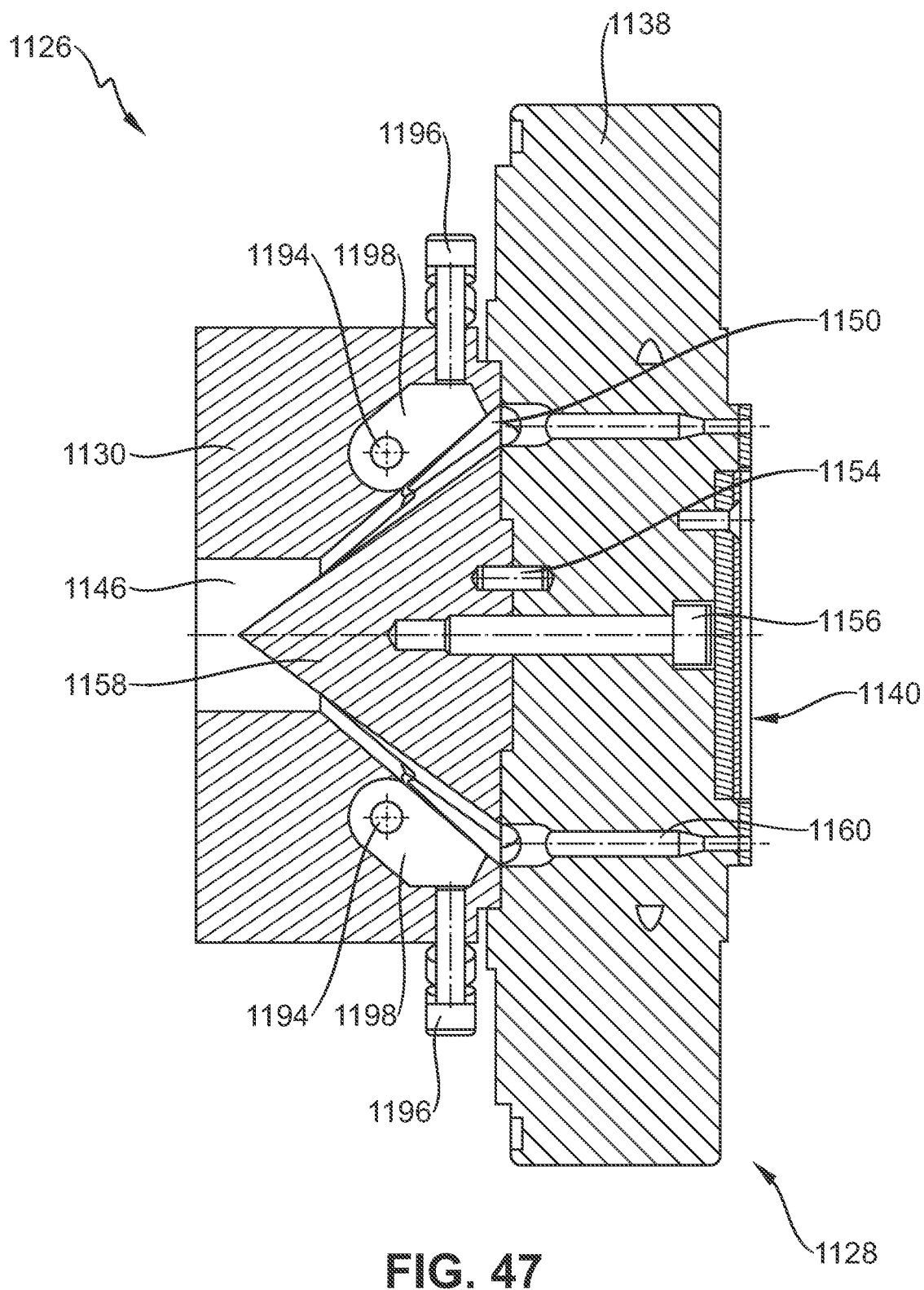
FIGS. 47, 48 show cross-sectional views of the embodiment of the inventive pressure regulating device shown in FIG. 46, in different operating positions.
Figure 48:
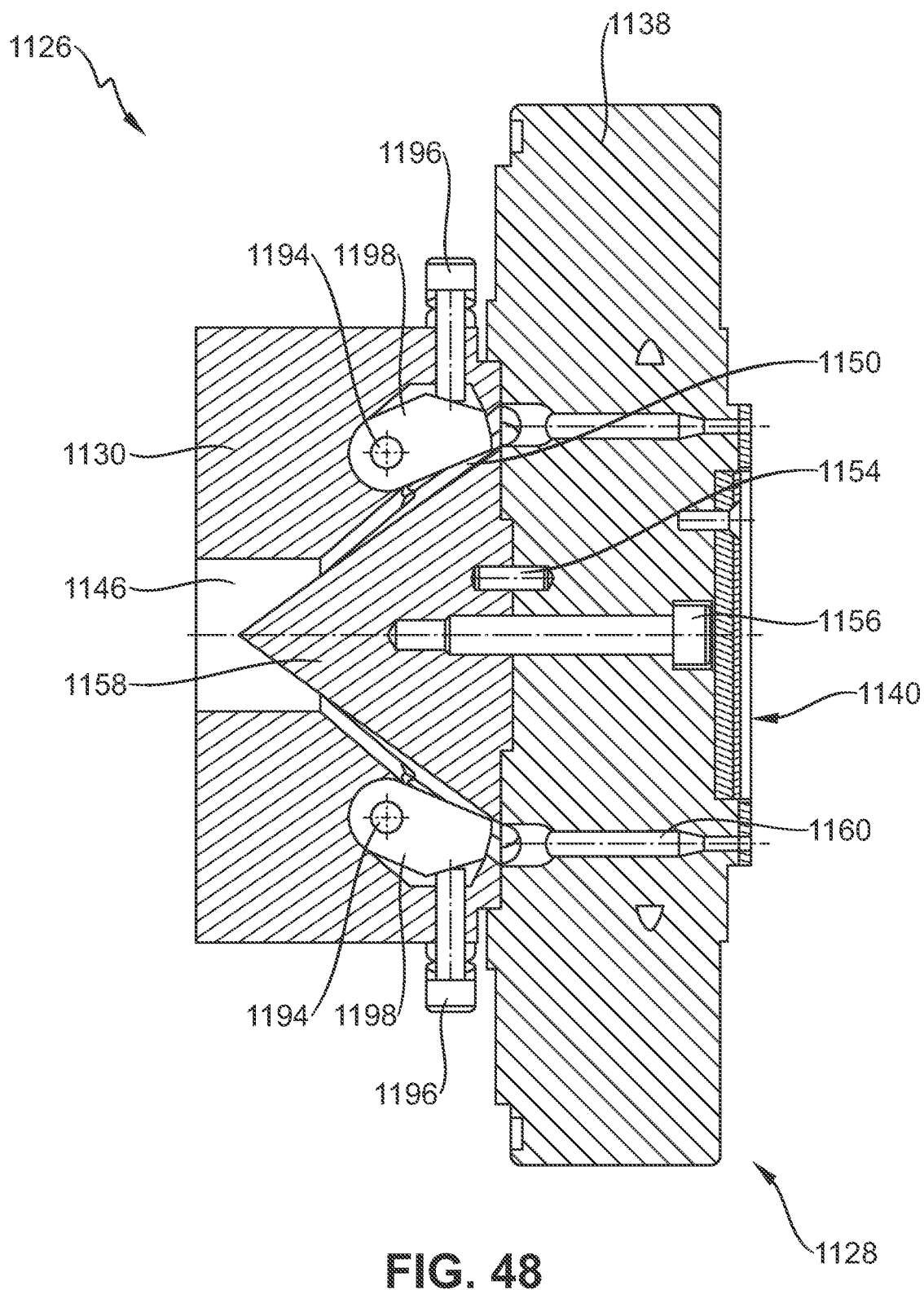
Figure 49:
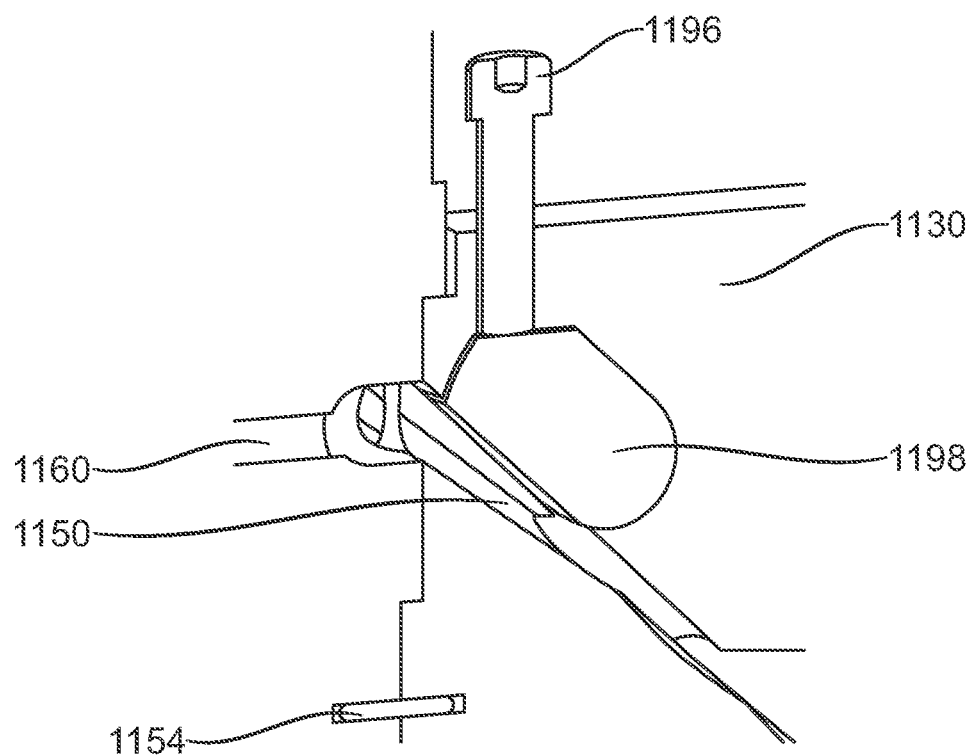
FIGS. 49, 50 show the partial views of the embodiment shown in FIGS. 46-48, in different operating positions.
Figure 50:
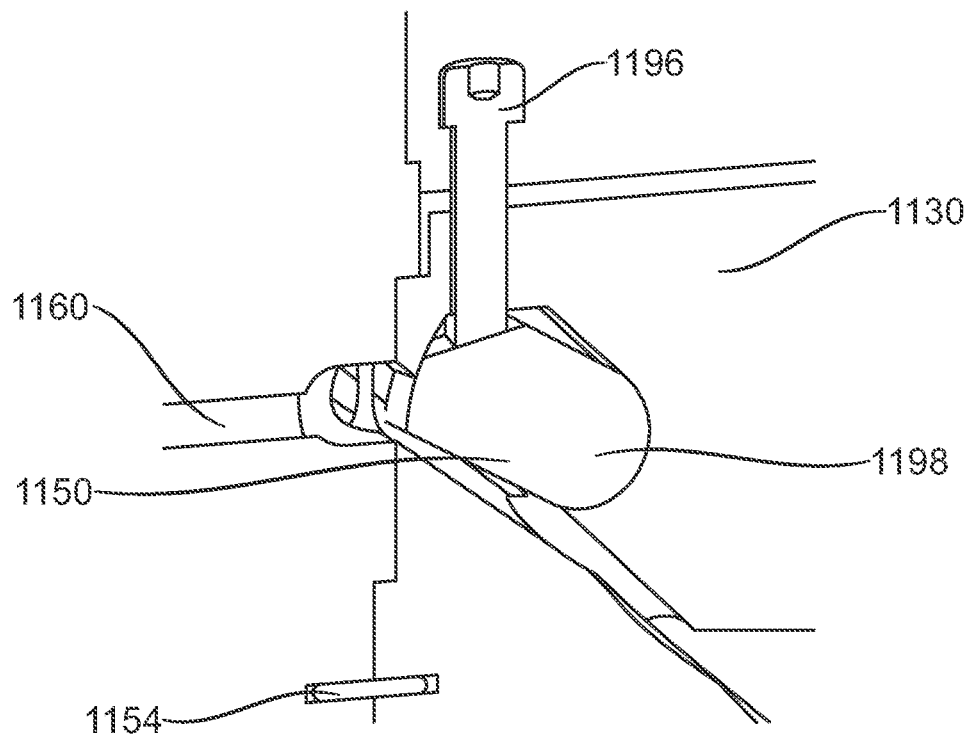

FIGS. 47 and 48 show sectional views of die unit 1128 in different operating states. Die member 1138 has die member flow channels 1160. A guide cone 1158 is connected to die member 1138. The connection is made by means of a centering pin 1154 and a cone fastening screw 1156. Pressure regulating device 1126 is coupled to die member 1138, which has a base member 1130 in which a flow channel 1146 is formed in combination with guide cone 1158 of die unit 1128.

Throttle elements 1198 are arranged in the region of said flow channel 1146 between base member 1130 and guide cone 1158. Throttle elements 1198 are rotatably arranged on pivot axis 1194. By means of an adjusting screw 1196 that acts on throttle element 1198, throttle element 1198 can be pivoted into the region of flow channel 1146 between guide cone 1158 and base member 1130, thus restricting the free cross-section of flow in said region, depending on the position of throttle element 1198. In the state of throttle element 1198 as shown in FIG. 47, flow channel 1146 is not or only very slightly restricted.

In the state shown in FIG. 48, however, throttle element 1198 extends almost completely into the flow channel formed between base member 1130 and guide cone 1158. The effects of positioning throttle elements 1198 are illustrated additionally in FIGS. 49 and 50. However, the throttle elements 1198 shown in FIGS. 49 and 50 do not have any rotational axes in comparison to the throttle elements shown in FIGS. 47 and 48.

Figure 51:
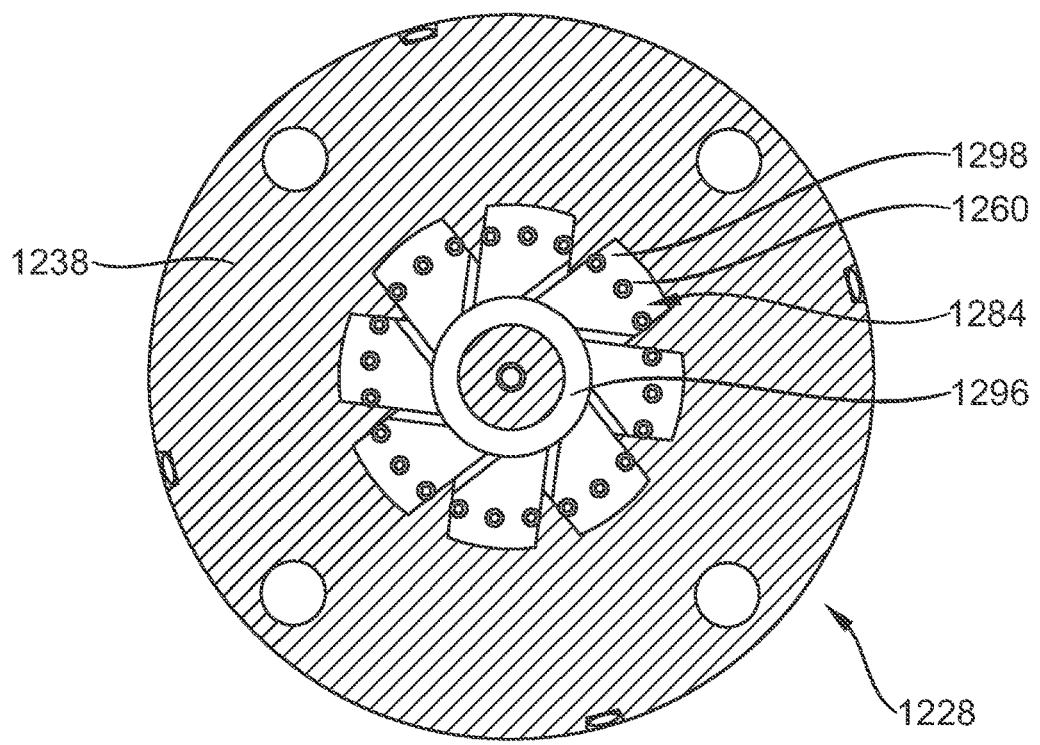
FIGS. 51, 52 show cross-sectional views of an alternative embodiment of a pressure regulating device according to the invention, in different operating positions.
Figure 52:
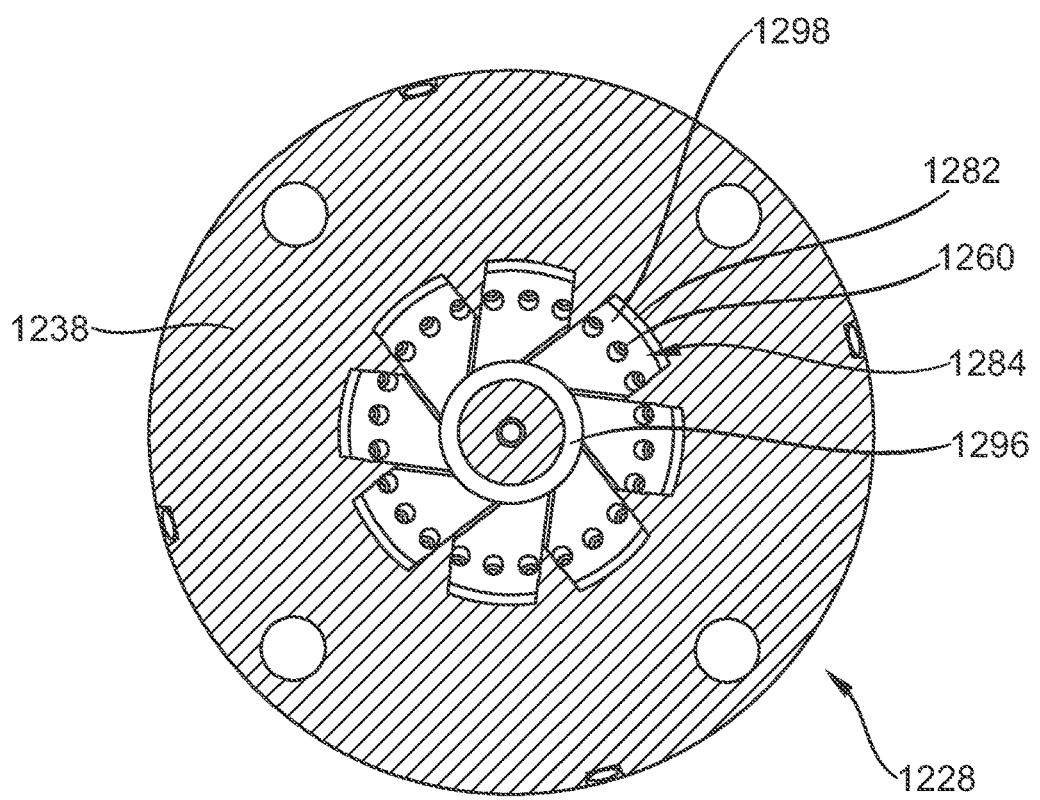

FIGS. 51 and 52 show an alternative embodiment of a die unit 1228. Die unit 1228 has a die member 1238. A slider adjustment device 1296 is arranged about a longitudinal axis of die member 1238. Slider adjustment device 1296 is rotatably mounted. Slider elements 1298 each having slider bores 1284 are coupled to slider adjustment device 1296. In the operating state shown in FIG. 51, the slider bores 1284 of slider adjustment device 1296 are arranged such that they overlap and are thus in alignment with die member flow channels 1260. Thus, in the operating state shown in FIG. 51, no significant influence is exerted on die member flow channels 1260.

In the state shown in FIG. 52, however, slider elements 1298 are not aligned with die member flow channels 1260. In this case, the positioning of slider elements 1298 causes a restriction of die member flow channels 1260 and reduces the free cross section of flow. The free cross-section of flow can be regulated by positioning the slider elements 1298 relative to die member flow channels 1260.

Figure 53:
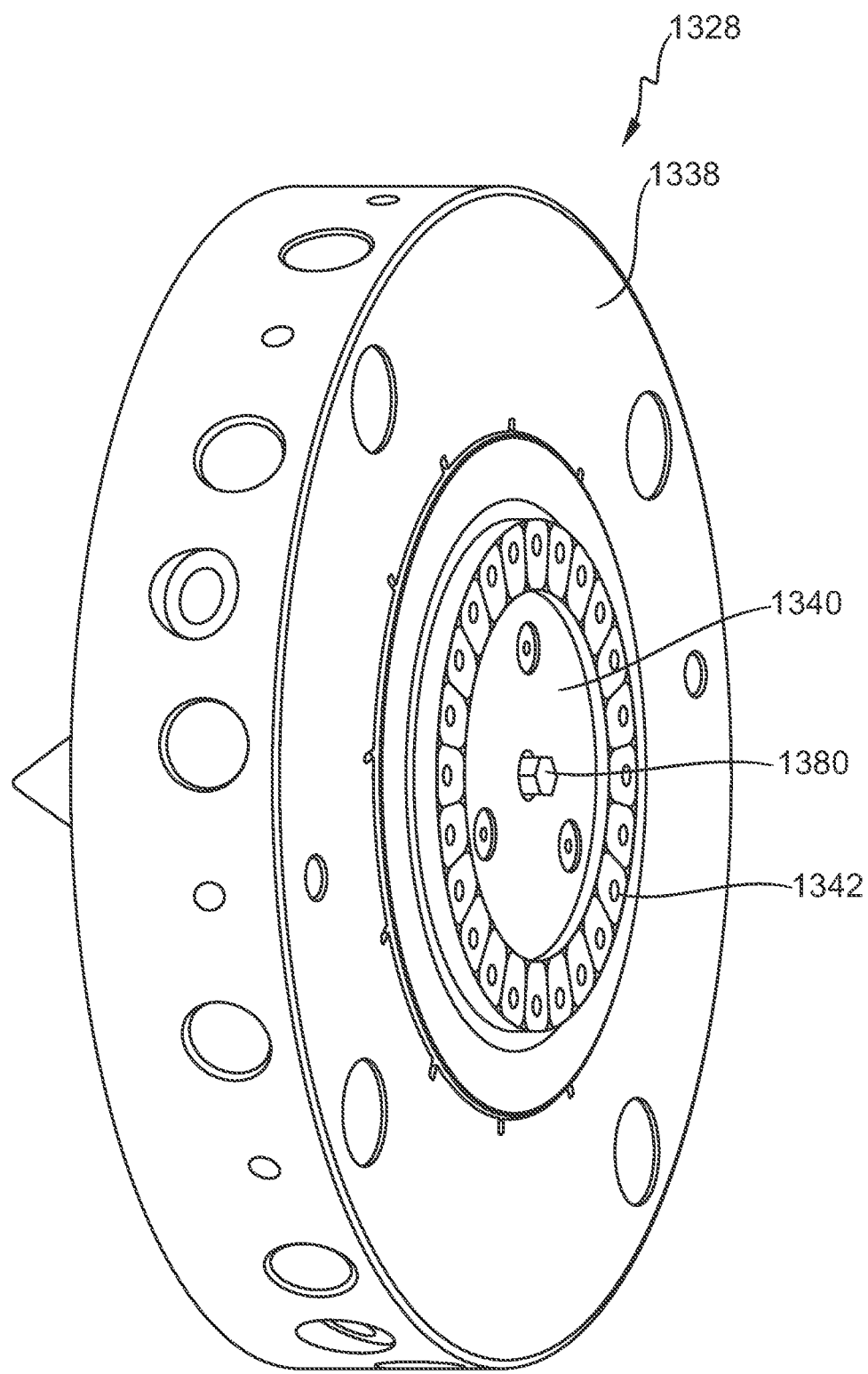
FIG. 53 shows a perspective view of another embodiment of a die unit according to the invention, with a pressure regulating device integrated therein.

Another alternative embodiment of a die unit 1328 is shown in FIGS. 53-56. FIG. 53, firstly, shows a die unit 1328 with a die member 1338. A die plate 1340 having die orifices 1342 is arranged on die member 1338. An adjusting head 1380 is also arranged in the region of die plate 1340.

Figure 54:
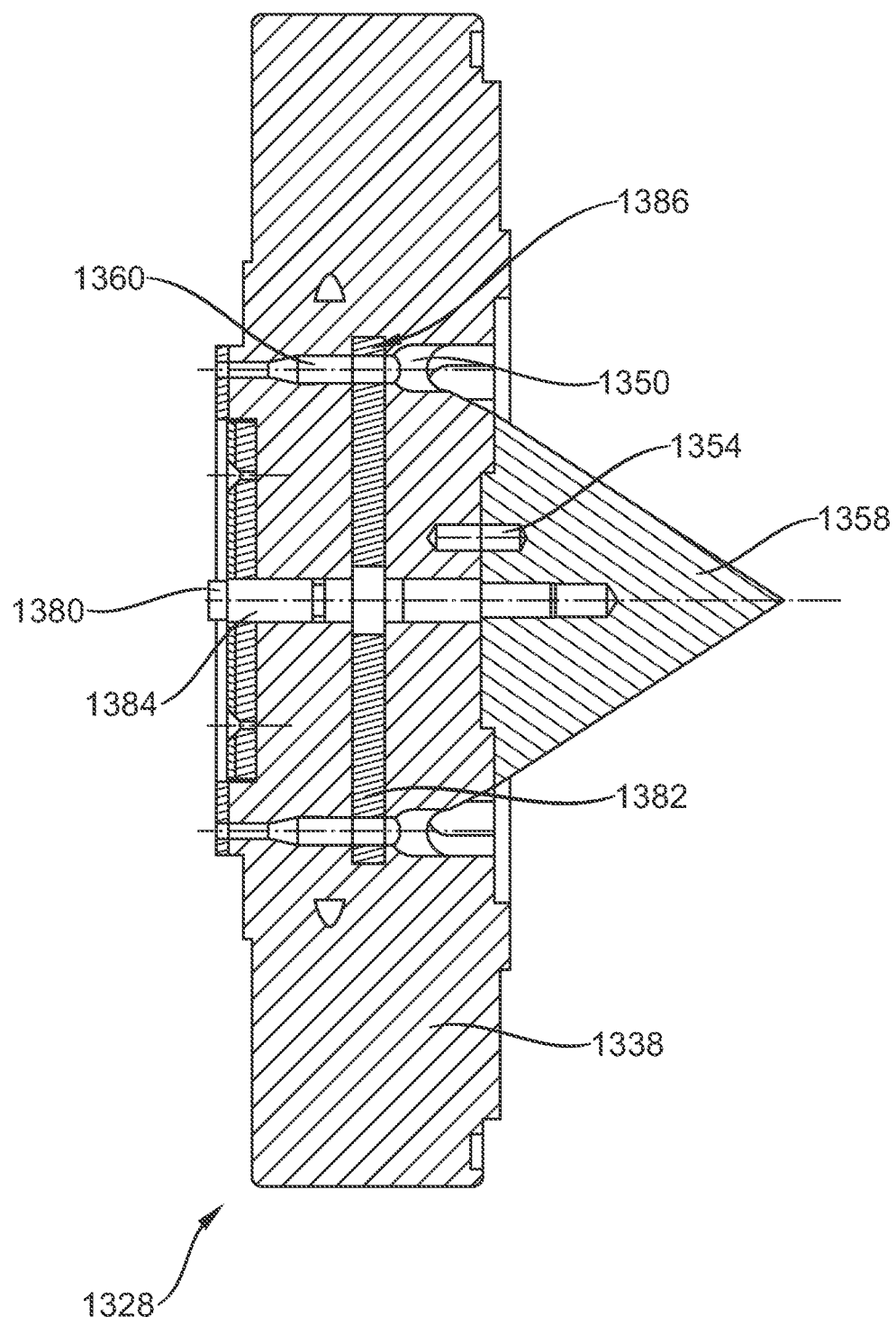
FIGS. 54, 56 show the embodiment of the inventive pressure regulating device shown in FIG. 53, in different cross-sectional views and operating positions.

The structure of die unit 1328 can be seen in detail in FIG. 54. Die unit 1328 has a die member 1338 in which die member flow channels 1360 are arranged. A guide cone 1358 is arranged on die member 1338. An adjusting element 1384 is also arranged in the region of a longitudinal axis of die member 1338.

Adjusting element 1384 has an adjusting head 1380 on a first side. An adjusting disc 1382 is arranged on adjusting element 1384. Adjusting disc 1382 has adjusting disc bores 1386. The diameter of adjusting disc bores 1346 is approximately the same as the diameter of die member flow channels 1360. Depending on their position, i.e., depending in particular on the angle of rotation of adjusting disc 1382 relative to die member flow channels 1360, it is possible to vary the free cross-section of flow in the region of die member flow channels 1360.

If die member flow channels 1360 are aligned with adjusting disc bores 1386, there is no significant restriction or limitation of fluid flow through die member flow channels 1360. However, if adjusting disc 1382 is rotated by means of adjusting head 1380 from the position shown in FIG. 54, in such a way that adjusting disc bore 1386 is no longer aligned with die member flow channels 1360, flow in die member flow channels 1360 is restricted.

Figure 55:
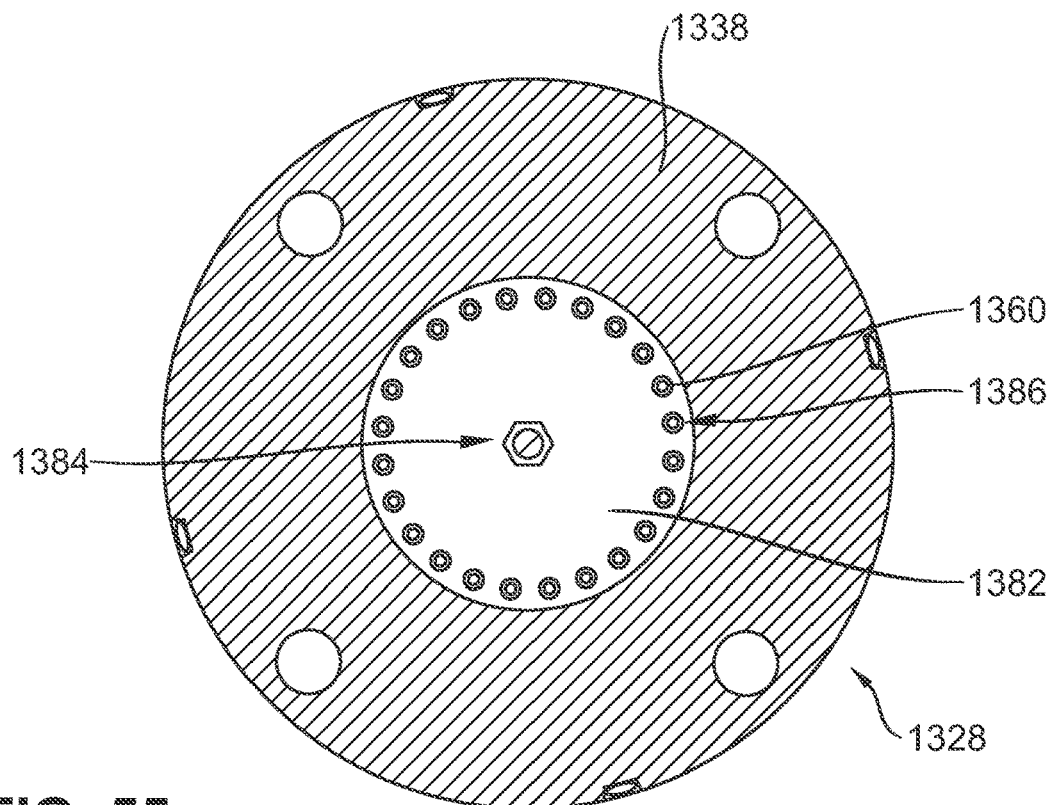
Figure 56:
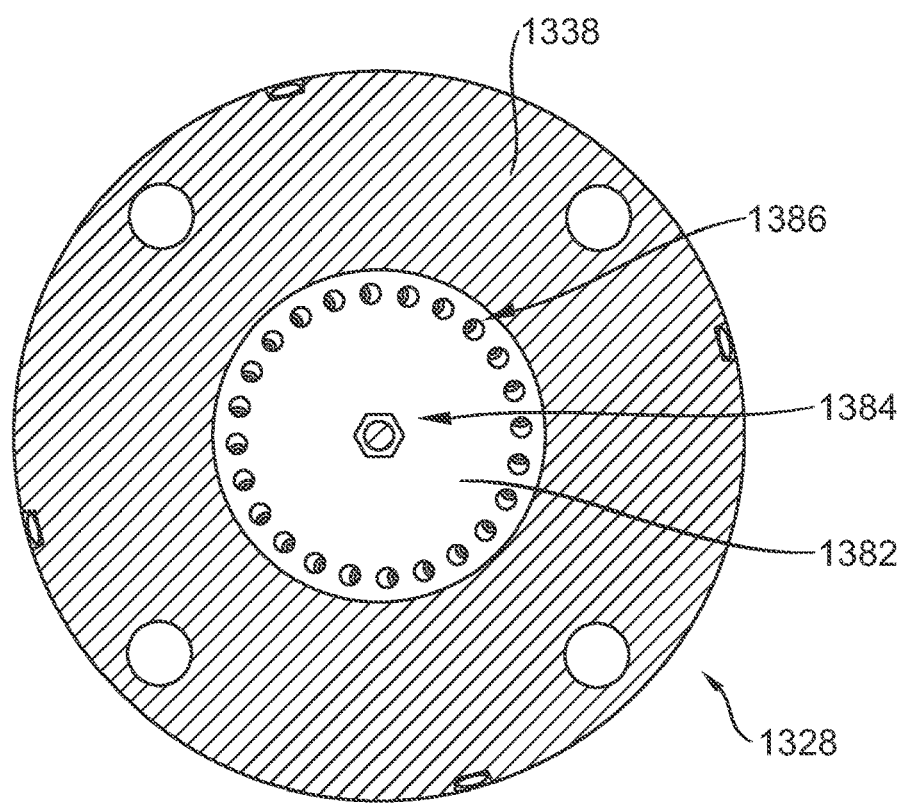

This is illustrated in FIGS. 55 and 56. In the state shown in FIG. 55, adjusting disc bores 1386 are aligned with die member flow channels 1360, so there is no or no significant restriction of fluid flow through die member flow channels 1360.

In the state shown in FIG. 56, however, adjusting disc bores 1386 are no longer aligned with die member flow channels 1360, so the cross-section of flow through die member flow channels 1360 is restricted in the region of adjusting disc 1382.

Figure 57:
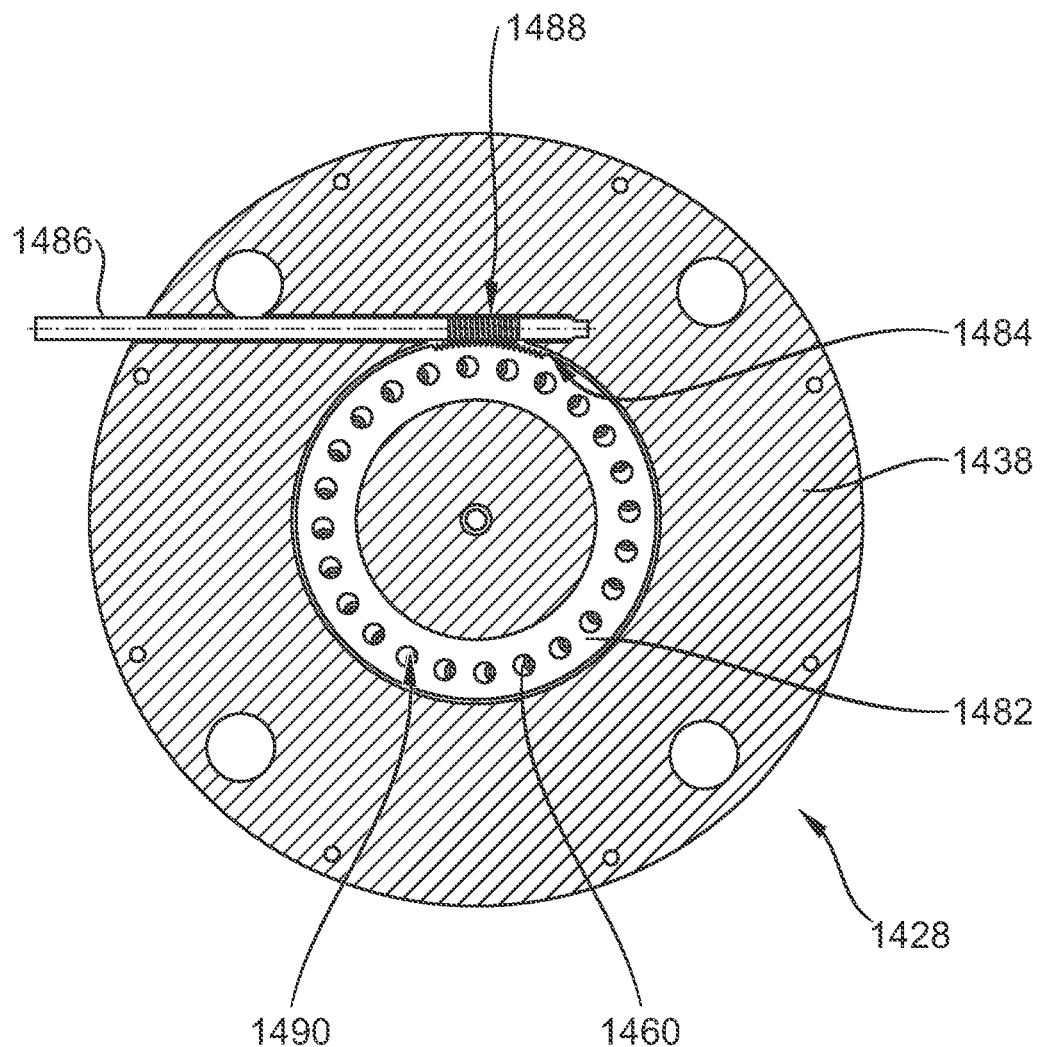
FIG. 57 shows a cross-sectional view of another alternative embodiment of a pressure regulating device according to the invention, arranged a die unit.

An alternative embodiment of a die assembly 1428 is shown in FIG. 57. Die unit 1428 has an adjusting disc 1482 which is mounted movably relative to a die member 1438. Adjusting disc 1482 has adjusting disc bores 1490 which can be positioned in alignment relative to die member flow channels 1460 so that there is effectively no restriction of fluid flow through die member flow channels 1460, or, as shown in FIG. 57, they can be brought into a non-aligned position relative to the flow channels so as to restrict the flow of fluid through die member flow channels 1460. Adjusting disc 1482 has a threaded section 1484 for controlling adjusting disc 1482. An adjusting element 1486 arranged in die member 1438 has a worm 1488 in the region of one of its ends. Worm 1488 matches threaded section 1484 in such a way that rotating the adjusting element 1486 having worm 1488 will cause adjusting disc 1482 to rotate. Adjusting element 1486 is guided in such a way that one of its ends can be actuated from outside die member 1438.

Figure 58:
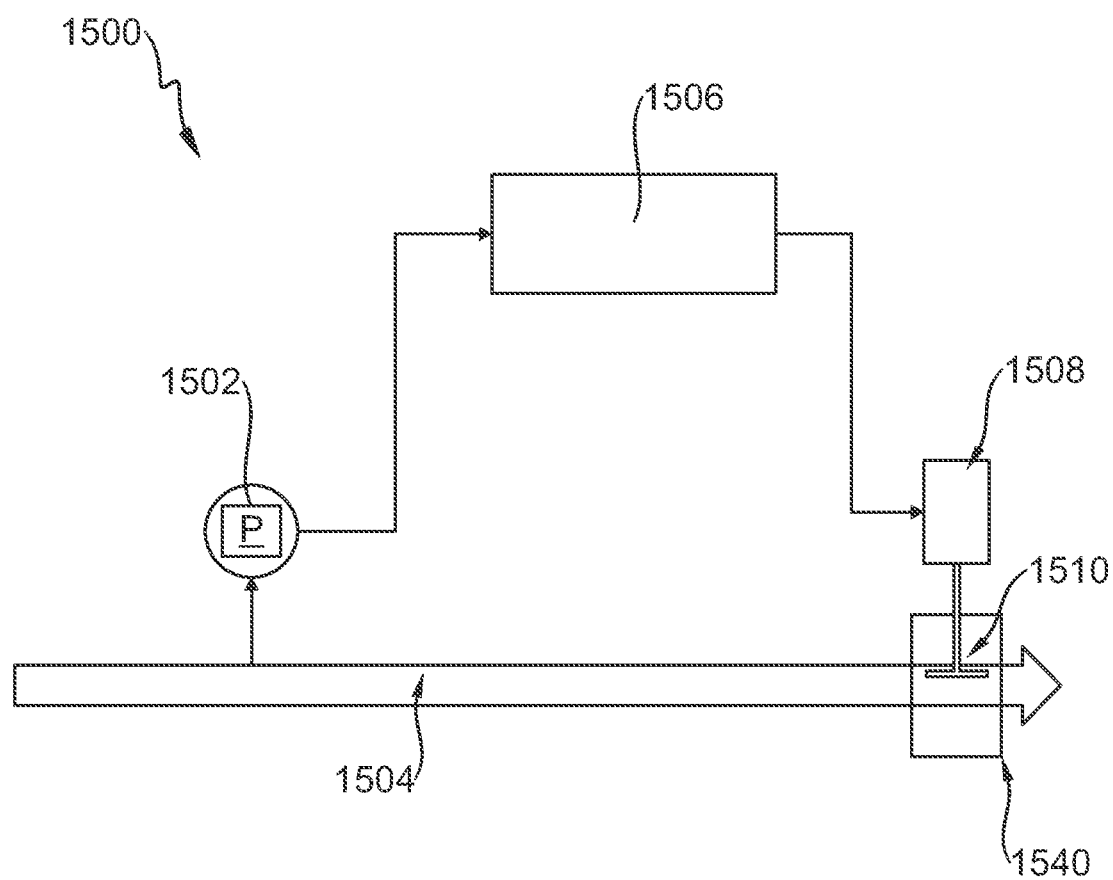
FIG. 58 shows by way of example a block diagram of a controller according to the invention, for operating a pressure regulating device.

FIG. 58 shows a control block diagram 1500 for controlling a pressure regulating device 1510. The arrangement has a pressure sensor 1502, which is in signal communication with a controller 1506. Depending on the pressure value measured by pressure sensor 1502, controller 1506 actuates an actuator 1508, which in turn actuates a pressure regulating device 1510 according to the pressure value measured by pressure sensor 1502. By means of controller 1506, the pressure in a plastic melt stream 1504 in the region of a die plate 1540 can be influenced in the desired manner and by means of the technical means mentioned and described in the embodiments.

LIST OF REFERENCE SIGNS

2 Pelletizing apparatus
4 Die assembly
6 Driver
8 Housing
10 Skid mount
12 Process water outlet
14 Pelletizer
16 Protective cover
18 Baseplate
20 Machine baseplate
22 Spacer elements
24 Process water inlet
26 Pressure regulating device
28 Die unit
30 Base member
31 Housing section
32 Fluid inlet side
34 Actuator
36 Actuating nut
38, 38a, Die member
38b
40 Die plate
42 Die orifices
44 Sleeve
46 Flow channel
48 Fluid discharge side
50 Annular channel section
52 Regulating section
52a Concave regulating section
52b Convex regulating section
54 Centering pin
56 Cone fastening screw
58 Guide cone
60 Die member flow channels
62 Bolt
64, 66 Fastening nuts
68 Flat washer
70 First abutment shoulder
72 Second abutment shoulder
74 Pins
104 Die assembly
126 Pressure regulating device
130 Base member
146 Flow channel
150 Annular channel section
174 Pins
176 Actuating element
178 Plunger
180 Actuating element (gear wheel)
182 Hand lever
184 Retaining ring
186 Regulating ring
188 Coupler
190 Cap ring
204 Die assembly
226 Pressure regulating device
230 Base member
236 Actuating nut/screw
246 Flow channel
250 Annular channel section
274 Pins
292 Mounting ring
294 Connecting ring
296 Extended pins
304 Die assembly
328 Die unit
338 Die member
340 Die plate
356 Cone fastening screw
358 Guide cone
398 Heating ring
426 Pressure regulating device
428 Die unit
430 Base member
432 Fluid inlet side
438 Die member
440 Die plate
446 Flow channel
450 Annular channel section
454 Centering pin 456 Cone fastening screw
458 Guide cone
460 Die member flow channels
474 Pins
484 Inlet/outlet for pressurized fluid
486 Inlet/outlet for pressurized fluid
488 First housing ring
490 Second housing ring
492 Bellows
494 Piston
496 Cylinder chamber
528, 528a Die unit
530 Base member
538, 538a Die member
540 Die plate
550 Annular channel section
558, 558a Axially adjustable guide cone
560 Die member flow channels
580 First pressure chamber
582 Second pressure chamber
584 Distributor section
586 Sealing ring
588 Inlet/outlet for pressurized fluid
590 Pressure chamber ring
592 Cone guide
594 Bellows
596 Trapezoidal section
630 Base member
638 Die member
640 Die plate
650 Annular channel section
654 Centering pin
658 Axially adjustable guide cone
660 Die member flow channels
694 Set screw receiver
696 Set screw
698 Nut
730 Base member
738 Die member
740 Die plate
758 Axially adjustable guide cone
760 Die member flow channels
778 Guide cone female thread
780 Male thread
782 Gear section
784 Receiving portion
786 Ball bearing
788 Lock ring
796 Adjusting pin
798 Rotating member
830 Base member
838 Die member
840 Die plate
850 Annular channel section
858 Axially adjustable guide cone
860 Die member flow channels
880 First pressure chamber
882 Second pressure chamber
884 Distributor section
886 Sealing ring
888 Inlet/outlet for pressurized fluid
890 Pressure chamber ring
928 Die unit
938 Die member
940 Die plate
958 Guide cone
960 Die member flow channels
996 Throttle pins
1028 Die unit
1038 Die member
1040 Die plate
1050 Annular channel section
1058 Guide cone
1060 Die member flow channels
1082 Slider chamber
1084 Slider bores
1096 Slider rod
1098 Slider element
1126 Pressure regulating device
1128 Die unit
1130 Base member
1138 Die member
1140 Die plate
1146 Flow channel
1150 Annular channel section
1154 Centering pin
1156 Cone fastening screw
1158 Guide cone
1160 Die member flow channels
1194 Pivot axis
1196 Adjusting screw
1198 Throttle element
1228 Die unit
1238 Die member
1260 Die member flow channels
1284 Slider bores
1296 Slider adjustment device
1298 Slider element
1328 Die unit
1338 Die member
1340 Die plate
1342 Die orifices
1350 Annular channel section
1354 Centering pin
1358 Guide cone
1360 Die member flow channels
1380 Adjusting head
1382 Adjusting disc
1384 Adjusting element
1386 Adjusting disc bore
1428 Die unit
1438 Die member
1460 Die member flow channels
1482 Adjusting disc
1484 Threaded section
1486 Adjusting element
1488 Worm
1490 Adjusting disc bore
1500 Control block diagram
1502 Pressure sensor
1504 Hot-melt adhesive flow
1506 Controller
1508 Actuator
1510 Pressure regulating device
1540 Die plate

The invention claimed is:

1. A die assembly for a pelletizing apparatus, the die assembly comprising:
a die plate comprising a plurality of die orifices; and
a pressure regulating device;
the pressure regulating device comprising:
a base member having a fluid inlet side and a fluid outlet side;

a flow channel formed in the base member to provide a fluid-conducting connection between the fluid inlet side and the fluid outlet side;
an annular channel section connected to the flow channel in a fluid-conducting manner and formed in a region of the fluid outlet side; and
a flow cross-section regulating element configured to influence a flow cross-section of the annular channel section, said flow cross-section regulating element being movable relative to the annular channel section and/or the flow channel,
wherein a regulating section adapted to influence the flow cross-section of the annular channel section is formed on the flow cross-section regulating element, the regulating section having pins which extend at least in sections into the annular channel section.

2. The die assembly according to claim 1, wherein the flow cross-section regulating element is arranged in the annular channel section; and wherein the plurality of die orifices are configured to discharge melt strands.

3. The die assembly according to claim 1, wherein the flow cross-section regulating element has a regulating ring and a retaining ring connected to the regulating ring; and wherein the plurality of die orifices are configured to discharge melt strands.

4. The die assembly according to claim 3, wherein the regulating ring has the pins which extend at least in sections into the annular channel section, depending on a position of the regulating ring.

5. The die assembly according to claim 3, comprising at least one actuator, operatively connected to the flow cross-section regulating element, and configured to move the flow cross-section regulating element relative to the annular channel section, translationally in a direction of a longitudinal axis of the base member.

6. A die assembly for a pelletizing apparatus with a pressure regulating device, the die assembly comprising:
a base member having a fluid inlet side and a fluid outlet side;
a flow channel formed in the base member to provide a fluid-conducting connection between the fluid inlet side and the fluid outlet side;
an annular channel section connected to the flow channel in a fluid-conducting manner and formed in a region of the fluid outlet side; and
a flow cross-section regulating element configured to influence a flow cross-section of the annular channel section, said flow cross-section regulating element being movable relative to the annular channel section and/or the flow channel, wherein the flow cross-section regulating element has a regulating ring and a retaining ring connected to the regulating ring and wherein the regulating ring is wedge-shaped.

7. The die assembly according to claim 5, wherein the actuator is formed as a fluid-operated actuator.

8. The die assembly according to claim 7, wherein the fluid-operated actuator has a cylinder having at least one pressurized fluid inlet/outlet, and wherein the cylinder and the at least one pressurized fluid inlet/outlet are formed in the base member.

9. A die assembly for a pelletizing apparatus with a pressure regulating device, the die assembly comprising:
a base member having a fluid inlet side and a fluid outlet side;
a flow channel formed in the base member to provide a fluid-conducting connection between the fluid inlet side and the fluid outlet side;
an annular channel section connected to the flow channel in a fluid-conducting manner and formed in a region of the fluid outlet side;
a flow cross-section regulating element configured to influence a flow cross-section of the annular channel section, said flow cross-section regulating element being movable relative to the annular channel section and/or the flow channel, wherein the flow cross-section regulating element has a regulating ring and a retaining ring connected to the regulating ring; and
at least one actuator, operatively connected to the flow cross-section regulating element, and configured to move the flow cross-section regulating element relative to the annular channel section, translationally in a direction of a longitudinal axis of the base member, wherein the actuator has an actuating element which is connected to the retaining ring and which is operatively connected to a translationally movable plunger.

10. The die assembly according to claim 9, wherein the base member has at least one mounting bore for mounting the translationally movable plunger and for guiding the translationally movable plunger to an outer side of the base member.

11. The die assembly according to claim 9, wherein the translationally movable plunger has an actuating element.

12. The die assembly according to claim 11, comprising a coupler configured to couple the actuating element of at least two actuators.

13. The die assembly according to claim 12, wherein the coupler is configured as an internal gear in engagement with the actuating elements, such that actuation of the internal gear causes actuation of the actuating element.

14. The die assembly according to claim 12, wherein the actuating elements or the coupler have a driver and/or a hand lever.

15. The die assembly according to claim 1, wherein the flow cross-section regulating element is formed as a sleeve which surrounds the base member at least in sections and is translationally movable in a direction of a longitudinal axis of the base member and wherein the plurality of die orifices are configured to discharge melt strands.

16. The die assembly according to claim 15, wherein the regulating section is wedge-shaped.

17. The die assembly according to claim 15, wherein the regulating section is concave.

18. The die assembly according to claim 15, wherein the regulating section is convex.

19. A pelletizing apparatus comprising the die assembly according to claim 1.

20. A die assembly for a pelletizing apparatus, the die assembly comprising:
a die plate comprising a plurality of die orifices; and
a pressure regulating device;
the pressure regulating device comprising:
a base member having a fluid inlet side and a fluid outlet side;
a flow channel formed in the base member to provide a fluid-conducting connection between the fluid inlet side and the fluid outlet side;
an annular channel section connected to the flow channel in a fluid-conducting manner and formed in a region of the fluid outlet side; and
a flow cross-section regulating element configured to influence a flow cross-section of the annular channel section, said flow cross-section regulating element being movable relative to the annular channel section and/or the flow channel, wherein the flow cross-section regulating element is formed as a sleeve which surrounds the base member at least in sections and wherein a wedge-shaped regulating section adapted to influence the flow cross-section of the annular channel section is formed on the flow cross-section regulating element.

\* \* \* \* \*